(12) United States Patent
Tabata et al.

(10) Patent No.: US 7,474,012 B2
(45) Date of Patent: Jan. 6, 2009

(54) ENGINE STARTING CONTROL APPARATUS FOR HYBRID VEHICLE

(75) Inventors: Atsushi Tabata, Okazaki (JP); Hiroyuki Shibata, Toyota (JP); Kenta Kumazaki, Toyota (JP); Tooru Matsubara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/081,471

(22) Filed: Apr. 16, 2008

(65) Prior Publication Data

US 2008/0258474 A1   Oct. 23, 2008

(30) Foreign Application Priority Data

Apr. 20, 2007   (JP) ............................. 2007-112321

(51) Int. Cl.
*F02D 25/00*   (2006.01)
(52) U.S. Cl. .................... 290/40 C; 290/40 A; 180/65.2
(58) Field of Classification Search ............... 290/40 A, 290/40 C, 40 D; 180/65.2; 320/104
See application file for complete search history.

(56) References Cited

U.S. PATENT DOCUMENTS 6,559,551 B2 *   5/2003   Graage et al. ............. 290/40 B
7,358,622 B2 *   4/2008   Yang et al. ..................... 290/39
7,385,300 B2 *   6/2008   Huff et al. .................. 290/40 F

FOREIGN PATENT DOCUMENTS

| JP | A-2004-208417 | 7/2004 |
| JP | A-2004-225573 | 8/2004 |
| JP | A-2006-213149 | 8/2006 |

* cited by examiner

*Primary Examiner*—Julio C Gonzalez
*Assistant Examiner*—Iraj A Mohandesi
(74) *Attorney, Agent, or Firm*—Oliff & Berridge, PLC

(57)   ABSTRACT

A control apparatus for a drive system of a hybrid vehicle including (a) an electrically controlled differential portion which has an engine, a first electric motor, and a differential mechanism operatively connected to the engine and the first electric motor and a differential state of which is controlled by controlling an operating state of the first electric motor, (b) a mechanical transmission portion constituting a part of a power transmitting path, and (c) a second electric motor connected to a power transmitting path between the electrically controlled differential portion and a drive wheel of the hybrid vehicle, the control apparatus including a control portion which is operable when a terminal portion of a shifting action of the mechanical transmission portion and a starting operation of the engine overlap each other, the control portion being configured to implement one of the shifting action and the starting operation prior to the other.

22 Claims, 18 Drawing Sheets

|  | C0 | C1 | C2 | B0 | B1 | B2 | B3 | SPEED RATIO | STEPPING RATIO |
|---|---|---|---|---|---|---|---|---|---|
| 1st | ◎ | ○ |  |  |  |  | ○ | 3.357 | 1.54 |
| 2nd | ◎ | ○ |  |  |  | ○ |  | 2.180 | 1.53 |
| 3rd | ◎ | ○ |  |  | ○ |  |  | 1.424 | 1.42 |
| 4th | ◎ | ○ | ○ |  |  |  |  | 1.000 | 1.42 |
| 5th |  | ○ | ○ | ◎ |  |  |  | 0.705 | SPREAD 4.76 |
| R |  |  | ○ |  |  |  | ○ | 3.209 | |
| N |  |  |  |  |  |  |  | | |

○ ENGAGED
◎ ENGAGED FOR STEP-VARIABLE SHIFTING, AND RELEASED FOR CONTINUOUSLY-VARIABLE SHIFTING

|  | C1 | C2 | B1 | B2 | B3 | SPEED RATIO | STEPPING RATIO |
|---|---|---|---|---|---|---|---|
| 1st | ○ |  |  |  | ○ | 3.357 | 1.54 |
| 2nd | ○ |  |  | ○ |  | 2.180 | 1.53 |
| 3rd | ○ |  | ○ |  |  | 1.424 | 1.42 |
| 4th | ○ | ○ |  |  |  | 1.000 | SPREAD 3.36 |
| R |  | ○ |  |  | ○ | 3.209 |  |
| N |  |  |  |  |  |  |  |

○ ENGAGED

ENGINE STARTING CONTROL APPARATUS FOR HYBRID VEHICLE

The present application claims priority from Japanese Patent Application No. 2007-112321 filed on Apr. 20, 2007, the disclosure of which is herein incorporated by reference in its entirety.

BACKGROUND OF THE INVENTION

1. Field of the Invention

The present invention relates in general to a control apparatus for controlling starting of an engine of a hybrid vehicle, and more particularly to techniques for rapidly starting an internal combustion engine of a hybrid vehicle including the engine and an electric motor as vehicle drive power sources, when the engine is started in a motor drive mode of the hybrid vehicle in which the electric motor is used as the vehicle drive power source, without an output of the engine.

2. Discussion of Prior Art

JP-A-2006-213149A discloses a hybrid vehicle drive system including a continuously-variable transmission portion operable as an electrically controlled continuously-variable transmission which has an engine, and a first electric motor, a second electric motor and a differential mechanism that are disposed between the engine and an output shaft, and which is selectively switchable by releasing and engaging actions of coupling devices, between a continuously-variable shifting state in which the continuously-variable transmission portion is able to perform an electrically controlled continuously-variable shifting operation, and a step-variable shifting state in which the continuously-variable transmission portion is not able to perform the electrically controlled continuously-variable shifting operation. A control apparatus for this hybrid vehicle drive system is arranged such that a selected one of an operation to switch the shifting state of the electrically controlled continuously-variable transmission and an operation to start the engine is implemented prior to the other if the switching operation of the shifting state and the starting operation of the engine would otherwise overlap each other.

The control apparatus disclosed in the above-identified publication implements one of the switching operation of the shifting state and the engine starting operation prior to the other, if these switching and engine starting operations overlap each other. If the switching operation of the shifting state is implemented prior to the engine starting operation, for example, the engine speed is raised and started only after completion of the switching operation of the shifting state of the continuously-variable transmission portion which takes a relatively long time. In this case, therefore, a rise of the vehicle drive torque generated by the drive system is delayed with respect to a moment of rise of the drive torque expected by the vehicle operator.

SUMMARY OF THE INVENTION

The present invention was made in view of the background art described above. It is therefore an object of this invention to provide an engine starting control apparatus for a hybrid vehicle including an engine and an electric motor as vehicle drive power sources, which engine starting control apparatus permits rapid starting of the engine in the motor drive mode and which substantially prevents a delayed rise of the vehicle drive torque with respect to a moment of rise of the vehicle drive torque expected by the vehicle operator.

The object indicated above can be achieved according to any one of the following modes of this invention, each of which is numbered like appended claims and depends from the other mode or modes, where appropriate, for easier understanding of technical features disclosed in the present application, and possible combinations of those technical features.

(1) An engine starting control apparatus for a hybrid vehicle including (a) an engine, (b) an electrically controlled differential portion which has a first electric motor, and a differential mechanism operatively connected to the first electric motor and a differential state of which is controlled by controlling an operating state of the first electric motor, (c) a transmission portion constituting a part of a power transmitting path between the engine and a drive wheel of the hybrid vehicle, and (d) a second electric motor connected to the power transmitting path, the engine starting control apparatus comprising an engine-speed-rise control portion operable during a shifting action of the transmission portion in a motor drive mode of the hybrid vehicle in which the hybrid vehicle is driven by the second electric motor as a vehicle drive power source, without using the engine as a vehicle drive power source, the engine-speed-rise control portion being configured to raise an operating speed of the engine during the shifting action in the motor drive mode.

The engine starting control apparatus constructed according to the above-described mode (1) of the present invention is configured such that the operating speed of the engine is raised during the shifting action of the transmission portion in the motor drive mode of the hybrid vehicle, so that the engine can be more rapidly started after generation of a command to start the engine, than where the operating speed of the engine is raised only after the moment of generation of the engine starting command. Further, the present engine starting control apparatus permits the engine to be started prior to the moment of completion of the shifting action under some condition. Owing to this comparatively early starting of the engine, the vehicle operator will not feel a considerable delay in the rise of the vehicle drive torque after generation of the engine starting command.

(2) The engine starting control apparatus according to the above-described mode (1), wherein the engine-speed-rise control portion raises the operating speed of the engine by operating the first electric motor.

In the above described mode (2) of this invention wherein the operating speed of the engine is raised by operating the first electric motor, the engine speed can be raised to a desired value according to an operating speed of the first electric motor, while utilizing a differential function of the differential mechanism, for starting the engine at the raised speed.

(3) The engine starting control apparatus according to the above-described mode (2), wherein the second electric motor is operatively connected to one of rotary elements of the differential mechanism, which is other than the rotary element to which the first electric motor is operatively connected, and the engine-speed-rise control portion is configured to command the second electric motor to generate a reaction torque against a resistance to a rotary motion of the engine, for raising the operating speed of the engine in the motor drive mode.

In the above-described mode (3) of the invention, the engine-speed-rise control portion commands the second electric motor to generate the reaction torque against the resistance to the rotary motion of the engine, for raising the engine speed, thereby preventing a drop of an input shaft speed of the transmission portion due to the resistance to the rotary motion of the engine, and other adverse influences of the resistance on the shifting action of the transmission portion.

(4) The engine starting control apparatus according to the above-described mode (3), wherein the reaction torque generated by the second electric motor during the shifting action of the transmission portion is larger than that to be generated while the transmission portion is not in a shifting action.

The above-described mode (4) of this invention is based on a fact that the reaction torque to be generated by the second electric motor should be larger during the shifting action of the transmission portion during which the power transmitting path to the drive wheel of the hybrid vehicle through the transmission portion is disconnected or substantially disconnected so that the operating speed of the engine cannot be raised by a rotary motion of the drive wheel. In the present mode (4), the reaction torque generated by the second electric motor during the shifting action of the transmission portion is larger than that to be generated while the transmission portion is not in a shifting action. Accordingly, the reaction torque generated by the second electric motor is suitably controlled for saving electric energy consumption by the second electric motor.

(5) The engine starting control apparatus according to any one of the above-described modes (1)-(4), wherein the electrically controlled differential portion is provided with a differential limiting device configured to limit a differential function of the differential mechanism, and the engine-speed-rise control portion is configured to raise the operating speed of the engine by commanding the differential limiting device to limit the differential function of the differential mechanism.

In the above-described mode (5) of the invention, the operating speed of the engine is raised by commanding the differential limiting device of the differential mechanism to limit the differential function of the differential mechanism. This method of raising the engine speed permits less electric energy consumption by the first electric motor, than the method of raising the engine speed by operating the first electric motor, and the rise of the engine speed can be controlled more easily by limiting the differential function.

(6) The engine starting control apparatus according to the above-described mode (5), wherein the engine-speed-rise control portion is configured to command the second electric motor to generate a reaction torque against a resistance to a rotary motion of the engine, for raising the operating speed of the engine in the motor drive mode.

In the above-described mode (6) of the present invention, the engine-speed-rise control portion commands the second electric motor to generate the reaction torque against the resistance to the rotary motion of the engine, for raising the engine speed, thereby preventing a drop of an input shaft speed of the transmission portion due to the resistance to the rotary motion of the engine, and other adverse influences of the resistance on the shifting action of the transmission portion.

(7) The engine starting control apparatus according to the above-described mode (6), wherein the reaction torque generated by the second electric motor during the shifting action of the transmission portion is larger than that to be generated while the transmission portion is not in a shifting action.

The above-described mode (7) of this invention is based on a fact that the reaction torque to be generated by the second electric motor should be larger during the shifting action of the transmission portion during which the power transmitting path to the drive wheel of the hybrid vehicle through the transmission portion is disconnected or substantially disconnected so that the operating speed of the engine cannot be raised by a rotary motion of the drive wheel. In the present mode (4), the reaction torque generated by the second electric motor during the shifting action of the transmission portion is larger than that to be generated while the transmission portion is not in a shifting action. Accordingly, the reaction torque generated by the second electric motor is suitably controlled for saving electric energy consumption by the second electric motor.

(8) The engine starting control apparatus according to any one of the above-described modes (1)-(7), wherein the differential mechanism includes a planetary gear set.

In the above-described mode (8) of this invention wherein the differential mechanism includes a planetary gear set, an output speed of the electrically controlled differential portion can be continuously changed by controlling the operating state of the first electric motor, without changing the operating speed of the engine.

(9) The engine starting control apparatus according to any one of the above0-described modes (1)-(8), wherein the hybrid vehicle further includes a mechanism operable to disconnect or substantially disconnect a power transmitting path between the electrically controlled differential portion and the drive wheel, during the shifting action of the transmission portion.

In the above-described mode (9) of the present invention wherein the hybrid vehicle further includes the mechanism operable to disconnect or substantially disconnect the power transmitting path between the electrically controlled differential portion and the drive wheel, during the shifting action of the transmission portion, a starting shock of the engine which may be caused upon starting of the engine during the shifting action of the transmission portion is substantially prevented from being transmitted to the drive wheel, so that the vehicle occupants would not feel a considerable degree of the engine starting shock.

(10) The engine starting control apparatus according to any one of the above-described modes (1)-(9), further comprising an overlap control portion operable when a terminal portion of the shifting action of the transmission portion and a starting operation of the engine overlap each other, the overlap control portion being configured to start the engine after completion of the shifting action.

In the above-described mode (10) of the invention wherein the engine is started after completion of the shifting action of the transmission portion, a starting shock of the engine and a shifting shock of the transmission portion would not overlap each other, even if the engine is commanded to be started during the shifting action of the transmission portion, so that the vehicle occupants would not feel considerable degrees of those engine starting and shifting shocks.

(11) The engine starting control apparatus according to any one of the above-described modes (1)-(10), further comprising an engine-start control portion configured to change a moment of starting of the engine, on the basis of the operating speed of the engine upon generation of a command to start the engine during the shifting action of the transmission portion.

In the above-described mode (11) of the present invention wherein the moment of starting of the engine is changed on the basis of the operating speed of the engine upon generation of the engine starting command, the engine can be started at a suitable point of time according to the engine speed. For instance, the engine is started when its operating speed is raised to a value at which the engine can be started.

(12) The engine starting control apparatus according to any one of the above-described modes (1)-(11), further comprising an overlap control portion configured to change a moment of starting of the engine, so as to prevent overlapping between a terminal portion of the shifting action of the transmission portion and a starting operation of the engine.

In the above-described mode (12) of the invention wherein the moment of starting of the engine is changed so as to prevent overlapping between a terminal portion of the shifting action of the transmission portion and a starting operation of the engine, so that a starting shock of the engine and a shifting shock of the transmission portion would not overlap each other in the terminal portion of the shifting action, whereby the vehicle occupants would not feel considerable degrees of those engine starting and shifting shocks.

(13) The engine starting control apparatus according to any one of the above-described modes (1)-(12), wherein the electrically controlled differential portion is operable as a continuously-variable transmission by controlling an operating state of the first electric motor.

In the above-described mode (13) of this invention wherein the electrically controlled differential portion is operable as a continuously-variable transmission by controlling the operating state of the first electric motor, a vehicle drive torque generated by the electrically controlled differential portion can be smoothly changed. The electrically controlled differential portion may be switchable between an electrically controlled continuously-variable transmission the speed ratio of which is continuously variable, and a step-variable transmission the speed ration of which is variable in steps.

(14) The engine starting control apparatus according to any one of the above-described modes (1)-(13), wherein the transmission portion is a step-variable transmission portion a speed ratio of which is variable in steps.

In the above-described mode (14) of the invention wherein the transmission portion is a step-variable transmission portion a speed ratio of which is variable in steps, the speed ratio of the transmission portion can be changed over a comparatively wide range.

(15) The engine starting control apparatus according to any one of the above-described modes (1)-(14), wherein the engine-speed-rise control portion is configured not to raise the operating speed of the engine prior to a moment of generation of a command to start the engine, while the transmission portion is not in the shifting action in the motor drive mode.

In the above-described mode (15) of the present invention wherein the operating speed of the engine is not raised prior to the moment of generation of the engine starting command, the fuel economy of the hybrid vehicle is improved owing to the elimination of an unnecessary rise of the engine operating speed.

(16) The engine starting control apparatus according to any one of the above-described modes (1)-(15), further comprising an engine-start control portion operable when a terminal portion of the shifting action of the transmission portion and a starting operation of the engine do not overlap each other, the engine-start control portion being configured to start the engine during the shifting action of the transmission portion.

In the above-described mode (16) of this invention, the engine-start control portion starts the engine during the shifting action of the transmission portion if the terminal portion of the shifting action and the engine starting operation do not overlap each other, so that a starting shock of the engine and a shifting shock of the transmission portion would not overlap each other in the terminal portion of the shifting action, whereby the vehicle occupants would not feel considerable degrees of those engine starting and shifting shocks. Further, the output torque of the engine can be increased at an earlier point of time, than in the case where the engine is started only after completion of the shifting action of the transmission portion, so that an response of the engine with respect to an operation of an accelerator pedal by the vehicle operator is accordingly improved.

(17) The engine starting control apparatus according to the above-described mode (1), further comprising an engine-start control portion configured to determine a moment of starting of the engine on the basis of a degree of process of the shifting action of the transmission portion.

In the above-described mode (17) of the invention wherein the moment of starting of the engine is determined on the basis of a degree of process of the shifting action of the transmission portion, it is possible to prevent overlapping between the shifting shock of the transmission portion and the starting shock of the engine.

(18) The engine starting control apparatus according to the above-described mode (1), the engine-speed-rise control portion determines, on the basis of the operating speed of the second electric motor, the operating speed of the first electric motor or de-energization of the first electric motor.

In the above-described mode (18) of this invention, the operating speed of the second electric motor which is lower than the value at which the engine can be started is raised by an output of the first electric motor and the electrically controlled differential portion, and the thus raised speed is transmitted to the engine, so that the engine can be started irrespective of the operating speed of the second electric motor. Further, a determination as to whether the first electric motor should be held in the de-energized state or not is made on the basis of the operating speed of the second electric motor, so that the first electric motor is energized only when the energization of the first electric motor is needed, so that the electric energy consumption by the first electric motor can be saved.

(19) The engine starting control apparatus according to the above-described mode (18), wherein the differential mechanism includes a coupling device operable to transmit a drive force from the second electric motor to the engine.

In the above-described mode (19) of the present invention, the operating speed of the second electric motor can be lowered where the engine speed can be raised to the value not lower than the predetermined engine starting speed even when the operating speed of the second electric motor is lowered. Accordingly, the durability of the differential mechanism is improved.

BRIEF DESCRIPTION OF THE DRAWINGS

The above and other objects, features, advantages and technical and industrial significance of this invention will be better understood by reading the following detailed description of preferred embodiments of the invention, when considered in connection with the following drawings, in which.

DETAILED DESCRIPTION OF PREFERRED EMBODIMENT

First Embodiment

Figures 1, 2:
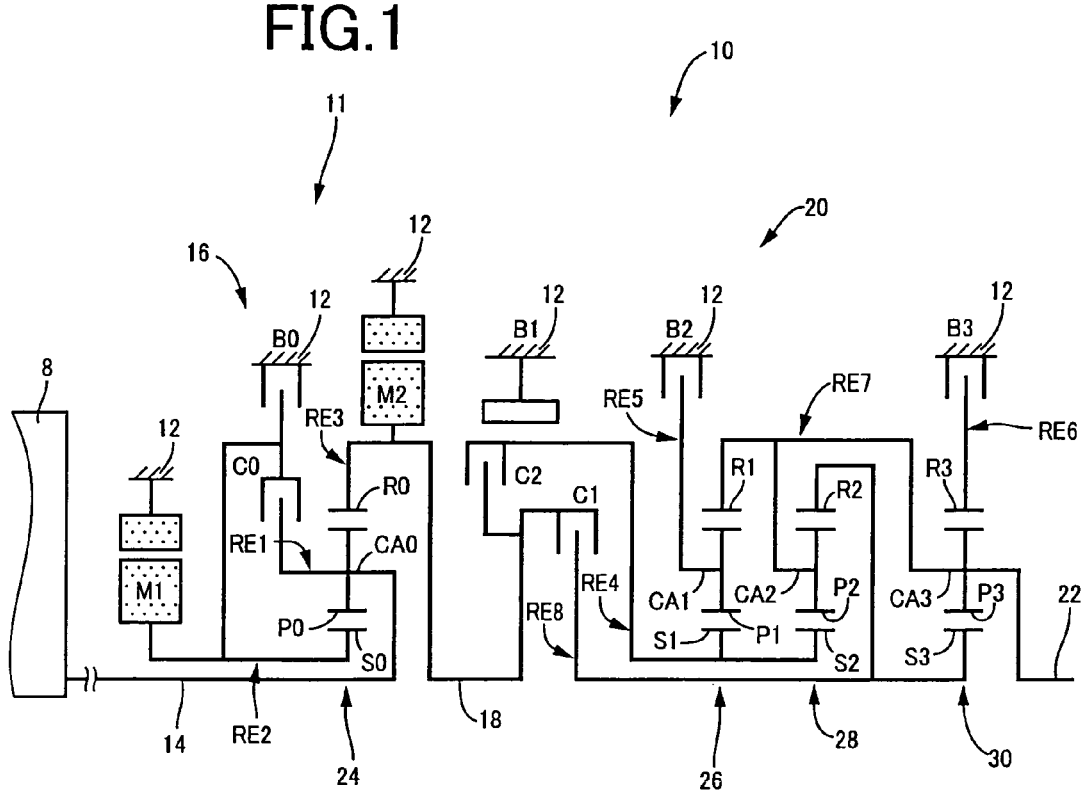
FIG. 1 is a schematic view showing an arrangement of a drive system of a hybrid vehicle to which the present invention is applicable.
FIG. 2 is a table indicating shifting actions of the hybrid vehicle drive system of FIG. 1, which is operable in a selected one of a continuously-variable shifting state and a step-variable shifting state, in relation to different combinations of operating states of hydraulically operated frictional coupling devices to effect the respective shifting actions.
Figure 5:
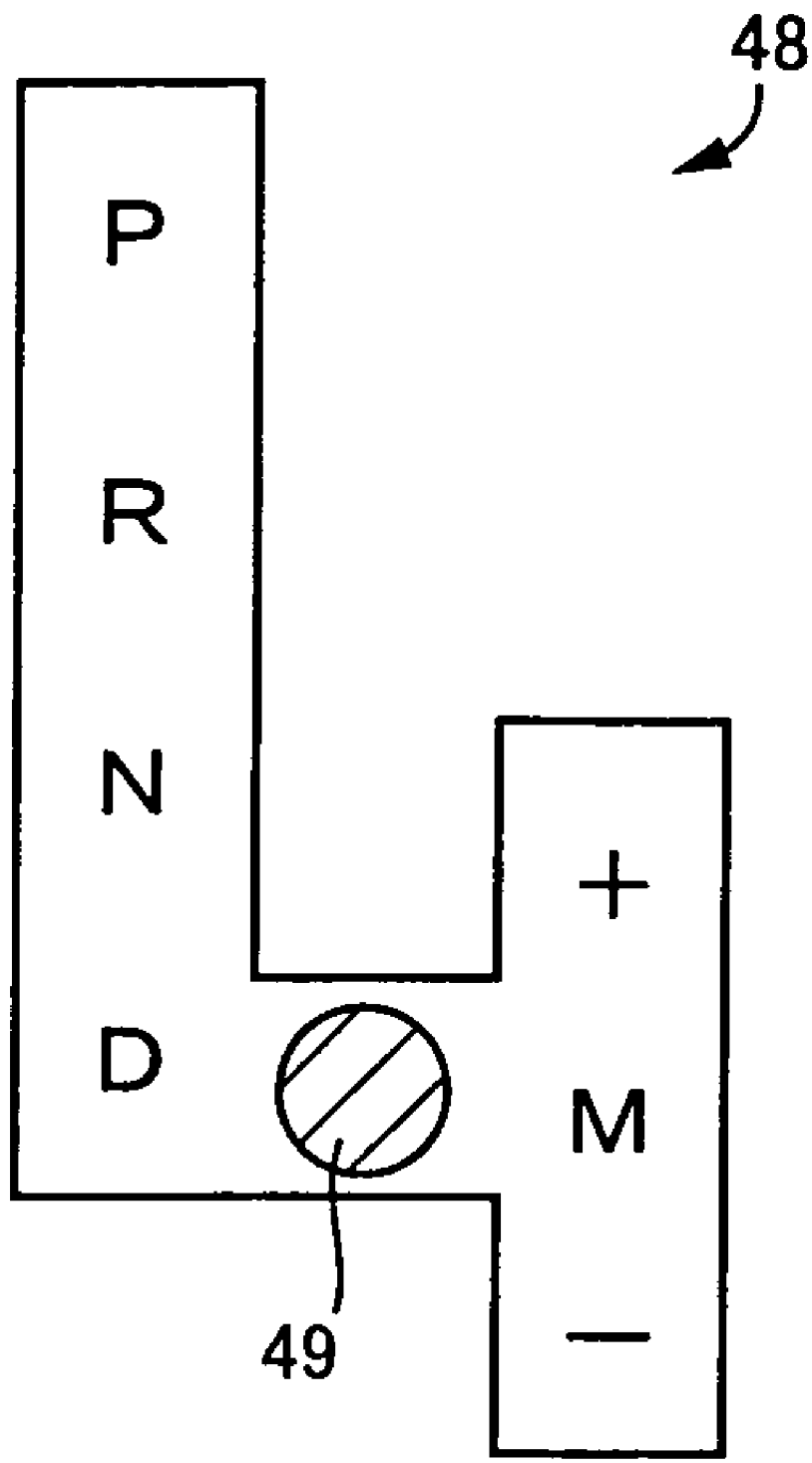
FIG. 5 is a manually operable shifting device including a shift lever having a plurality of shift positions.

Referring to the schematic view of FIG. 1, there is shown a transmission mechanism 10 constituting a part of a drive system for a hybrid vehicle, which drive system is controlled by a control apparatus according to one embodiment of this invention. In FIG. 1, the transmission mechanism 10 includes: an input rotary member in the form of an input shaft 14; a differential portion 11 connected to the input shaft 14 either directly, or indirectly via a pulsation absorbing damper (vibration damping device) not shown; a step-variable or multiple-step transmission portion in the form of an automatic transmission portion 20 disposed between the differential portion 11 and drive wheels 38 (shown in FIG. 6) of the vehicle, and connected in series via a power transmitting member 18 (power transmitting shaft) to the differential portion 11 and the drive wheels 38; and an output rotary member in the form of an output shaft 22 connected to the automatic transmission portion 20. The input shaft 12, differential portion 11, automatic transmission portion 20 and output shaft 22 are coaxially disposed on a common axis in a casing 12 (hereinafter referred to as casing 12) functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device 36 (final speed reduction gear) and a pair of drive axles, as shown in FIG. 5. The engine 8 may be a gasoline engine or diesel engine and functions as a vehicle drive power source directly connected to the input shaft 14 or indirectly via a pulsation absorbing damper.

In the present transmission mechanism 10, the engine 8 and the differential portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in FIG. 1. This is also true to the other embodiments of the invention described below.

The differential portion 11 can be referred to as an electrically controlled differential portion, in a sense that the differential state of the differential portion 11 is changed by utilizing a first electric motor M1 (which will be described). This differential portion 11 provided with the first electric motor M1 is further provided with; a power distributing mechanism 16 functioning as a differential mechanism operable to mechanically distribute an output of the engine 8 received by the input shaft 14, to the first electric motor M1 and the power transmitting member 18; and a second electric motor M2 which is rotated with the output shaft 22. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a planetary gear set 24 of a single pinion type having a gear ratio $\rho 0$ of about 0.418, for example, a switching clutch C0 and a switching brake B1. The planetary gear set 24 of the power distributing mechanism 16 has rotary elements consisting of: a sun gear S0, a planetary gear P0; a first carrier CA0 supporting the planetary gear P0 such that the planetary gear P0 is rotatable about its axis and about the axis of the sun gear S0; and a ring gear R0 meshing with the sun gear S0 through the planetary gear P0. Where the numbers of teeth of the sun gear S0 and the ring gear R0 are represented by ZS0 and ZR0, respectively, the above-indicated gear ratio $\rho 0$ is represented by ZS0/ZR0.

In the power distributing mechanism 16, the carrier CA0 is connected to the input shaft 14, that is, to the engine 8, and the sun gear S0 is connected to the first electric motor M1, while the ring gear R0 is connected to the power transmitting member 18. The switching brake B0 is disposed between the sun gear S0 and the casing 12, and the switching clutch C0 is disposed between the sun gear S0 and the carrier CA0. When the switching clutch C0 and brake B0 are both released, the power distributing mechanism 16 is placed in a differential state in which three elements of the first planetary gear set 24 consisting of the sun gear S0, carrier CA0 and ring gear R0 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the power distributing mechanism 16 is placed in the continuously-variable shifting state (electrically established CVT state), in which the rotating speed of the power transmitting member 18 is continuously variable, irrespective of the rotating speed of the engine 8, namely, placed in the differential state in which a speed ratio $\gamma 0$ (rotating speed of the input shaft 14/rotating speed of the power transmitting member 18) of the power distributing mechanism 16 is continuously changed from a minimum value $\gamma 0 min$ to a maximum value $\gamma 0 max$, that is, in the continuously-variable shifting state in which the power distributing mechanism 16 functions as an electrically controlled continuously variable transmission the speed ratio $\gamma 0$ of which is continuously variable from the minimum value $\gamma 0 min$ to the maximum value $\gamma 0 max$.

When the switching clutch C0 or brake B0 is engaged while the power distributing mechanism 16 is placed in the continuously-variable shifting state, the power distributing mechanism 16 is brought into a locked state or non-differential state in which the differential function is not available. Described in detail, when the switching clutch C0 is engaged, the sun gear S0 and the carrier CA0 are connected together, so that the power distributing mechanism 16 is placed in the locked state in which the three rotary elements of the planetary gear set 24 consisting of the first sun gear S1, first carrier CA0 and ring gear R0 are rotatable as a unit, namely, placed in a first non-differential state in which the differential function is not available, so that the differential portion 11 is also placed in a non-differential state. In this non-differential state, the rotating speed of the engine 8 and the rotating speed of the power transmitting member 18 are made equal to each other, so that the differential portion 11 (power distributing mechanism 16) is placed in a fixed-speed-ratio shifting state or step-variable shifting state in which the mechanism 16 functions as a transmission having a fixed speed ratio $\gamma 0$ equal to 1. When the switching brake B0 is engaged in place of the switching clutch C0, the sun gear S0 is fixed to the casing 12, so that the power distributing mechanism 16 is placed in the locked state in which the sun gear S0 is not rotatable, namely, placed in a second non-differential state in which the differential function is not available, so that the differential portion 11 is also placed in the non-differential state. Since the rotating speed of the first ring gear R1 is made higher than that of the carrier CA0, the differential portion 11 is placed in the fixed-speed-ratio shifting state or step-variable shifting state in which differential portion 11 (the power distributing mechanism 16) functions as a speed-increasing transmission having a fixed speed ratio $\gamma 0$ smaller than 1, for example, about 0.7.

Thus, the frictional coupling devices in the form of the switching clutch C0 and brake B0 function as a differential-state switching device operable to selectively switch the differential portion 11 (power distributing mechanism 16) between the differential state (namely, non-locked state) and the non-differential state (namely, locked state), that is, between the continuously-variable shifting state in which the differential portion 11 (the power distributing mechanism 16) is operable as an electrically controlled continuously variable transmission the speed ratio of which is continuously variable, and the locked state in which the differential portion 11 is not operable as the electrically controlled continuously variable transmission capable of performing a continuously-variable shifting operation, and in which the speed ratio of the transmission portion 11 is held fixed, namely, the fixed-speed-ratio shifting state (non-differential state) in which the transmission portion 11 is operable as a transmission having a single gear position with one speed ratio or a plurality of gear positions with respective speed ratios, namely, the fixed-speed-ratio shifting state in which the transmission portion 11 is operated as a transmission having a single gear position with one speed ratio or a plurality of gear positions with respective speed ratios. The switching clutch C0 and switching brake B0, which are operable to switch the shifting state of the differential portion 11 (power distributing mechanism 16) to the locked state, can be considered to be a differential limiting device.

The automatic transmission portion 20 can be referred to as a transmission portion, in a sense that the automatic transmission portion 20 is mechanically shifted. This automatic transmission portion 20 includes a single-pinion type first planetary gear set 26, a single-pinion type second planetary gear set 28 and a single-pinion type third planetary gear set 30. The second planetary gear set 26 has: a first sun gear S1; a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. For example, the first planetary gear set 26 has a gear ratio $\rho 1$ of about 0.562. The second planetary gear set 28 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 28 has a gear ratio $\rho 2$ of about 0.425. The third planetary gear set 30 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 30 has a gear ratio $\rho 3$ of about 0.421. Where the numbers of teeth of the first sun gear S1, firs ring gear R1, second sun gear S2, second ring gear R2, third sun gear S3 and third ring gear R3 are represented by ZS1, ZR1, ZS1, ZR2, ZS3 and ZR3, respectively, the above-indicated gear ratios $\rho 1$, $\rho 2$ and $\rho 3$ are represented by ZS1/ZR1. ZS2/ZR2, and ZS3/ZR3, respectively.

In the automatic transmission portion 20, the first sun gear S1 and the second sun gear S2 are integrally fixed to each other as a unit, selectively connected to the power transmitting member 18 through a second clutch C2, and selectively fixed to the casing 12 through a first brake B1. The first carrier CA1 is selectively fixed to the casing 12 through a second brake B2, and the third ring gear R3 is selectively fixed to the casing 12 through a third brake B3. The first ring gear R1, second carrier CA2 and third carrier CA3 are integrally fixed to each other and fixed to the output shaft 22. The second ring gear R2 and the third sun gear S3 are integrally fixed to each other and selectively connected to the power transmitting member 18 through a first clutch C1. Thus, the automatic transmission portion 20 and the power transmitting member 18 are selectively connected to each other through the first clutch C1 or the second clutch C2, which is provided to shift the automatic transmission portion 20. In other words, the first clutch C1 and the second clutch C2 function as a coupling device operable to place a power transmitting path between the power transmitting member 18 and the automatic transmission portion 20, that is, between the differential portion 11 (power transmitting member 18) and the drive wheels 38, selectively in one of a power transmitting state in which a vehicle drive force can be transmitted through the power transmitting path, and a power cut-off state in which the vehicle drive force cannot be transmitted through the power transmitting path. Described more specifically, the above-indicated power transmitting path is placed in the power transmitting state when at least one of the first clutch C1 and the second clutch C2 is placed in the engaged state, and is placed in the power cut-off state when the first clutch C1 and the second clutch C2 are placed in the released state.

The above-described switching clutch C0, first clutch C1, second clutch C2, switching brake B0, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

The transmission mechanism 10 constructed as described above is placed in a selected one of a first gear position (first speed position) through a fifth gear position (fifth speed position), a reverse gear position (rear drive position) and a neural position, by engaging actions of a corresponding combination of the two frictional coupling devices selected from the above-described switching clutch C0, first clutch C1, second clutch C2, switching brake B0, first brake B1, second brake B2 and third brake B3, as indicated in the table of FIG. 2. The above-indicated positions have respective speed ratios $\gamma T$ (input shaft speed $N_{IN}$/output shaft, speed $N_{OUT}$) which change as geometric series. The power distributing mechanism 16 is provided with the switching clutch C0 and the switching brake B0 one of which is engaged to place the differential portion 11 in the continuously-variable shifting state in which the differential portion 11 is operable as a continuously variable transmission, or in the step-variable shifting state (fixed-speed-ratio shifting state) in which the differential portion 11 is operable as a step-variable transmission having a fixed speed ratio or ratios. In the present transmission mechanism 10, therefore, the differential portion 11 placed in the fixed-speed-ratio shifting state by the engaging action of one of the switching clutch C0 and switching brake B0 cooperates with the automatic transmission portion 20 to constitute a step-variable transmission device, while the differential portion 11 placed in the continuously-variable shifting state with the switching clutch C0 and switching brake B0 being both held in the released state cooperates with the automatic transmission portion 20 to constitute an electrically controlled continuously variable transmission device. In other words, the transmission mechanism 10 is placed in its step-variable shifting state by engaging one of the switching clutch C0 and switching brake B9, and in its continuously-variable shifting state by releasing both of the switching clutch C0 and switching brake B0. Similarly, the differential portion 11 is selectively placed in one of its step-variable and continuously-variable shifting states.

Where the transmission mechanism 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0, first clutch C1 and second brake B2, as indicated in FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0.705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. The neutral position N is establishing by releasing all of the clutches C0, C1, C2 and brakes B0, B1, B2, B2. Since the automatic transmission portion 20 is shifted by concurrent engaging and releasing actions of two selected ones of the clutches C and brakes B, the power transmitting path through the automatic transmission portion 20 is disconnected or substantially disconnected during a shifting action of the automatic transmission portion 20, so that the output shaft 22 and the differential portion 11 are disconnected or substantially disconnected from each other.

Where the transmission mechanism 10 functions as the continuously-variable transmission with the differential portion 11 placed in its continuously-variable shifting state, on the other hand, the switching clutch C0 and the switching brake B0 indicated in FIG. 2 are both released, so that the differential portion 11 functions as the continuously variable transmission, while the automatic transmission portion 20 connected in series to the differential portion 11 functions as the step-variable transmission, whereby the speed of the rotary motion transmitted to the automatic transmission portion 20 placed in a selected gear position M, namely, the rotating speed of the power transmitting member 18 is continuously changed, so that the speed ratio of the drive system when the automatic transmission portion 20 is placed in the selected gear position M is continuously variable over a predetermined range. Accordingly, the overall speed ratio γT of the transmission mechanism 10 determined by the speed ratio γ0 of the differential portion 11 and the speed ratio γ of the automatic transmission portion 20 is continuously variable.

Figure 3:
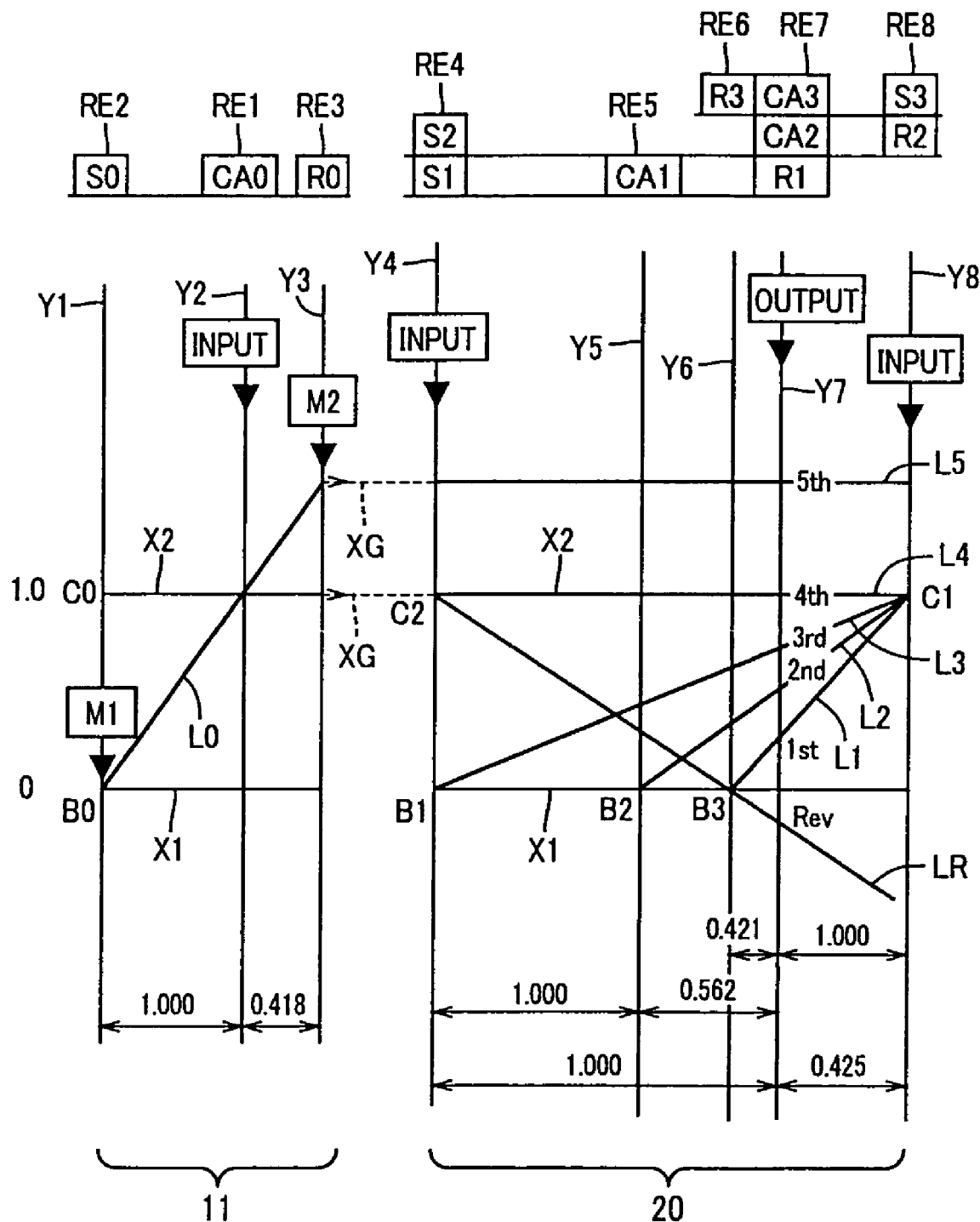
FIG. 3 is a collinear chart indicating relative rotating speeds of the hybrid vehicle drive system of FIG. 1 operated in the step-variable shifting state, in different gear positions of the drive system.

The collinear chart of FIG. 3 indicates, by straight lines, a relationship among the rotating speeds of the rotary elements in each of the gear positions of the transmission mechanism 10, which is constituted by the differential portion 11 functioning as the continuously-variable shifting portion or first shifting portion, and the automatic transmission portion 20 functioning as the step-variable shifting portion (automatic transmission portion) or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the automatic transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (first carrier CA0) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the casing 12 through the switching brake B0, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

When the transmission mechanism 10 is brought into the continuously-variable shifting state (differential state) by releasing actions of the switching clutch C0 and brake B0, for instance, the rotating speed of the sun gear S0 represented by a point of intersection between the straight line L0 and the vertical line Y1 is raised or lowered by controlling the operating speed of the first electric motor M1, so that the rotating speed of the carrier CA0 represented by the straight line L0 and the vertical line Y2 is raised or lowered, if the rotating speed of the ring gear R0 determined by the vehicle speed V and represented by a point of intersection between the straight line L0 and the vertical line Y3 is substantially held constant. When the switching clutch C0 is engaged, the sun gear S0 and the carrier CA0 are connected to each other, and the power distributing mechanism 16 is placed in the first non-differential state in which the above-indicated three rotary elements RE1, RE2, RE3 are rotated as a unit, so that the straight line L0 is aligned with the horizontal line X2, so that the power transmitting member 18 is rotated at a speed equal to the engine speed NE. When the switching brake B0 is engaged, on the other hand, the sun gear S0 is fixed to the casing 12, and the power distributing mechanism 16 is placed in the second non-differential state in which the power distributing mechanism 16 functions as a speed-increasing mechanism, so that the straight line L0 is inclined in the state indicated in FIG. 3, whereby the rotating speed of the ring gear R0 represented by a point of intersection between the straight lines L0 and Y3, that is, the rotating speed of the power transmitting member 18 is made higher than the engine speed NE and transmitted to the automatic transmission portion 20.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22 and the second electric motor M2, while the eighth rotary element RE8 is selectively connected to the power transmitting member 18 through the first clutch C1.

When the first clutch C1 and the third brake B3 are engaged, the automatic transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed NE, with the drive force received from the differential portion 11, that is, from the power distributing mechanism 16. When the switching clutch B0 is engaged in place of the switching clutch C0, the eighth rotary element RE8 is rotated at a speed higher than the engine speed NE, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
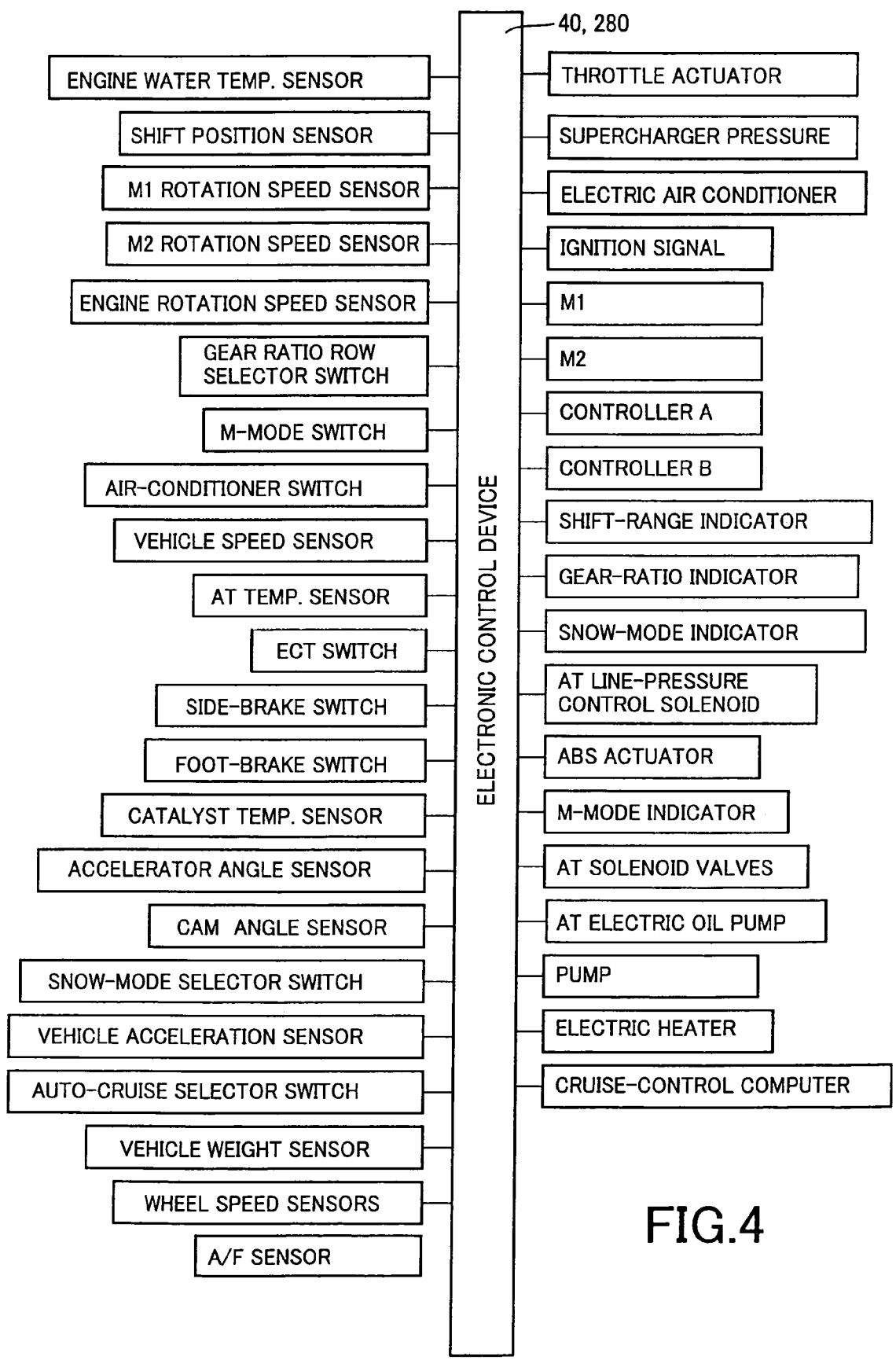
FIG. 4 is a view indicating input and output signals of an engine starting control apparatus in the form of an electronic control device according to one embodiment of this invention to control the drive system of FIG. 1.

FIG. 4 indicates signals received by an electronic control device 40 which provided to control transmission mechanism 10 constituting a part of the vehicular drive system and which functions as an engine starting control apparatus constructed according to the present embodiment of the invention. FIG. 4 also indicates signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the automatic transmission portion 20.

The electronic control device 40 is arranged to receive various sensors and switches shown in FIG. 4, various signals such as: a signal indicative of a temperature $TEMP_W$ of cooling water of the engine 8; a signal indicative of a selected operating position $P_{SH}$ of a shift lever 49 (shown in FIG. 5) detected by a shift position sensor 44 (shown in FIG. 6); a signal indicative of an operating speed $N_{M1}$ of the first electric motor M1 (hereinafter referred to as "first electric motor speed $N_{M1}$"); a signal indicative of an operating speed $N_{M2}$ of the second electric motor M2 (hereinafter referred to as "second electric motor speed $N_{M2}$"); a signal indicative of the operating speed $N_E$ of the engine 8 detected by an engine speed sensor 46 (shown in FIG. 6); a signal indicative of a value indicating gear ratios of a selected group of forward-drive positions of the transmission mechanism 10; a signal indicative of an M mode (manual shifting drive mode); a signal indicative of an operated state of an air conditioner; a signal indicative of a vehicle speed V corresponding to the rotating speed $N_{OUT}$ of the output shaft 22; a signal indicative of a temperature of a working oil of the automatic transmission portion 20; a signal indicative of an operated state of a side brake; a signal indicative of an operated state of a foot brake; a signal indicative of a temperature of a catalyst; a signal indicative of an amount of operation (an angle of operation) $A_{CC}$ of a manually operable vehicle accelerating member in the form of an accelerator pedal; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the drive wheels of the vehicle; and a signal indicative of an air/fuel (A/F) ratio of an air-fuel mixture of the engine 8.

The electronic control device 40 is further arranged to generate various signals such as: control signals to be applied to an engine output control device 43 (shown in FIG. 6) to control the output of the engine 8, such as a drive signal to drive a throttle actuator 97 for controlling an angle of opening $\theta_{TH}$ of an electronic throttle valve 96 disposed in an intake pipe 95 of the engine 8, a signal to control an amount of injection of a fuel by a fuel injecting device 98 into the suction pipe 95 or cylinders of the engine 8, a signal to be applied to an ignition device 99 to control the ignition timing of the engine 8, and a signal to adjust a supercharger pressure of the engine 8; a signal to operate the electric air conditioner; signals to operate the electric motors M1 and M2; a signal to operate a shift-range indicator for indicating the selected operating or shift position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 (shown in FIG. 5) provided to control the hydraulic actuators of the hydraulically operated frictional coupling devices of the differential portion 11 and automatic transmission portion 20; a signal to operate an electric oil pump used as a hydraulic pressure source for the hydraulic control unit 42; a signal to drive an electric heater; and a signal to be applied to a cruise-control computer.

FIG. 5 shows an example of a manually operable shifting device in the form of a shifting device 48. The shifting device 48 includes the above-described shift lever 49, which is disposed laterally adjacent to an operator's seat, for example, and which is manually operated to select one of the plurality of shift positions $P_{SH}$.

The shift positions $P_{SH}$ consist of a parking position P for placing the transmission mechanism 10 (more precisely, the automatic transmission portion 20) in a neutral state in which the power transmitting path is disconnected and in which the output shaft 22 of the automatic transmission portion 20 is locked; a reverse R for driving the vehicle in the rearward direction; a neutral position N for placing the transmission mechanism 10 in the neutral state; an automatic forward-drive shifting position D; and a manual forward-drive shifting position M. When the shift lever 49 is operated to the automatic forward-drive shifting position D, the transmission mechanism 10 is placed in an automatic shifting mode in which the overall speed ratio γT is automatically changed and is defined by the continuously variable speed ratio of the differential portion 11 and the speed ratio of an automatically selected one of the first through fifth gear positions of the automatic transmission portion 20. When the shift lever 49 is operated to the manual forward-drive shifting position M, the transmission mechanism 10 is placed in a manual shifting mode in which the highest gear position to which the automatic transmission portion 20 is automatically shiftable can be selected by operating the shift lever 49 from the manual forward-drive shifting position M to a position "+" or a position "−". That is, the automatically selectable gear positions of the automatic transmission portion 20 can be selected in the manual shifting mode.

When the shift lever 49 is operated to a selected one of the shift positions $P_{SH}$, the hydraulic control unit 42 is electrically switched to establish one of the reverse-drive position R, neutral position N and first through fifth gear positions that are indicated in the table of FIG. 2.

The above-indicated parking position P and the neutral position N of the shift lever 49 are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power cut-off state established by releasing both of the clutches C1 and C2, as shown in the table of FIG. 2. In the drive positions R, D, M, the power transmitting path in the automatic transmission portion 20 is in the power transmitting state established by engaging at least one of the clutches C1 and C2, as also shown in the table of FIG. 2.

Described in detail, a manual operation of the shift lever 49 from the parking position P or neutral position N to the reverse-drive position R causes the second clutch C2 to be engaged for switching the power transmitting path in the automatic transmission portion 20 from the power cut-off state to the power transmitting state. A manual operation of the shift lever 49 from the neutral position N to the automatic forward-drive position D causes at least the first clutch C1 to be engaged for switching the power transmitting path in the automatic transmission portion 20 from the power-cut-off state to the power transmitting state. Further, a manual operation of the shift lever 49 from the reverse-drive position R to the parking position P or neutral position N causes the second clutch C2 to be released for switching the power transmitting path in the automatic transmission portion 20 from the power transmitting state to the power cut-off state. A manual operation of the shift lever 49 from the automatic forward-drive shifting position D to the neutral position N causes the first and second clutches C1, C2 to be released for switching the power transmitting path in the automatic transmission portion 20 from the power transmitting state to the power cut-off state.

Figure 6:
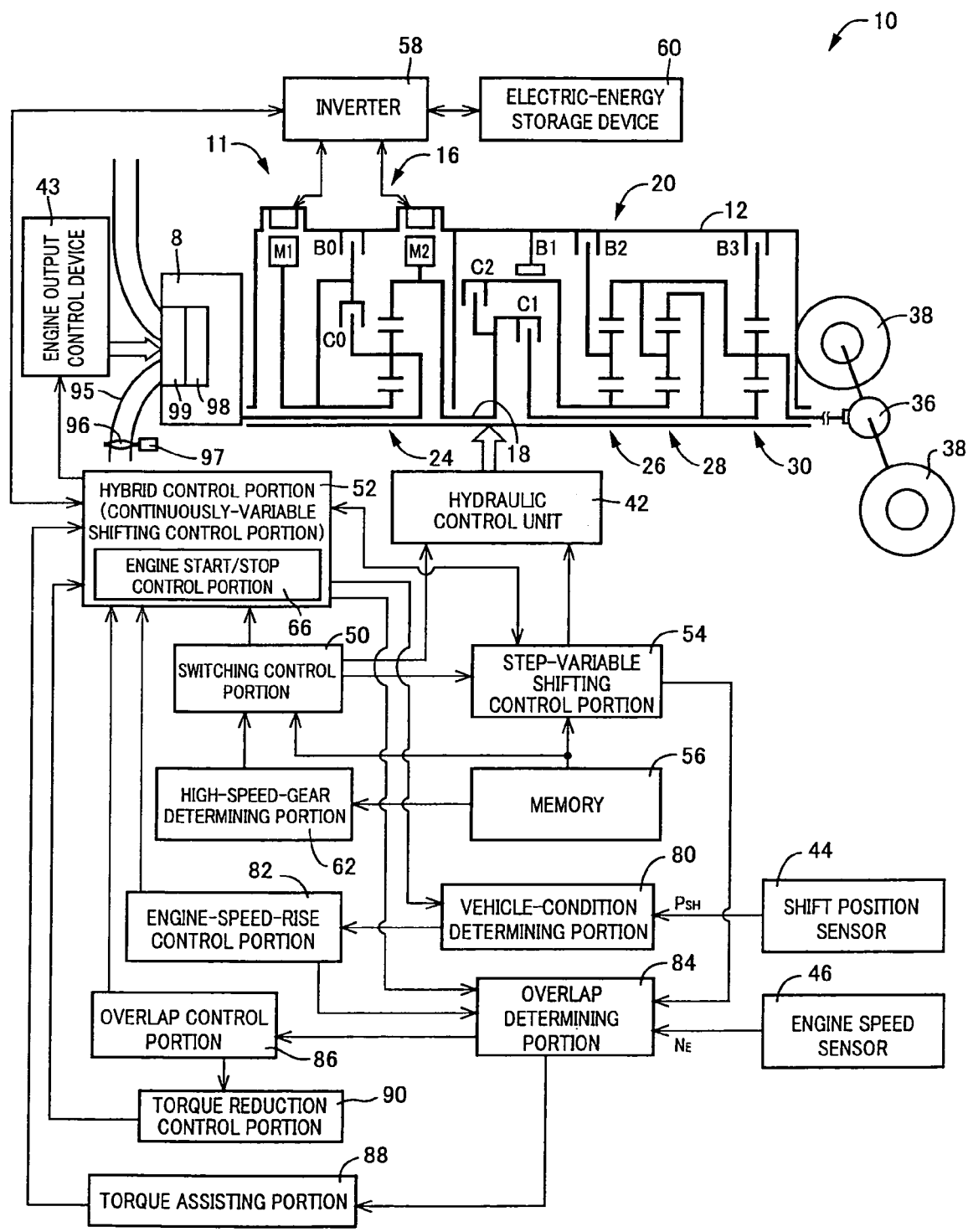
FIG. 6 is a functional block diagram illustrating major control functions of the electronic control device of FIG. 4.

FIG. 6 is a functional block diagram for explaining major control functions of the electronic control device 40, which includes a switching control portion 50, a hybrid control portion 52 (a continuously-variable shifting control portion), a step-variable shifting control portion 54, a memory 56, a high-speed-gear determining portion 62, a vehicle-condition determining portion 80, an engine-speed-rise control portion 82, an overlap determining portion 84, an overlap control portion 86, a torque assisting portion 88 and a torque reduction control portion 90. The step-variable shifting control portion 54 is arranged to determine whether a shifting action of the automatic transmission portion 20 should take place, that is, to determine the gear position to which the automatic transmission portion 20 should be shifted. This determination is made on the basis of a condition of the vehicle in the form of the vehicle speed V and an output torque $T_{OUT}$ of the automatic transmission portion 20, and according to a shifting boundary line map (shifting control map or relation) which is stored in the memory 56 and which represents shift-up boundary lines indicated by solid lines in FIG. 7 and shift-down boundary lines indicated by one-dot chain lines in FIG. 7. The step-variable shifting control portion 54 generates commands (shifting commands or hydraulic control command) to be applied to the hydraulic control unit 42, to selectively engage and release the respective two hydraulically operated frictional coupling devices (except the switching clutch C0 and brake B0), for establishing the determined gear position of the automatic transmission portion 20 according to the table of FIG. 2. Described in detail, the step-variable shifting control portion 54 commands the hydraulic control unit 42 to control the solenoid-operated valves incorporated in the hydraulic control unit 42, for activating the appropriate hydraulic actuators to concurrently engage one of the two frictional coupling device and release the other frictional coupling device, to effect the clutch-to-clutch shifting actions of the automatic transmission portion 20.

The hybrid control portion 52 functions as the continuously-variable shifting control portion and is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 11 operating as the electrically controlled continuously variable transmission, while the transmission mechanism 10 is placed in the continuously-variable shifting state, that is, while the differential portion 11 is placed in the differential state. For instance, the hybrid control portion 52 calculates a target (required) vehicle output at the present running speed V of the vehicle, on the basis of the operating amount $A_{CC}$ of the accelerator pedal 46 used as an operator's required vehicle output and the vehicle running speed V, and calculate a target total vehicle output on the basis of the calculated target vehicle output and a required amount of generation of an electric energy by the first electric motor M1. The hybrid control portion 52 calculates a target output of the engine 8 to obtain the calculated target total vehicle output, while taking account of a power transmission loss, a load acting on various devices of the vehicle, an assisting torque generated by the second electric motor M2, etc. The hybrid control portion 52 controls the speed $N_E$ and torque $T_E$ of the engine 8, so as to obtain the calculated target engine output, and the amount of generation of the electric energy by the first electric motor M1.

The hybrid control portion 52 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electrically controlled continuously-variable transmission, for optimum coordination of the engine speed $N_E$ and for efficient operation of the engine 8, and the rotating speed of the power transmitting member 18 determined by the vehicle speed V and the selected gear position of the transmission portion 20. That is, the hybrid control portion 52 determines a target value of the overall speed ratio γT of the transmission mechanism 10, so that the engine 8 is operated according to a stored highest-fuel-economy curve (fuel-economy map or relation) stored in memory means. The target value of the overall speed ratio γT of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control portion 52 controls the speed ratio γ0 of the differential portion 11, so as to obtain the target value of the overall speed ratio γT, so that the overall speed ratio γT can be controlled within a predetermined range, for example, between 13 and 0.5.

In the hybrid control, the hybrid control portion 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the output shaft 22. Thus, the drive system is provided with an electric path through which an electric energy generated by conversion of a portion of a drive force of the engine 8 is converted into a mechanical energy.

The hybrid control portion 52 includes engine output control means functioning to control the engine 8, so as to provide a required output, by controlling the throttle actuator 97 to open and close the electronic throttle valve 96, and controlling an amount and time of fuel injection by the fuel injecting device 98 into the engine 8, and/or the timing of ignition of the igniter by the ignition device 99, alone or in combination. For instance, the hybrid control portion 52 is basically arranged to control the throttle actuator 97 on the basis of the operating amount $A_{CC}$ of the accelerator pedal (manually operable vehicle accelerating member) and according to a predetermined stored relationship (not shown) between the operating amount $A_{CC}$ and the opening angle $\theta_{TH}$ of the electronic throttle valve 96 such that the opening angle $\theta_{TH}$ increases with an increase of the operating amount $A_{CC}$.

Figure 7:
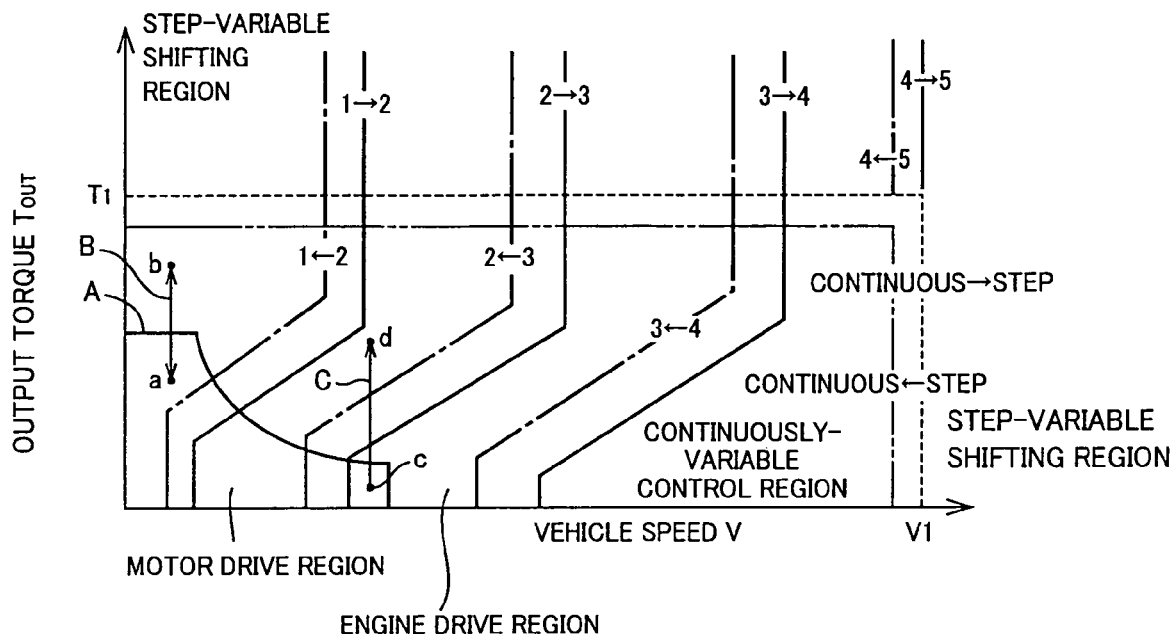
FIG. 7 is a view illustrating an example of a stored shifting boundary line map used for determining a shifting action of an automatic transmission portion, an example of a stored switching boundary line map used for switching the shifting state of a transmission mechanism of the drive system, and an example of a stored drive-power-source switching boundary line map defining boundary lines between an engine drive region and a motor drive region for switching between an engine drive mode and a motor drive mode, in the same two-dimensional coordinate system defined by control parameters in the form of a running speed and an output torque of the vehicle, such that those maps are related to each other.

Solid line A in FIG. 7 represents an example of a boundary line defining an engine-drive region and a motor-drive region, for switching the vehicle drive power source for starting and driving the vehicle, between the engine 8 and the second electric motor M2. In other words, the vehicle drive mode is switchable between an "engine drive mode" corresponding to the engine-drive region in which the vehicle is started and driven with the engine 8 used as the vehicle drive power source, and the "motor drive mode" corresponding to the motor-drive region in which the vehicle is driven with the second electric motor M2 used as the vehicle drive power source. A predetermined stored relationship representing the boundary line (solid line A) of FIG. 7 for switching between the engine drive mode and the motor drive mode is an example of a drive-power-source switching boundary line map (drive-power-source map) in a two-dimensional coordinate system defined by control parameters in the form of the vehicle speed V and a drive-force-related value in the form of the output torque $T_{OUT}$. This drive-power-source switching boundary line map is stored in the memory 56, together with the shifting boundary line map (shifting map) indicated by solid lines and one-dot chain lines in FIG. 7.

The hybrid control portion 52 determines whether the vehicle condition is in the motor-drive region or engine-drive region, and establishes the motor drive mode or engine drive mode. This determination is made on the basis of the vehicle condition represented by the vehicle speed V and the required output torque $T_{OUT}$, and according to the drive-power-source switching boundary line map of FIG. 7. As is understood from FIG. 7, the motor drive mode is generally established by the hybrid control portion 52, when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low.

For reducing a dragging of the engine 8 in its non-operated state and improving the fuel economy in the motor drive mode, the hybrid control portion 52 is arranged to hold the engine speed $N_E$ at zero or substantially zero as needed, owing to the electric CVT function (differential function) of the differential portion 11, that is, by controlling the differential portion 11 to perform its electric CVT function (differential function), so that the first electric motor speed 1 is controlled so as to be freely rotated to have a negative speed $N_{M1}$.

The hybrid control portion 52 is further arranged to switch the engine 8 between its operated state and non-operated states, for switching the vehicle drive mode between the engine drive mode and the motor drive mode. To this end, the hybrid control portion 52 includes an engine start/stop control portion 66. This engine start/stop control portion 66 is configured to start or stop the engine 8, according to one of the motor drive mode and the engine drive mode which is selected by the hybrid control portion 52 on the basis of the vehicle condition and according to the drive-power-source switching boundary line map indicated in FIG. 6 by way of example.

For instance, the engine start/stop control portion 66 energizes the first electric motor M1 to raise the first electric motor speed $N_{M1}$, that is, operates the first electric motor M1 to function as an engine starter to raise the engine speed $N_E$ to a suitable value $N_E{'}$ at which the engine 8 can be started by ignition by the ignition device 99, when the vehicle condition is changed from a point "a" to a point "b" as indicated by solid line in FIG. 6, namely, from the motor drive region to the engine drive region, as a result of an increase of the required output torque $T_{OUT}$ by depression of the accelerator pedal. Thus, the vehicle drive mode is changed from the motor drive mode to the engine drive mode. In this case, the engine start/stop control portion 66 may rapidly raise the first electric motor speed $N_{M1}$ to rapidly raise the engine speed $N_E$ to the suitable value $N_E{'}$, for preventing resonance vibration of the engine 8 which would take place upon its starting at a speed lower than an idling speed $N_{EID}$, as well known in the art.

When the vehicle condition is changed from the point "b" to the point "a" as indicated by the solid line in FIG. 7, namely, from the engine drive region to the motor drive region, as a result of a decrease of the required output torque $T_{OUT}$ by releasing of the accelerator pedal, on the other hand, the engine start/stop control portion 66 commands the fuel injecting device 98 to stop a supply of the fuel to the engine 8, that is, to implement a fuel cut of the engine 8, so that the vehicle drive mode is changed from the engine drive mode to the motor drive mode. In this case, the engine start/stop control portion 66 may rapidly lower the first electric motor speed $N_{M1}$ to rapidly lower the engine speed $N_E$ to zero or substantially zero, for preventing the above-indicated resonance vibration. Alternatively, the engine start/stop control portion 66 may lowers the first electric motor speed $N_{M1}$ to lower the engine speed $N_E$ prior to the fuel cut of the engine 8, such that the fuel cut is implemented at the predetermined engine speed $N_E{'}$, to stop the engine 8.

The hybrid control portion 52 is further capable of performing a so-called "drive-force assisting" operation (torque assisting operation) to assist the engine 8, by supplying the second electric motor M2 with an electric energy from the first electric motor M1 or the electric-energy storage device 60 to the second electric motor M2, so that the second electric motor M2 is operated to transmit a drive torque to the drive wheels 38. Thus, the second electric motor M2 may be used in addition to the engine 8, in the engine drive mode.

The hybrid control portion 52 is arranged to hold the engine 8 in an operated state owing to the electric CVT function of the differential portion 11, irrespective of whether the vehicle is stationary or running at a relatively low speed. When the first electric motor M1 is required to be operated to charge the electric-energy storage device 60 while the vehicle is stationary, in order to charge the electric-energy storage device 60 where the electric energy amount SOS stored in the storage device 60 is reduced, the speed $N_E$ of the engine 8 which is operated to operate the first electric motor M1 at a relatively high speed can be kept high enough to permit the operation of the engine 8 by itself, owing to the differential function of the power distributing mechanism 16, even while the operating speed of the second electric motor M2 determined by the vehicle speed V is zero (substantially zero) when the vehicle is stationary.

The hybrid control portion 52 is further arranged to hold the engine speed $N_E$ at a desired value owing to the electric CVT function of the differential portion 11, by controlling the first electric motor speed $N_{M1}$ and/or second electric motor speed $N_{M2}$, irrespective of whether the vehicle is stationary or running. For example, the hybrid control portion 52 is arranged to raise the engine speed $N_E$ by raising the first electric motor speed $N_{M1}$ while the second electric motor speed $N_{M2}$ determined by the vehicle speed V is held substantially constant, as is apparent from the collinear chart of FIG. 3.

The high-speed-gear determining portion 62 is arranged to determine whether the gear position to which the transmission mechanism 10 should be shifted on the basis of the vehicle condition and according to the shifting boundary line map stored in the memory 56 and indicated in FIG. 6 by way of example is a high-speed-gear position, for example, the fifth gear position. This determination is made by determining whether the gear position selected by the step-variable shifting control portion 54 is the fifth gear position or not, for determining which one of the switching clutch C0 and brake B0 should be engaged to place the transmission mechanism 10 in the step-variable shifting state.

The switching control portion 50 is arranged to selectively switch the transmission mechanism 10 between the continuously-variable shifting state and the step-variable shifting state, that is, between the differential state and the locked state, by engaging and releasing the coupling devices (switching clutch C0 and brake B0) on the basis of the vehicle condition. For example, the switching control portion 50 is arranged to determine whether the shifting state of the transmission mechanism 10 (differential portion 11) should be changed, on the basis of the vehicle condition represented by the vehicle speed V and the required output torque $T_{OUT}$ and according to the switching boundary line map (switching control map or relation) stored in the memory 56 and indicated by two-dot chain line in FIG. 7 by way of example, namely, whether the vehicle condition is in the continuously-variable shifting region for placing the transmission mechanism 10 in the continuously-variable shifting state, or in the step-variable shifting region for placing the transmission mechanism 10 in the step-variable shifting state. The switching control portion 50 places the transmission mechanism 10 in the continuously-variable shifting state or step-variable shifting state, depending upon whether the vehicle condition is in the continuously-variable shifting region or in the step-variable shifting region. Thus, the switching control portion 50 limits the electrically controlled differential function of the differential portion 11 by placing the differential portion 11 in the step-variable shifting state by controlling the switching clutch C0 and/or the switching brake B0.

Described in detail, when the switching control portion 50 determines that the vehicle condition is in the step-variable shifting region, the switching control portion 50 disables the hybrid control portion 52 to implement a hybrid control or continuously-variable shifting control, and enables the step-variable shifting control portion 54 to implement a predetermined step-variable shifting control in which the transmission portion 20 is automatically shifted according to the shifting boundary line map stored in the memory 56 and indicated in FIG. 6 by way of example. FIG. 2 indicates the combinations of the engaging actions of the hydraulically operated frictional coupling devices C0, C1, C2, B0, B1, B2 and B3, which are stored in the memory 56 and which are selectively used for automatic shifting of the automatic transmission portion 20. In the step-variable shifting state, the transmission mechanism 10 as a whole constituted by the differential portion 11 and the automatic transmission portion 20 functions as a so-called step-variable automatic transmission which is automatically shifted according to the table of FIG. 2.

When the high-speed-gear determining portion 62 has determined that the transmission mechanism 10 should be shifted to the fifth gear position, the switching control portion 50 commands the hydraulic control unit 42 to release the switching clutch C0 and engage the switching brake B0, for enabling the differential portion 11 to function as an auxiliary transmission having a fixed speed ratio γ0 of 0.7, for example, so that the transmission mechanism 10 as a whole is placed in a high-speed gear position so-called "an overdrive gear position" having a speed ratio lower than 1.0. When the high-speed-gear determining portion 62 has not determined that the transmission mechanism 10 should be shifted to the fifth gear position, the switching control portion 50 commands the hydraulic control unit 42 to engage the switching clutch C0 and release the switching brake B0, for enabling the differential portion 11 to function as an auxiliary transmission having a fixed speed ratio γ0 of 1.0, for example, so that the transmission mechanism 10 as a whole is placed in a speed-reducing gear position having a speed ratio not lower than 1.0. Thus, when the transmission mechanism 10 is switched to the step-variable shifting state by the switching control portion 50, the differential portion 11 operable as the auxiliary transmission is placed in a selected one of two gear positions under the control of the switching control portion 50 while the automatic transmission portion 20 connected in series to the differential portion 11 functions as a step-variable transmission, so that the transmission mechanism 10 as a whole functions as the so-called step-variable automatic transmission.

When the switching control portion 50 has determined that the vehicle condition is in the continuously-variable shifting region for placing the transmission mechanism 10 in the continuously-variable shifting state, the switching control portion 50 commands the hydraulic control unit 42 to release both of the switching clutch C0 and brake B0, for placing the differential portion 11 in the continuously-variable shifting state. At the same time, the switching control portion 50 enables the hybrid control portion 52 to implement the hybrid control, and commands the step-variable shifting control portion 54 to select and hold a predetermined one of the gear positions, or to permit the automatic transmission portion 20 to be automatically shifted according to the shifting boundary line map stored in the memory 56 and indicated in FIG. 7 by way of example. In the latter case, the variable-step shifting control portion 54 implements the automatic shifting control by suitably selecting the combinations of the operating states of the frictional coupling devices indicated in the table of FIG. 2, except the combinations including the engagement of the switching clutch C0 and brake B0. Thus, the differential portion 11 switched to the continuously-variable shifting state under the control of the switching control portion 50 functions as the continuously variable transmission while the automatic transmission portion 20 connected in series to the differential portion 11 functions as the step-variable transmission, so that the transmission mechanism 10 provides a sufficient vehicle drive force, such that the input speed $N_{IN}$ of the automatic transmission portion 20 placed in one of the first through fourth gear positions, namely, the rotating speed $N_{18}$ of the power transmitting member 18 is continuously changed, so that the speed ratio of the transmission mechanism 10 when the transmission portion 20 is placed in one of those gear positions is continuously variable over a predetermined range. Accordingly, the speed ratio of the automatic transmission portion 20 is continuously variable across the adjacent gear positions, whereby the total speed ratio γT of the transmission mechanism 10 is continuously variable.

The maps of FIG. 7 will be described in detail. The shifting boundary line map (shifting control map or relation) shown in FIG. 7 by way of example and stored in the memory 56 is used for determining whether the automatic transmission portion 20 should be shifted, and is defined in a two-dimensional coordinate system by control parameters consisting of the vehicle speed V and the drive-force-related value in the form of the required output torque $T_{OUT}$. In FIG. 6, the solid lines indicate the shift-up boundary lines, while the one-dot chain lines indicate the shift-down boundary lines.

The broken lines in FIG. 7 represent the upper vehicle-speed limit V1 and the upper output-torque limit T1 which are used for the switching control portion 50 to determine whether the vehicle condition is in the step-variable shifting region or the continuously-variable shifting region. In other words, the broken lines represent a high-speed-running boundary line indicative of the upper vehicle-speed limit V1 above which it is determined that the hybrid vehicle is in a high-speed running state, and a high-output-running boundary line indicative of the upper output-torque limit T1 of the output torque $T_{OUT}$ of the automatic transmission portion 20 above which it is determined that the hybrid vehicle is in a high-output running state. The output torque $T_{OUT}$ is an example of the drive-force-related value which relates to the drive force of the hybrid vehicle. FIG. 7 also shows two-dot chain lines which are offset with respect to the broken lines, by a suitable amount of control hysteresis for determination as to whether the step-variable shifting state is changed to the continuously-variable shifting state or vice versa. Thus, the broken lines and two-dot chain lines of FIG. 7 constitute the stored switching boundary line map (switching control map or relation) used by the switching control portion 50 to determine whether the vehicle condition is in the step-variable shifting region or the continuously-variable shifting region, depending upon whether the control parameters in the form of the vehicle speed V and the output torque $T_{OUT}$ are higher than the predetermined upper limit values V, T1. This switching boundary line map may be stored in the memory 56, together with the shifting boundary line map. The switching boundary line map may use at least one of the upper vehicle-speed limit V1 and the upper output-torque limit T1, or at least one of the vehicle speed V and the output torque $T_{OUT}$, as at least one parameter.

The above-described shifting boundary line map, switching boundary line, and drive-power-source switching map may be replaced by stored equations for comparison of the actual vehicle speed V with the limit value V1 and comparison of the actual output torque $T_{OUT}$ with the limit value T1. In this case, the switching control portion 50 switches the transmission mechanism 10 in the step-variable shifting state by engaging the switching brake B0, when the actual vehicle speed V has exceeded the upper limit V1, or by engaging the switching clutch C0, when the output torque $T_{OUT}$ of the automatic transmission portion 20 has exceeded the upper limit T1.

The switching control portion 50 may be arranged to place the transmission mechanism 10 in the step-variable shifting state even when the vehicle condition is in the continuously-variable shifting region, upon detection of any functional failure or deterioration of the electric components such as the electric motors which are operable to operate the differential portion 11 as the electrically controlled continuously variable transmission. Those electric components include components such as the first electric motor M1, second electric motor M2, inverter 58, electric-energy storage device 50 and electric lines interconnecting those components, which are associated with the electric path through which an electric energy generated by the first electric motor M1 is converted into a mechanical energy. The functional deterioration of the components may be caused by their failure or a drop of their temperatures.

The drive-force-related value indicated above is a parameter corresponding to the drive force of the vehicle, which may be the output torque $T_{OUT}$ of the automatic transmission portion 20, the engine output torque $T_E$ or an acceleration value G of the vehicle, as well as a drive torque or drive force of drive wheels 38. The parameter may be: an actual value calculated on the basis of the operating amount $A_{CC}$ of the accelerator pedal 45 or the opening angle of the throttle valve (or intake air quantity, air/fuel ratio or amount of fuel injection) and the engine speed $N_E$; or any one of estimated values of the required (target) engine torque $T_E$, required (target) output torque $T_{OUT}$ of the transmission potion 20 and required vehicle drive force, which are calculated on the basis of the operating amount $A_{CC}$ of the accelerator pedal 45 or the operating angle of the throttle valve. The above-described vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper vehicle-speed limit V1 is determined so that the transmission mechanism 10 is placed in the step-variable shifting state while the vehicle is in the high-speed running state. This determination is effective to reduce a possibility of deterioration of the fuel economy of the vehicle if the transmission mechanism 10 were placed in the continuously-variable shifting state while the vehicle is in the high-speed running state. On the other hand, the upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

Figure 8:
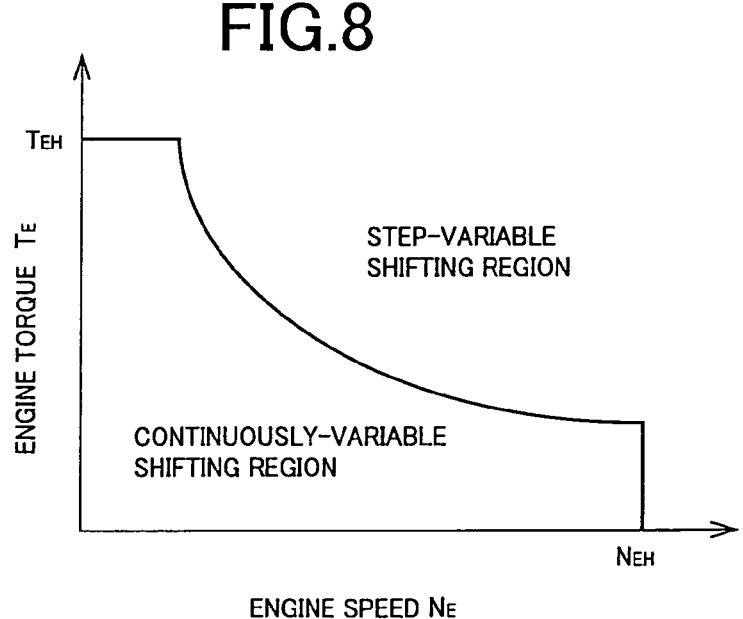
FIG. 8 is a view illustrating a stored relationship defining boundary lines between a continuously-variable shifting region and a step-variable shifting region, which relationship is used to map boundary lines defining the continuously-variable and step-variable shifting regions which are indicated by broken lines in FIG. 6.

Referring to FIG. 8, there is shown a switching boundary line map (switching control map or relation) which is stored in the memory 56 and which defines engine-output lines serving as boundary lines used by the switching control portion 50 to determine whether the vehicle condition is in the step-variable or continuously-variable shifting region. These engine-output lines are defined by control parameters in the form of the engine speed $N_E$ and the engine torque $N_T$. The switching control portion 50 may use the switching boundary line map of FIG. 7 in place of the switching boundary line map of FIG. 6, to determine whether the vehicle condition is in the continuously-variable or step-variable shifting region, on the basis of the engine speed $N_E$ and engine torque $T_E$. The switching boundary line map of FIG. 7 may be based on the switching boundary line map of FIG. 7. In other words, the broken lines in FIG. 7 may be determined on the basis of the relation (map) of FIG. 8, in the two-dimensional coordinate system defined by the control parameters in the for of the vehicle speed V and the output torque $T_{OUT}$.

The step-variable shifting region defined by the switching boundary line map of FIG. 7 is defined as a high-torque drive region in which the output torque $T_{OUT}$ is not lower than the predetermined upper limit T1, or a high-speed drive region in which the vehicle speed V is not lower than the predetermined upper limit V1. Accordingly, the step-variable shifting control is implemented when the torque of the engine 8 is comparatively high or when the vehicle speed V is comparatively high, while the continuously-variable shifting control is implemented when the torque of the engine 8 is comparatively low or when the vehicle speed V is comparatively low, that is, when the engine 8 is in a normal output state.

Similarly, the step-variable shifting region defined by the switching boundary line map of FIG. 8 is defined as a high-torque drive region in which the engine torque $T_E$ is not lower than the predetermined upper limit TE1, or a high-speed drive region in which the engine speed NE is not lower than the predetermined threshold value NE1, or alternatively defined as a high-output drive region in which the output of the engine 8 calculated on the basis of the engine torque $N_T$ and speed $N_E$ is not lower than a predetermined limit. Accordingly, the step-variable shifting control is implemented when the torque $T_E$, speed $N_E$ or output of the engine 8 is comparatively high, while the continuously-variable shifting control is implemented when the torque $T_E$, speed $N_E$ or output of the engine 8 is comparatively low, that is, when the engine 8 is in the normal output state. The boundary lines of the switching boundary switching map of FIG. 8 may be considered as high-speed threshold lines or high-engine-output threshold lines, which define upper limit of the vehicle speed V or engine output.

Figure 9:
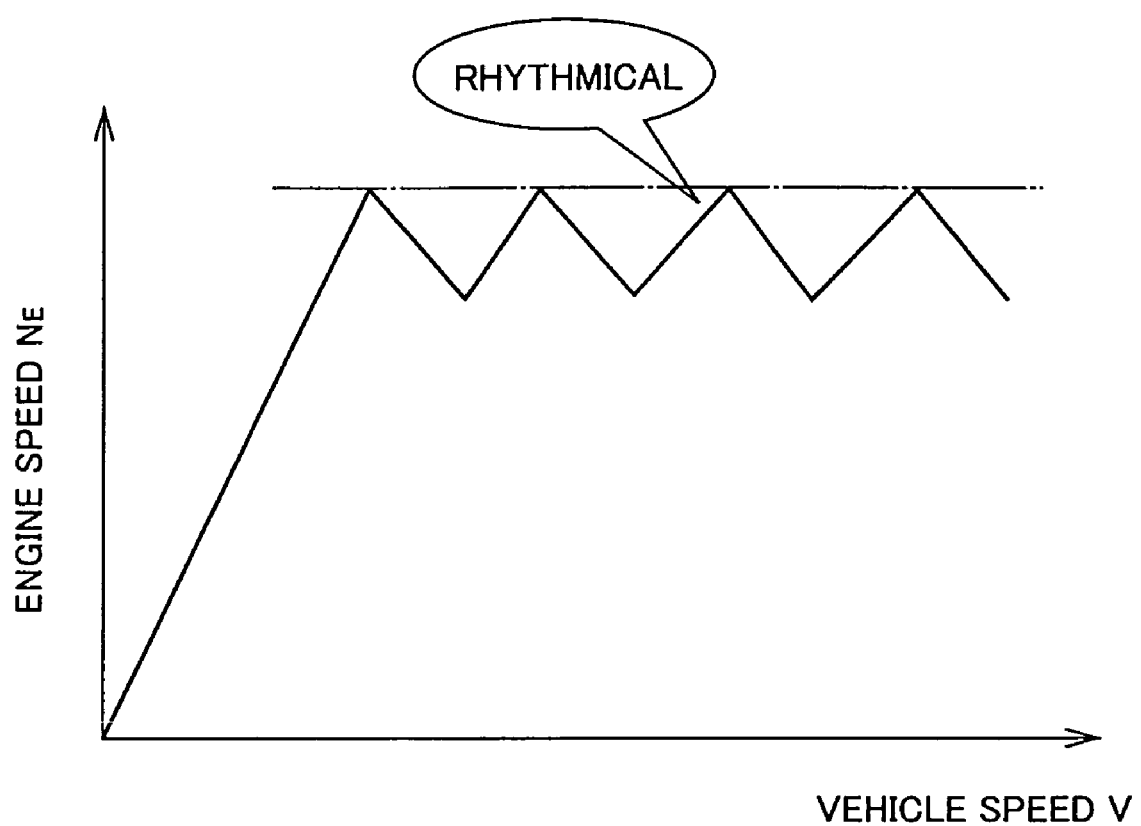
FIG. 9 is a view indicating an example of a change of the engine speed as a result of a shift-up action of the automatic transmission portion.

In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the differential portion 11 functions as the electrically controlled continuously variable transmission. In a high-output running state of the vehicle with the output torque $T_{OUT}$ higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors. According to the other concept, the transmission mechanism 10 is placed in the step-variable shifting state (fixed-speed-ratio shifting state), rather than in the continuously-variable shifting state, in the high-output running state of the vehicle in which the vehicle operator has a stronger desire for improved drivability of the vehicle rather than improved fuel economy. In this case, the engine speed $N_E$ changes with a shift-up action of the automatic transmission portion 20, assuring a comfortable rhythmic change of the engine speed $N_E$ as the transmission portion 20 is shifted up, as indicated in FIG. 9.

Thus, the differential portion 11 (transmission mechanism 10) is selectively switchable between the continuously-variable shifting state and the step-variable shifting state (fixed-speed ratio shifting state), by the switching control portion 50 on the basis of the vehicle condition. In the present embodiment, the hybrid control portion 52 selects one of the motor drive mode and the engine drive mode on the basis of the vehicle condition, and the engine start/stop control portion 66 selectively start or stop the engine 8 according to the selected vehicle drive mode.

A starting operation of the engine 8 under the control of the engine start/stop control portion 66 and a shifting action of the automatic transmission portion 20 under the control of the step-variable shifting control portion 54 may overlap each other, depending upon the specific vehicle condition. When the vehicle condition is changed from a point "c" to a point "d" as indicated by solid line C in FIG. 7, that is, from the motor drive mode to the engine drive mode, as a result of an increase of the required output toque $T_{OUT}$ by an operation of the accelerator pedal, for example, a shifting action of the automatic transmission portion 20 may take place concurrently. In this event, a starting shock of the engine 8 and a shifting shock of the automatic transmission portion 20 may overlap each other, so that the vehicle operator and passengers may feel a relatively large degree of shock upon concurrent occurrence of the change of the vehicle drive mode and the shifting action.

To reduce the shock as felt by the vehicle occupants due to overlapping of the starting operation of the engine 8 under the control of the engine start/stop control portion 66 and the shifting action of the automatic transmission portion 20 under the control of the step-variable shifting control portion 54, the control apparatus in the form of the electronic control device 40 includes the above-indicated vehicle-condition determining portion 80, engine-speed-rise control portion 82, overlap determining portion 84 and overlap control portion 86, which will be described in detail.

Referring back to FIG. 6, the vehicle-condition determining portion 80 is configured to determine (a) whether the presently selected shift position $P_{SH}$ of the shift lever detected by the shift position sensor 44 is a drive position or not, and (b) whether the motor drive mode is presently selected by the hybrid control portion 52. If these two determinations are affirmative, that is, if the above-indicated two conditions are satisfied, an affirmative determination is obtained by the vehicle-condition determining portion 80. If one of the two determinations is negative, that is, if one of the two conditions is not satisfied, a negative determination is obtained by the vehicle-condition determining portion 80. In this respect, it is noted that the shifting shock of the automatic transmission portion 20 and the starting shock of the engine 8 do not overlap each other.

The engine-speed-rise control portion 82 is operated when the affirmative determination is obtained by the vehicle-condition determining portion 80, and when a shifting command to shift the automatic transmission portion 20 is generated by the step-variable shifting control portion 54. The engine-speed-rise control portion 82 is configured to implement an engine-speed rise control for raising the engine speed $N_E$ to a value not lower than a predetermined target speed in the form of an engine starting speed $N_{EST}$ at which the engine 8 can be started. In this case, the engine-speed-rise control portion 82 selects, on the basis of the second electric motor speed $N_{M2}$, one of first, second and third methods of raising the engine speed $N_E$ to the value not lower than the predetermined engine starting speed $N_{EST}$. According to the first method, the first electric motor M1 is held in the de-energized state, and the switching brake B0 is engaged while the switching clutch C0 is held in the released state. According to the second method, the first electric motor M1 is held in the de-energized state, and the switching clutch C0 is engaged while the switching brake B0 is held in the released state. According to the third method, the first electric motor M1 is energized to raise the first electric motor speed $N_{M1}$ while the switching clutch C0 and switching brake B0 are both held in the released state. When the engine speed $N_E$ is raised to the value not lower than the predetermined engine starting speed $N_{EST}$, a resistance to a rotary motion of the engine 8 acts in the direction to lower the second electric motor speed $N_{M2}$. In view of this face, the second electric motor M2 is operated to generate a reaction torque against the above-indicated resistance, in addition to a torque for maintaining the input shaft speed of the automatic transmission portion 20, so that the input shaft speed is maintained at a value required for the shifting action of the automatic transmission portion 20. It is also noted that the power transmitting path for transmitting the vehicle drive force to the drive wheels 38 through the automatic transmission portion 20 is disconnected or substantially disconnected during the shifting action of the automatic transmission portion 20. Accordingly, the above-indicated reaction torque generated by the second electric motor M2 is larger during the shifting action than when the automatic transmission 20 is not in a shifting action. It is further noted that the first and second methods according to which the first electric motor M1 is held in the de-energized state permit easier starting of the engine 8 than the third method. The engine-speed-rise control portion 82 cancels the engine-speed rise control if an engine starting command to start the engine 8 is not generated from the engine start/stop control portion 66 during a period from the moment of generation of the shifting command and the moment of completion of the shifting action of the automatic transmission portion 20.

Figure 10:
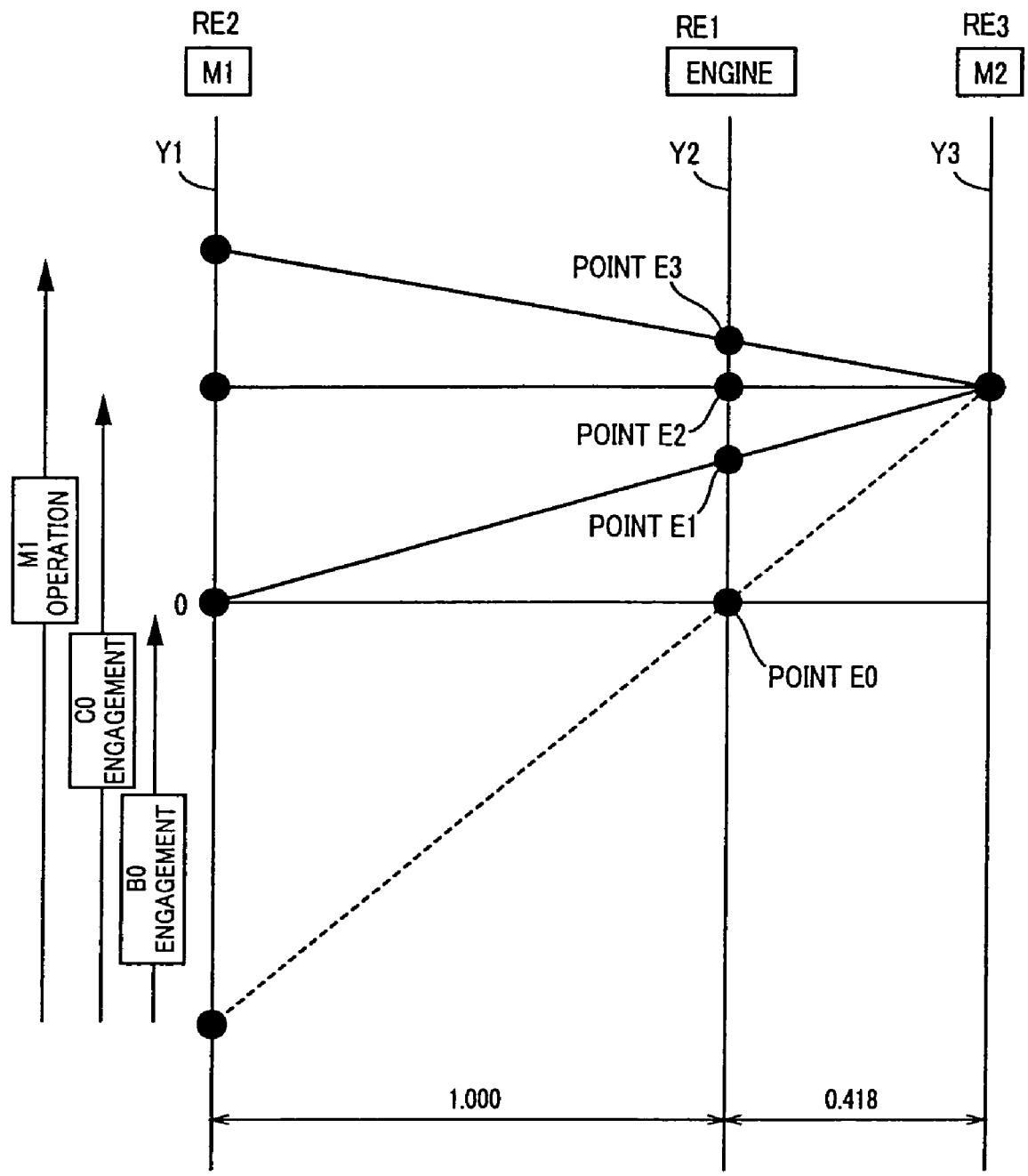
FIG. 10 is a collinear chart corresponding to a left portion of the collinear chart of FIG. 3 including vertical lines Y1-Y3, the collinear chart of FIG. 9 indicating relative rotating speeds of rotary elements of a differential portion when the engine is driven upon switching of the vehicle drive mode from the motor drive mode to the engine drive mode.

The collinear chart of FIG. 10 indicates relative rotating speeds of the rotary elements RE1, RE2 and RE3 of the differential portion 11 when the engine 8 is started by the three methods described above. The vertical lines Y1, Y2 and Y3 are identical with those in the collinear chart of FIG. 3. The first method is selected when the second electric motor speed $N_{M2}$ is equal to or higher than a predetermined reference value, for example, 1500 rpm. In this first method, the engine speed $N_E$ is raised from zero (represented by a point E0 at which the engine 8 is at rest) to a value (represented by a point E1) which is established by an engaging action of the switching brake B0 and to which the second electric motor speed $N_{M2}$ is lowered at a predetermined speed ratio. The above-indicated reference value is determined such that the engine speed $N_E$ represented by the point E1 is not lower than the starting speed $N_{EST}$ indicated above, for example, 400 rpm. These reference value and starting speed $N_{EST}$ are stored in the engine-speed rise control portion 82.

The second method is selected when the second electric motor speed $N_{M2}$ is lower than the predetermined reference value and is higher than the engine starting speed $N_{EST}$. In the second method, the engine speed $N_E$ is raised from zero (represented by the point E0 at which the engine 8 is at rest) to a value (represented by a point E2) which is established by an engaging action of the switching brake B0 and which is equal to the second electric motor speed $N_{M2}$, in this embodiment.

The third method is selected when the second electric motor speed $N_{M2}$ is lower than the engine starting speed $N_{EST}$. In the third method, the engine speed $N_E$ is raised from zero (represented by the point E0 at which the engine 8 is at rest) to the engine starting speed $N_{EST}$ (represented by a point E3;

e.g., 400 rpm), by energization of the second electric motor speed $N_{M2}$ to raise its speed $N_{M2}$.

The overlap determining portion 84 stores therein required shifting times of the different shifting actions of the automatic transmission portion 20. The required shifting time of each shifting action is a length of time from the moments of initiation and completion of the shifting action. When the engine starting command to start the engine 8 is generated from the engine start/stop control portion 66, the overlap determining portion 84 specifies the shifting action on the basis of the gear positions of the automatic transmission portion 20 before and after the shifting action, which gear positions are represented by information received from the step-variable shifting control portion 54. Then, the overlap determining portion 48 estimates the moment of completion of the shifting action in question, on the basis of the stored required shifting times, or the present degree of progress of the shifting action. On the basis of engine speed $N_E$ detected by the engine speed sensor 46, the overlap determining portion 84 further determines whether the operation to start the engine 8 can be initiated immediately. On the basis of the estimated moment of completion of the shifting action and a result of determination as to whether the engine starting operation can be initiated immediately, the overlap determining portion 84 determines whether the shifting action (a terminal portion of the shifting action) and the starting (ignition) of the engine 8 overlap each other or not. This determination is made by determining whether an estimated time difference between the estimated moment of completion of the shifting action and the moment of initiation of the engine starting operation is shorter than a predetermined lower limit, which is obtained by experimentation and above which a shock as felt by the vehicle occupants upon concurrent shifting of the automatic transmission portion 20 and starting of the engine 8 can be relatively small. The overlap determining portion 84 determines that the terminal portion of the shifting action and the engine starting overlap each other when the above-indicated time difference is shorter than the lower limit stored in the overlap determining portion 84.

If the overlap determining portion 84 determines that the terminal portion of the shifting action of the automatic transmission portion 20 and the starting of the engine 8 overlap each other, the overlap control portion 86 operates to retard or delay the moment of starting (ignition) of the engine 8, and initiates a fuel supply to the engine 8 a predetermined time prior to the delayed moment of ignition of the engine 8, so that the engine 8 is started (ignited) after the moment of completion of the shifting action, namely, after the above-indicated time difference has passed, but at a moment as early as possible. If the overlap determining portion 84 determines that the terminal portion of the shifting action and the engine starting do not overlap each other, the overlap control portion 86 initiates the fuel supply to the engine 8 a predetermined time prior to the estimated moment of ignition of the engine 8, to start the engine 8 prior to the moment of completion of the shifting action, without retarding the moment of ignition of the engine 8. In this case, the overlap control portion 86 informs the torque reduction control portion 90 that the engine 8 has been started prior to the moment of completion of the shifting action. It will be understood that the overlap control portion 86 functions as an engine-start control portion configured to change a moment of starting the engine, on the basis of the operating speed $N_E$ of the engine upon generation of a command to start the engine 8 during the shifting action of the automatic transmission portion 20. The engine-start control portion is further configured to start the engine during the shifting action of the automatic transmission portion 20, when it is determined that the terminal portion of the shifting action of the automatic transmission portion 20 and the starting operation of the engine 8 do not overlap each other. The engine-start control portion is further configured to determine the moment of starting of the engine 8 on the basis of the degree of progress of the shifting action of the automatic transmission portion 20.

When the starting of the engine 8 is delayed under the control of the overlap control portion 86 in the event of the affirmative determination by the overlap determining portion 84 that the shifting action and the starting of the engine 8 overlap each other, a rise of the engine torque $T_E$ is delayed due to the delayed starting of the engine 8. In this event, the torque assisting portion 88 commands the hybrid control portion 52 to implement a temporary torque assisting operation to assist the engine 8, by operating the second electric motor M2, for compensation for the delayed rise of the engine torque $T_E$.

When the vehicle drive mode is switched from the motor drive mode to the engine drive mode as a result of an operation of the accelerator pedal by the vehicle operator who desires a rapid increase of the vehicle drive torque and higher acceleration of the vehicle, the delayed rise of the engine torque $T_E$ should be compensated for by the temporary torque assisting operation implemented by the hybrid control portion 52 under the control of the torque assisting portion 88.

When the torque reduction control portion 90 is informed by the overlap control portion 86 that the engine 8 has been started prior to the moment of completion of the shifting action of the automatic transmission portion 20, the torque reduction control portion 90 implements a temporary torque reduction control to reduce the engine torque $T_E$ upon completion of the shifting action for reducing a shifting shock of the automatic transmission portion 20, where the shifting action is a shift-down action. Where the second electric motor M2 is operating during the shift-down action, the torque reduction control portion 90 may temporarily reduce the output torque of the second electric motor M2, rather than the engine torque $T_E$.

Figure 11:
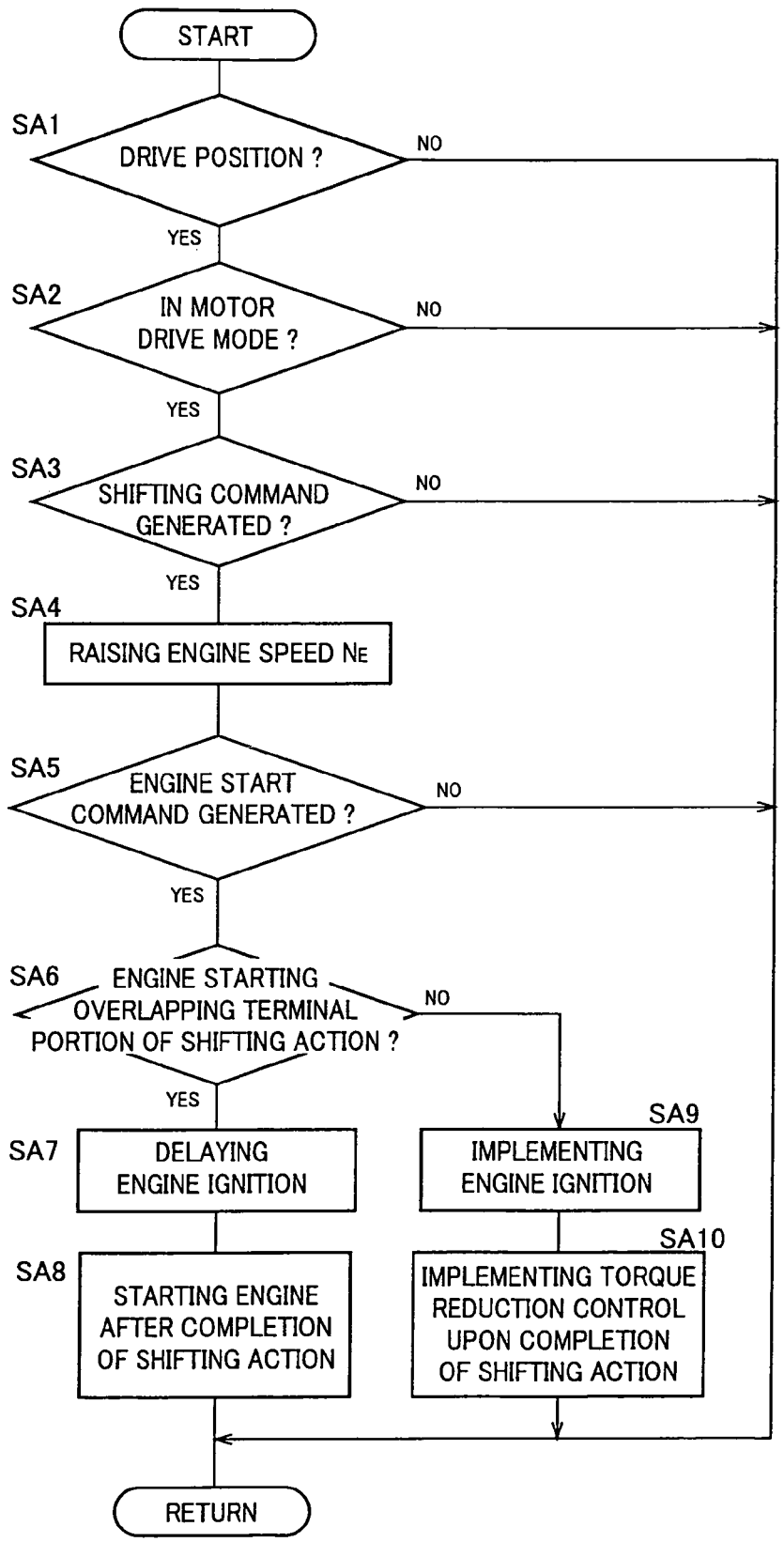
FIG. 11 is a flow chart illustrating a control routine executed by the electronic control device of FIG. 6, that is, a control operation performed when a terminal portion of a shifting action of the automatic transmission portion and a starting operation of the engine overlap each other.

FIG. 11 is a flow chart illustrating a major portion of a control operation of the electronic control device 40, that is, a control routine executed when the commands to shift the automatic transmission portion 20 and to start the engine 8 are generated. This control routine is repeatedly executed with an extremely short cycle time of about several milliseconds to about several tens of milliseconds, for example.

The control routine of FIG. 11 is initiated with step SA1 to determine whether the presently selected shift position $P_{SH}$ of the shift lever detected by the shift position sensor 44 is the drive position D. If a negative determination is obtained in step SA1, one cycle of execution of the present control routine is terminated. If an affirmative determination is obtained in step SA1, the control flow goes to step SA2 to determine whether the motor drive mode is presently established (selected). If a negative determination is obtained in step SA2, one cycle of execution of the present control routine is terminated. If an affirmative determination is obtained in step SA2, the control flow goes to step SA3.

Step SA3 is provided to determine whether a command to shift the automatic transmission portion 20 has been generated. If a negative determination is obtained in step SA3, one cycle of execution of the present control routine is terminated. If an affirmative determination is obtained in step SA3, the control flow goes to step SA4. It will be understood that steps SA1-SA3 correspond to the vehicle-condition determining portion 80 described above.

In step SA4, the engine speed $N_E$ is raised to the value not lower than the engine starting speed $N_{EST}$ at which the engine 8 can be started. This engine speed-rise control by the engine-speed rise control portion 82 is implemented by one of the above-described three methods. Namely, when the second electric motor speed $N_{M2}$ is equal to or higher than the predetermined reference value, the first electric motor M1 is held in the de-energized state, and the switching brake B0 is engaged while the switching clutch C0 is held in the released state. When the second electric motor speed $N_{M2}$ is lower than the predetermined reference value and is equal to or higher than the engine starting speed $N_{EST}$, the first electric motor M1 is held in the de-energized state, and the switching clutch C0 is engaged while the switching brake B0 is held in the released state. When the second electric motor speed $N_{M2}$ is lower than the engine starting speed $N_{EST}$, the first electric motor M1 is energized to raise the first electric motor speed $N_{M1}$ while the switching clutch C0 and switching brake B0 are both held in the released state. It will be understood that steps SA3 and SA4 correspond to the engine-speed-rise control portion 82.

Step SA4 is followed by step SA5 to determine whether the command to start the engine 8 has been generated. If a negative determination is obtained in step SA5, one cycle of execution of the present control routine is terminated. If an affirmative determination is obtained in step SA5, the control flow goes to step SA6.

In step SA6, the commanded shifting action is specified on the basis of the gear positions of the automatic transmission portion 20 before and after the shifting action, and the moment of completion of the shifting action in question is estimated on the basis of the stored required shifting times, or the present degree of progress of the shifting action. On the basis of engine speed $N_E$ detected by the engine speed sensor 46, the determination is made as to whether the operation to start the engine 8 can be initiated immediately. On the basis of the estimated moment of completion of the shifting action and a result of the determination as to whether the engine starting operation can be initiated immediately, the determination is made as to whether the shifting action and the starting (ignition) of the engine 8 overlap each other or not. If a negative determination is obtained in step SA6, the control flow goes to step SA9. If an affirmative determination is obtained in step SA6, the control flow goes to step SA7. It is determined that the shifting action and the engine starting overlap each other, if the estimated time difference between the moment of completion of the shifting action and the moment of initiation of the engine ignition is shorter than the predetermined lower limit. It will be understood that steps SA5 and SA6 correspond to the overlap determining portion 84.

In step SA7, the moment of ignition of the starting (ignition) of the engine 8 is retarded, and the second electric motor M2 is operated to implement the temporary torque assisting control to assist the engine 8, for compensating for a relayed rise of the engine torque $T_E$ due to the retarded starting of the engine 8 after the moment of completion of the shifting action. In the following step SA8, the fuel supply to the engine 8 is initiated the predetermined time prior to the delayed moment of ignition of the engine 8, so that the engine 8 is started (ignited) after the moment of completion of the shifting action, namely, after the above-indicated time difference has passed, but at a moment as early as possible.

In step SA9, the fuel supply to the engine 8 is initiated a predetermined time prior to the estimated moment of ignition of the engine 8, so that the engine 8 is started (ignited) without retarding the moment of ignition, prior to the moment of completion of the shifting action. It will be understood that steps SA7 and SA9 correspond to the overlap control portion 86 while step SA8 corresponds to the torque assisting portion 88. It will also be understood that the overlap determining portion 84 and the overlap control portion 86 cooperate to function as a control portion which is operable when the terminal portion of a shifting action of the automatic transmission portion 20 and a starting operation of the engine 8 overlap each other and which is configured to implement one of the shifting action and the engine starting operation prior to the other.

Step SA9 is followed by step SA10 corresponding to the torque reduction control portion 90, in which the temporary torque reduction control is implemented to reduce the output torque $T_E$ of the engine 8 already started in step SA9 prior to the moment of completion of the shifting action, for reducing the shifting shock upon completion of the shifting action, where the shifting action is a shift-down action.

Figure 12:
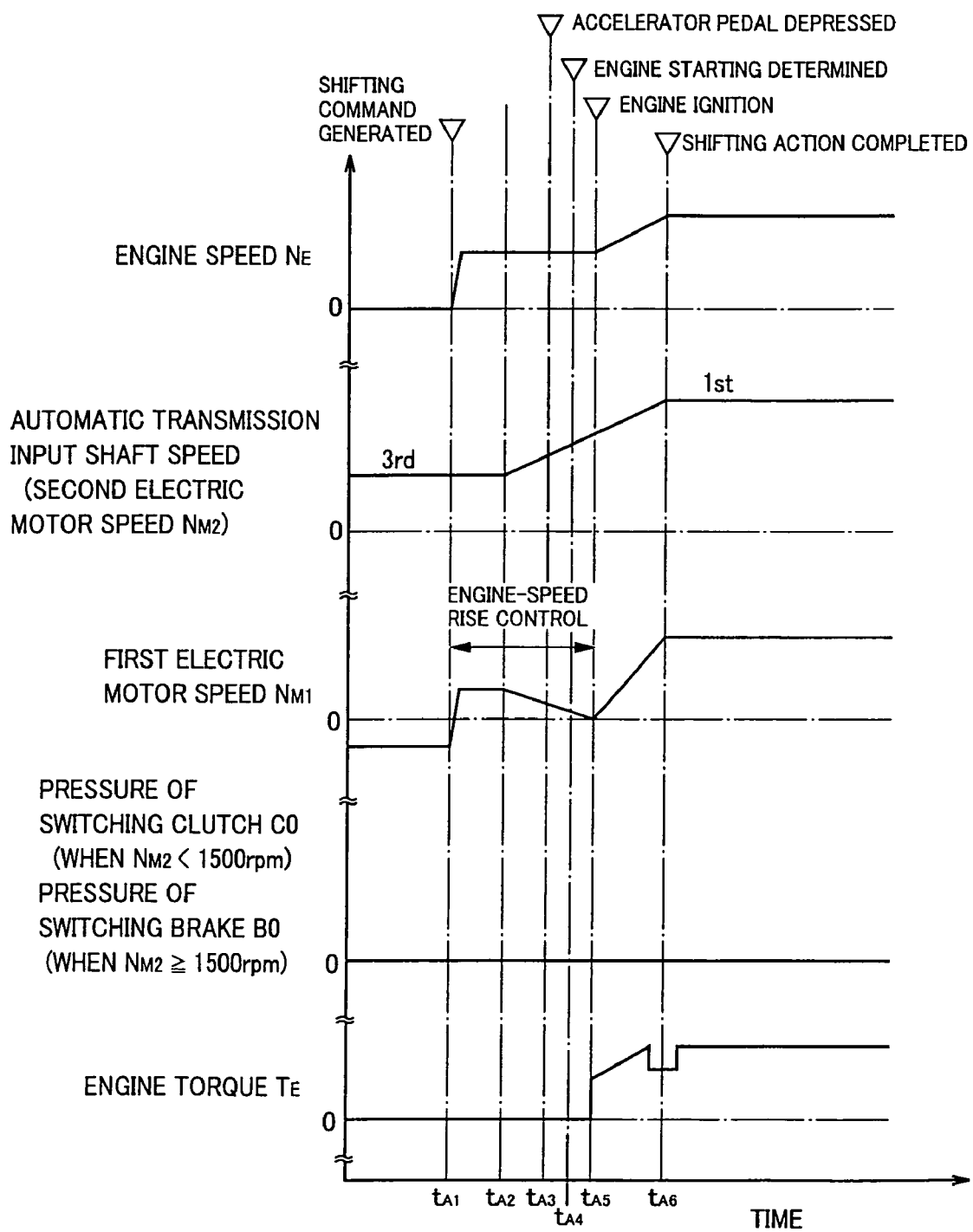
FIG. 12 is a time chart for explaining the control operation illustrated in the flow chart of FIG. 11, when a negative determination is obtained in step SA6 of FIG. 11 as a result of a shift-down action of the automatic transmission portion from a third gear position to a first gear position in the motor drive mode and a rise of the operating speed of the engine driven by a first electric motor.
Figure 13:
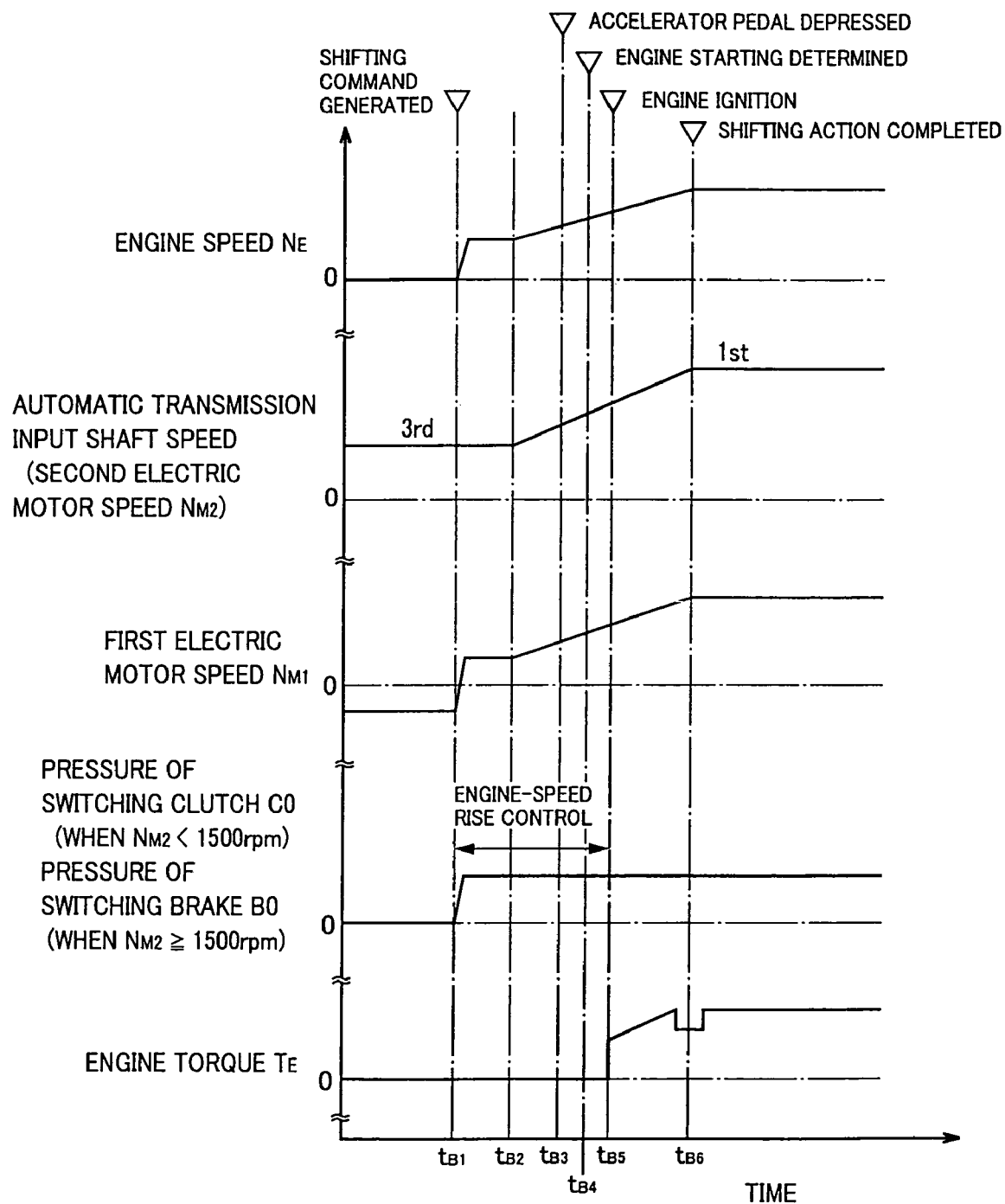
FIG. 13 is a time chart for explaining the control operation of the flow chart of FIG. 11, when a negative determination is obtained in step SA6 of FIG. 11 as a result of the shift-down action of the automatic transmission portion from the third gear position to the first gear position in the motor drive mode and a rise of the engine speed due to an engaging action of a switching clutch C0 of the differential portion.
Figure 14:
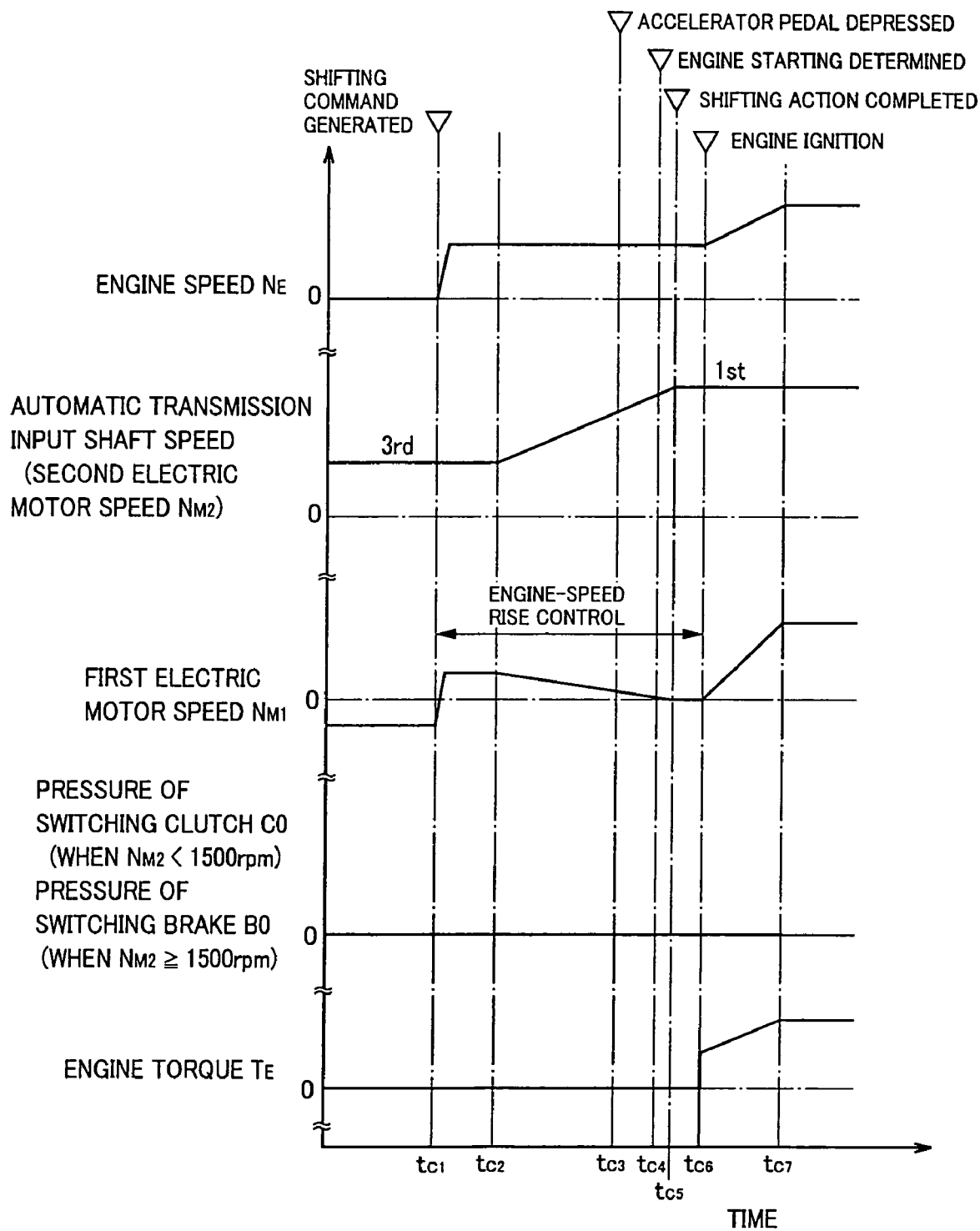
FIG. 14 is a time chart for explaining the control operation of the flow chart of FIG. 11, when an affirmative determination is obtained in step SA6 of FIG. 11 as a result of the shift-down action of the automatic transmission portion from the third gear position to the first gear position in the motor drive mode and a rise of the operating speed of the engine driven by the first electric motor.

FIGS. 12-14 are time charts for explaining the control operation when the control routine illustrated in the flow chart of FIG. 11 is executed when the automatic transmission portion 20 is commanded to be shifted down from the third gear position to the first gear position in the motor drive mode, with the shift lever placed in the drive position D. In the examples of FIGS. 12 and 13, the engine starting is not retarded. In the example of FIG. 14, the engine starting is retarded. As is apparent from FIG. 1, the input shaft speed of the automatic transmission portion 20 indicated in FIGS. 12-14 is the rotating speed of the power transmitting member 18, which is equal to the second electric motor speed $N_{M2}$. The second parameter as counted from the bottom of the time charts of FIGS. 12-14 is the hydraulic pressure of the switching brake B0 where the second electric motor speed $N_{M2}$ is equal to or higher than the predetermined reference value (e.g., 1500 rpm), or the hydraulic pressure of the switching clutch C0 where the second electric motor speed $N_{M2}$ is lower than the predetermined reference value.

At points of time $T_{A1}$, $T_{B1}$, $T_{C1}$ indicated in FIGS. 12-13, the shifting command to shift the automatic transmission portion 20 is generated, and therefore the affirmative determination is obtained in step SA3 of FIG. 11. During a time period from these points of time $T_{A1}$, $T_{B1}$, $T_{C1}$ to points of time $T_{A5}$, $T_{B5}$, $T_{C5}$, the engine-speed rise control is implemented. Described in detail, in the examples of FIGS. 12 and 14, the engine speed $N_E$ is raised according to the third method described above, that is, by energizing the first electric motor M1 to raise its speed $N_{M1}$ while the switching brake B0 and switching clutch C0 are held in the released state, without a rise of the hydraulic pressure applied thereto. In the example of FIG. 13, the engine speed $N_E$ is raised according to the second method described above, that is, by engaging the switching clutch C0 while the switching brake B0 is held in the released state and while the first electric motor M1 is held in the de-energized state. That is, the hydraulic pressure applied to the switching clutch C0 is raised at the point of time $T_{B1}$, and the first electric motor speed $N_{M1}$ is raised immediately after the point of time $T_{B1}$, as indicated in FIG. 13. As a result of initiation of the shifting action of the automatic transmission portion 20 according to the shifting command generated at the points of time $T_{A1}$, $T_{B1}$, $T_{C1}$, the input shaft speed of the automatic transmission portion 20 (second electric motor speed $N_{M2}$) is raised during a time period from points of time $T_{A2}$, $T_{B2}$, $T_{C2}$ to points of time $T_{A6}$, $T_{B6}$, $T_{C5}$ at which the shifting action is completed. In the examples of FIGS. 12 and 14, the first electric motor speed $N_{M1}$ is lowered during a time period beginning at the point of time $T_{A2}$, $T_{C2}$, for saving electric energy consumption by the first electric motor M1, because a further rise of the engine speed $N_E$ is not necessary owing to a rise of the input shaft speed of the automatic transmission portion 20. In the example of FIG. 13, the first electric motor speed $N_{M1}$ and the engine speed $N_E$ are raised during a time period beginning at the point of time $T_{B2}$, because the first electric motor speed $N_{M1}$ and the engine speed $N_E$ become equal to the input shaft speed of the automatic transmission portion 20, as a result of the engaging action of the switching clutch C0, and because the input shaft speed is raised.

At points of time $T_{A3}$, $T_{B3}$, $T_{C3}$ indicated in FIGS. 12-14, the engine starting command is generated as a result of an increase of the required output torque $T_{OUT}$ by depression of the accelerator pedal. At points of time $T_{A4}$, $T_{B4}$, $T_{C4}$, step SA6 is implemented to determine whether the terminal portion of the shifting action of the automatic transmission portion 20 and the starting or ignition of the engine 8 overlap each other, or not.

In the example of FIG. 14, the point of time $T_{C3}$ at which the engine starting command is generated is close to the estimated point of time $T_{C5}$ at which the shifting action is completed, so that the affirmative determination that the shifting action of the automatic transmission 20 and the starting of the engine 8 overlap each other is obtained in step SA6 of FIG. 11. In this case, the ignition of the engine 8 is retarded in the following step SA7, and in the following step SA8 the engine 8 is started (with the ignition being initiated) after the moment of completion of the shifting action, that is, after a point of time $T_{C6}$ subsequent to the point of time $T_{C5}$ at which the shifting action is completed. Accordingly, a rise of the engine torque $T_E$ is initiated at the point of time $T_{C6}$. In the example of FIG. 14, the point of time $T_{C3}$ at which the accelerator pedal is depressed is close to the estimated point of time $T_{C5}$ at which the shifting action is completed, and the torque assisting operation is performed, so that a delay of the rise of the engine torque $T_E$ due to a retarded moment of initiation of the engine starting to a moment after the point of time $T_{C5}$ will not be felt by the vehicle occupants.

In the examples of FIGS. 12 and 13, on the other hand, the point of time $T_{B3}$, $T_{C3}$ at which the engine starting command is generated is not close to the estimated point of time $T_{A6}$, $T_{B6}$ at which the shifting action is completed, so that the negative determination that the shifting action of the automatic transmission 20 and the starting of the engine 8 do not overlap each other is obtained in step SA6 of FIG. 11. In this case, the starting (ignition) of the engine 8 is implemented in step SA9, without retarding the moment of the engine starting, that is, at the point of time $T_{A5}$, $T_{B5}$ prior to the point of time $T_{A6}$, $T_{B6}$ at which the shifting action is completed, so that the rise of the engine torque $T_E$ is initiated at the point of time $T_{A5}$, $T_{B5}$. In these examples in which the above-indicated time difference between the moment of the engine starting and the estimated moment of completion of the shifting action is not shorter than the predetermined lower limit, namely, the time difference between the points of time $T_{A5}$, $T_{A6}$ in the example of FIG. 12, and the time difference between the points of time $T_{A5}$, $T_{A6}$ in the example of FIG. 13 are not shorter than the predetermined lower limit.

In the examples of FIGS. 12 and 13, the temporary torque reduction control is implemented to reduce the engine torque $T_E$ at the point of time $T_{A6}$, $T_{B6}$, that is, upon completion of the shifting action, so that the shifting shock upon completion of the shifting action is reduced.

In the example of FIG. 14, the rise of the engine torque $T_E$ is terminated at a point of time $T_{C7}$. During a time period from the point of time $T_{C5}$ (at which the shifting action is completed) to the point of time $T_{C7}$, the torque assisting operation by the second electric motor M2 is implemented to assist the engine 8, for compensating the delayed rise of the engine torque $T_E$ after the moment of completion of the shifting action.

The electronic control device 40 functioning as the engine starting control apparatus has the following advantages A1-A20:

(A1) The engine-speed-rise control portion 82 is configured such that the operating speed of the engine is raised during a shifting action of the automatic transmission portion 20 in the motor drive mode of the hybrid vehicle, so that the engine 8 can be more rapidly started after generation of the engine starting command, than where the operating speed of the engine 8 is raised only after the moment of generation of the engine starting command. Further, the engine-speed-rise control portion 82 permits the engine 8 to be started prior to the moment of completion of the shifting action of the automatic transmission portion 20 under some condition. Owing to this comparatively early starting of the engine 8, the vehicle operator will not feel a considerable delay in the rise of the vehicle drive torque after generation of the engine starting command.

(A2) The engine-speed-rise control portion 82 is capable of raising the engine speed $N_E$ to a desired value, by operating the first electric motor M1, according to an operating speed of the first electric motor, while utilizing the differential function of the power distributing mechanism 16, for starting the engine 8 at the raised speed.

(A3) The engine-speed-rise control portion 82 commands the second electric motor M2 to generate the reaction torque against the resistance to the rotary motion of the engine 8, for raising the engine speed $N_E$, thereby preventing a drop of the input shaft speed of the automatic transmission portion 20 due to the resistance to the rotary motion of the engine 8, and other adverse influences of the resistance on the shifting action of the automatic transmission portion 20.

(A4) The reaction torque to be generated by the second electric motor M2 should be larger during a shifting action of the automatic transmission portion 20 during which the power transmitting path to the drive wheels 38 of the hybrid vehicle through the automatic transmission portion 20 is disconnected or substantially disconnected so that the engine speed $N_E$ cannot be raised by a rotary motion of the drive wheels 38. In the present embodiment, the reaction torque generated by the second electric motor M during the shifting action of the automatic transmission portion 20 for raising the engine speed $N_E$ by operation of the first electric motor M1 in the motor drive mode is larger than that to be generated while the automatic transmission portion 20 is not in a shifting action. Thus, the reaction torque generated by the second electric motor M2 is suitably controlled for saving electric energy consumption by the second electric motor M2.

(A5) The power distributing mechanism 16 is provided with the differential limiting device in the form of the switching clutch C0 and switching brake B0 operable to limit the differential function of the power distributing mechanism 16, and the engine-speed-rise control portion 82 is operable to raise the engine speed $N_E$ by commanding the switching clutch C0 or switching brake B0 to limit the differential function of the power distributing mechanism 16. This method of raising the engine speed $N_E$ permits less electric energy consumption by the first electric motor M1, than the method of raising the engine speed $N_E$ by operating the first electric motor M1, and the rise of the engine speed $N_E$ can be controlled more easily by limiting the differential function.

(A6) Where the engine speed $N_E$ is raised by commanding the switching clutch C0 or switching brake B0 to limit the differential function of the power distributing mechanism 16 in the motor drive mode, the engine-speed-rise control portion 82 commands the second electric motor M2 to generate the reaction torque against the resistance to the rotary motion of the engine 8, thereby preventing a drop of the input shaft speed of the automatic transmission portion 20 due to the resistance to the rotary motion of the engine 8, and other adverse influences of the resistance on the shifting action of the automatic transmission portion 20.

(A7) Where the engine speed $N_E$ is raised in the motor drive mode by commanding the switching clutch C0 or switching brake B0 to limit the differential function of the power distributing mechanism 17, the reaction torque to be generated by the second electric motor M2 should be larger during a shifting action of the automatic transmission portion 20 during which the power transmitting path to the drive wheels 38 of the hybrid vehicle through the automatic transmission portion 20 is disconnected or substantially disconnected so that the engine speed $N_E$ cannot be raised by a rotary motion of the drive wheels 38. In the present embodiment, the reaction torque generated by the second electric motor M during the shifting action of the automatic transmission portion 20 for raising the engine speed $N_E$ by operation of the first electric motor M1 in the motor drive mode is larger than that to be generated while the automatic transmission portion 20 is not in a shifting action. Thus, the reaction torque generated by the second electric motor M2 is suitably controlled for saving electric energy consumption by the second electric motor M2.

(A8) Since the differential mechanism 16 includes the planetary gear set 24, the output speed of the differential portion 11 can be continuously changed by controlling the operating state of the first electric motor M1, without changing the engine speed $N_E$.

(A9) The automatic transmission portion 20 is shifted by an engaging action of the selected clutch C or brake B and a releasing action of the selected clutch C or brake B, which are performed concurrently, so that the power transmitting path through the automatic transmission portion 20 is disconnected or substantially disconnected during a shifting action of the automatic transmission portion 20, whereby the power transmitting path between the differential portion 11 and the output shaft 22 is disconnected or substantially disconnected during the shifting action. Where the engine 8 is commanded to start during the shifting action, the engine torque $T_E$ can be rapidly raised, so that a starting shock of the engine which may be caused upon starting of the engine during the shifting action of the automatic transmission portion 20 is substantially prevented from being transmitted to the drive wheels, 38 so that the vehicle occupants would not feel a considerable degree of the engine starting shock.

(A10) When it is determined that the terminal portion of the shifting action of the automatic transmission portion 20 overlaps the starting operation (initiation of ignition) of the engine 8 overlap each other, the engine 8 is started after completion of the shifting action of the automatic transmission portion 20, so that a starting shock of the engine 8 and a shifting shock of the automatic transmission portion 20 would not overlap each other in the terminal portion of the shifting action, whereby the vehicle occupants would not feel considerable degrees of those engine starting and shifting shocks.

(A11) When it is determined that the terminal portion of the shifting action of the automatic transmission portion 20 overlaps the starting operation (initiation of ignition) of the engine 8 overlap each other, the moment of starting (initiating the ignition of) the engine 8 is retarded with respect to the moment of generation of the engine starting command, so as to prevent overlapping between the terminal portion of the shifting action and the starting operation of the engine 8, so that a starting shock of the engine 8 and a shifting shock of the automatic transmission portion 20 would not overlap each other in the terminal portion of the shifting action, whereby the vehicle occupants would not feel considerable degrees of those engine starting and shifting shocks.

(A12) The differential portion 11 is operable as the continuously-variable transmission by controlling the operating state of the first electric motor, so that the vehicle drive torque generated by the differential portion 11 can be smoothly changed. The differential portion 11 is switchable between an electrically controlled continuously-variable transmission the speed ratio of which is continuously variable, and a step-variable transmission the speed ration of which is variable in steps.

(A13) Since the automatic transmission portion 20 is a step-variable transmission, the speed ratio of the automatic transmission portion 20 can be changed over a comparatively wide range.

(A14) Since the engine speed $N_E$ is not raised prior to the moment of generation of the engine starting command, the fuel economy of the hybrid vehicle is improved owing to the elimination of an unnecessary rise of the engine speed $N_E$.

(A15) When it is determined that the terminal portion of the automatic transmission portion 30 and the starting operation (initiation of ignition) of the engine 8 do not overlap each other, the overlap control portion 86 starts the engine 8 during the shifting action of the automatic transmission portion 20, so that the starting shock of the engine 8 and the shifting shock of the automatic transmission portion 20 would not overlap each other in the terminal portion of the shifting action, whereby the vehicle occupants would not feel considerable degrees of those engine starting and shifting shocks. Further, the output torque $T_E$ of the engine 8 can be increased at an earlier point of time, than in the case where the engine 8 is started only after completion of the shifting action of the automatic transmission portion 20, so that an response of the engine 8 with respect to an operation of the accelerator pedal by the vehicle operator is accordingly improved.

(A16) The overlap determining portion 84 estimates the moment of completion of the shifting action of the automatic transmission portion 20 on the basis of a degree of process of the shifting action, and the overlap control portion 86 determines whether to retard the moment of starting of the engine 8, on the basis of the estimated moment of completion of the shifting action. Accordingly, it is possible to prevent overlapping between the shifting shock of the automatic transmission portion 20 and the starting shock of the engine 8 in the terminal portion of the shifting action.

(A17) When the engine 8 is started upon switching of the vehicle drive mode from the motor drive mode to the engine drive mode, the engine speed $N_E$ is raised according to the above-described first or second method of the engine-speed rise control, by engaging the switching brake B0 or switching clutch C0 while the first electric motor M1 is held in the de-energized state, where the second electric motor speed $N_{M2}$ is equal to or higher than the predetermined engine starting speed $N_{EST}$. Accordingly, the energy consumption of the first electric motor M1 can be saved. Where the second electric motor speed $N_{M2}$ is lower than the predetermined engine starting speed $N_{EST}$, the engine speed $N_E$ is raised according to the above-described third method, by energizing the first electric motor M1 to raise its speed $N_{M1}$, so that the engine speed $N_E$ can be raised to a desired value by raising the first electric motor speed $N_{M1}$, as is apparent from the collinear chart of FIG. 10. Accordingly, the second electric motor speed $N_{M2}$ lower than the speed corresponding to the predetermined engine starting speed $N_{EST}$ can be raised, and the raised second electric motor speed $N_{M2}$ is transmitted to the engine 8, so that the engine 8 can be started irrespective of the second electric motor speed $N_{M2}$.

(A18) In the first method of the engine-speed rise control which is selected when the second electric motor speed $N_{M2}$ is equal to or higher than the above-indicated predetermined reference value, and in which the switching brake B0 is engaged while the first electric motor is held in the de-energized state, the second electric motor speed $N_{M2}$ is lowered at the predetermined speed ratio, and the lowered second electric motor speed $N_{M2}$ is transmitted to the engine 8. Accordingly, the durability of the power distributing mechanism 16 can be improved.

(A19) The present embodiment is further arranged such that where the engine is started prior to the moment of completion of a shift-down action of the automatic transmission portion 20, the engine torque $T_E$ is temporarily reduced to reduce the shifting shock which would take place upon completion of the shift-down action.

(A20) The present embodiment is further arranged such that where the engine starting is retarded, the torque assisting operation to assist the engine 8 is performed to compensate for a delayed rise of the engine torque $T_E$, so that the vehicle occupants would not feel a delayed rise of the engine torque $T_E$.

Second Embodiment

Referring next to FIGS. 15-22, a second embodiment of this invention will be described. In the following description of the second embodiment, the same reference signs as used in the first embodiment will be used to identify the same elements.

Figures 15, 16:
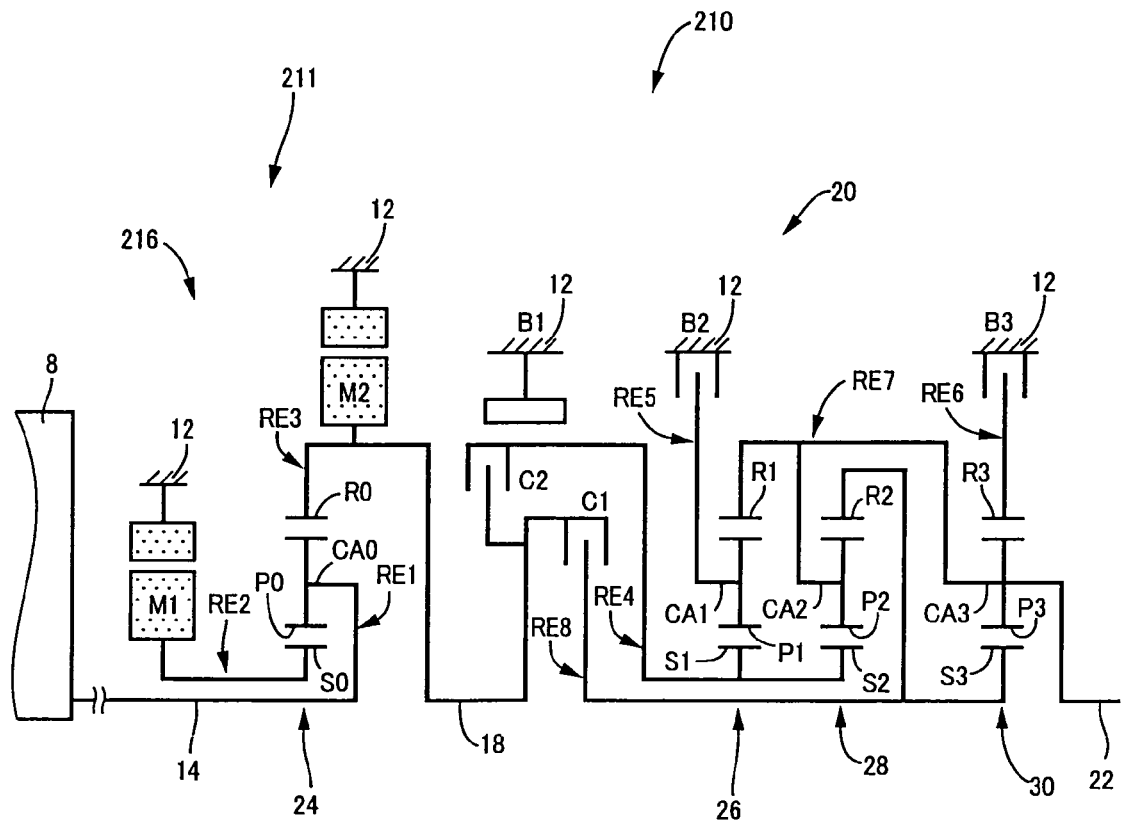
FIG. 15 a schematic view corresponding to that of FIG. 1, showing an arrangement of another drive system of a hybrid vehicle to which the present invention is applicable.
FIG. 16 is a table corresponding to that of FIG. 2, indicating shifting actions of the hybrid vehicle drive system of FIG. 15, which is operable in a selected one of a continuously-variable shifting state and a step-variable shifting state, in relation to different combinations of operating states of hydraulically operated frictional coupling devices to effect the respective shifting actions.
Figure 18:
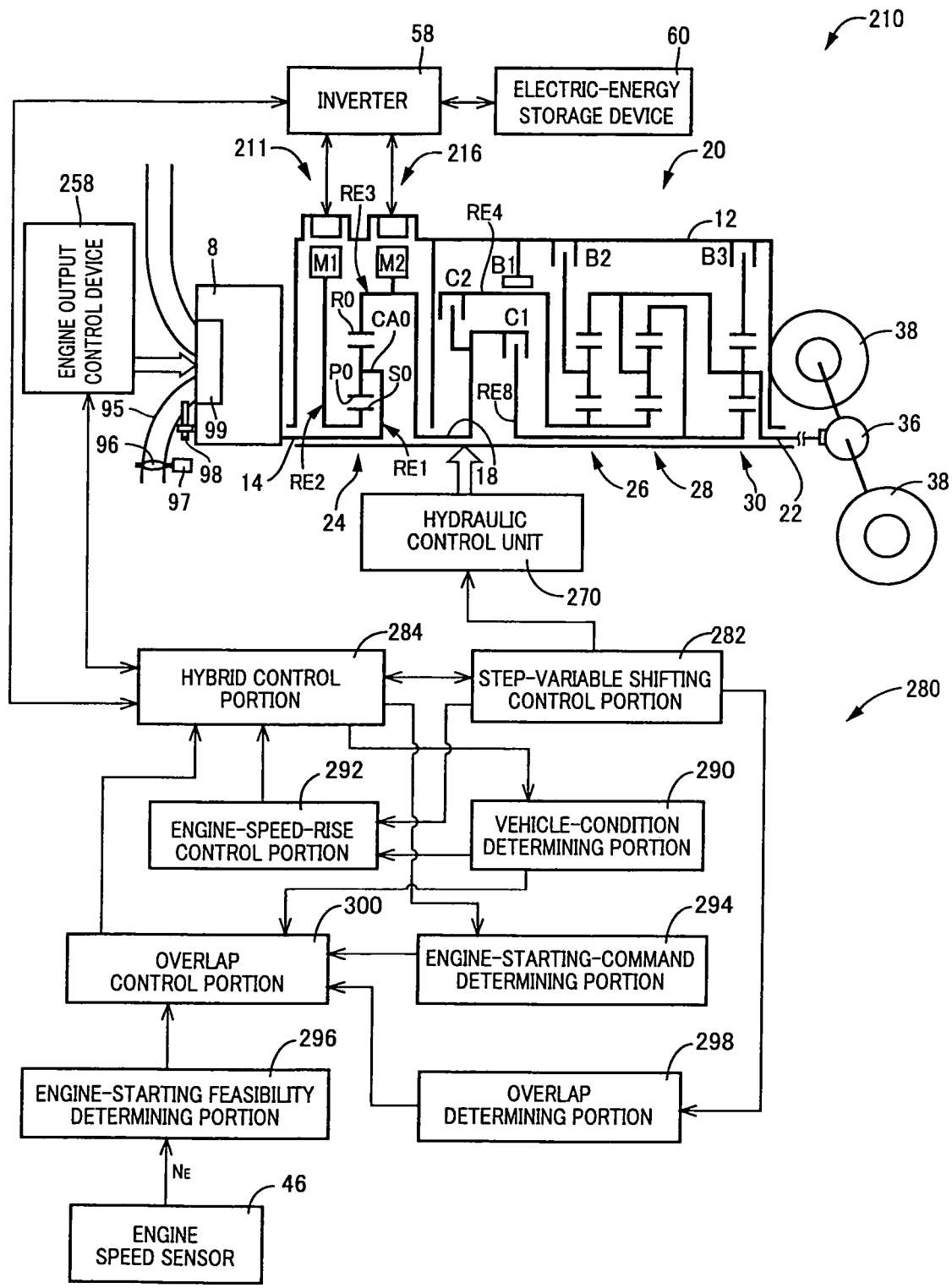
FIG. 18 is a functional block diagram corresponding to that of FIG. 6, illustrating major control functions of an engine starting control apparatus in the form of an electronic control device constructed according to another embodiment of this invention.
Figure 19:
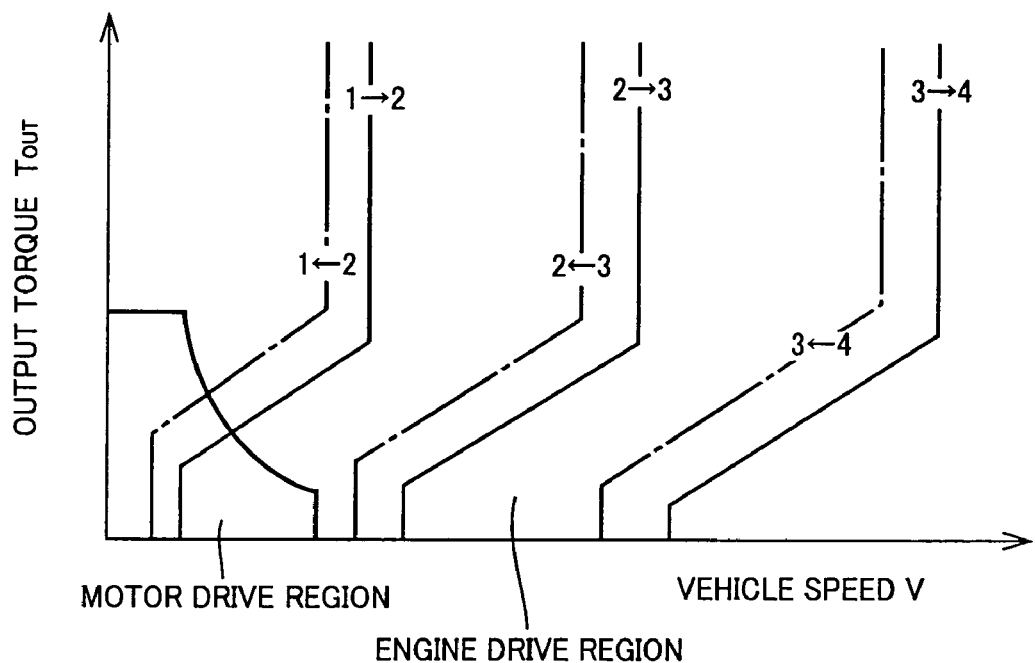
FIG. 19 is a view corresponding to that of FIG. 7, illustrating an example of a stored shifting boundary line map used for determining a shifting action of an automatic transmission portion, and an example of a stored drive-power-source switching boundary line map defining boundary lines between an engine drive region and a motor drive region for switching between an engine drive mode and a motor drive mode, in the same two-dimensional coordinate system defined by control parameters in the form of a running speed and an output torque of the vehicle, such that those maps are related to each other.
Figure 20:
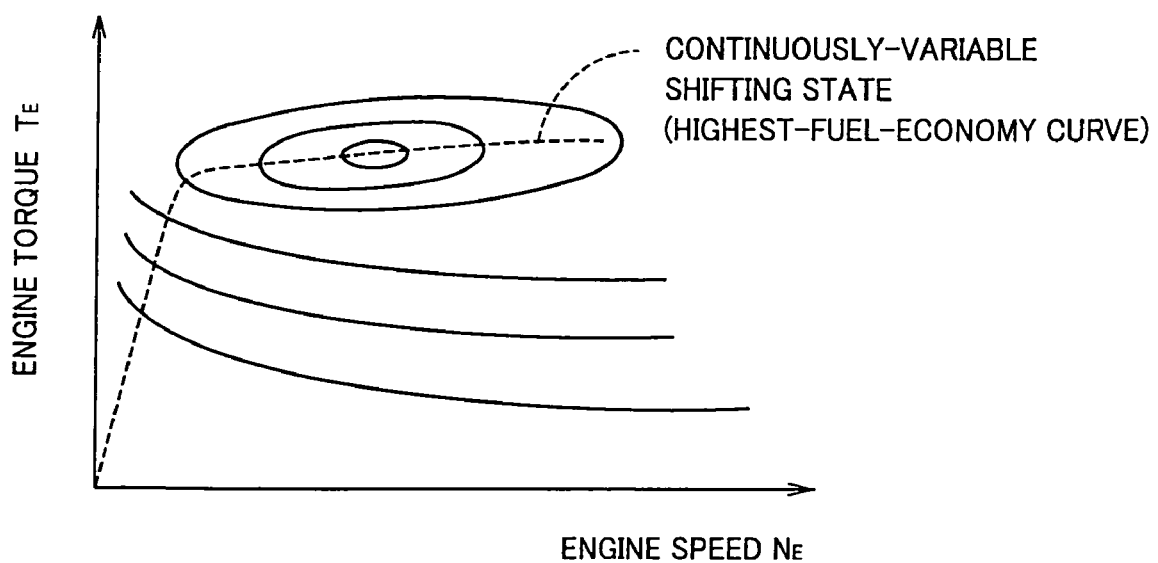
FIG. 20 is a view indicating an example of a fuel consumption map used in the drive system of FIG. 15, wherein a highest fuel economy curve is indicated by a broken line.

A control apparatus according to the second embodiment which, which includes an engine starting control apparatus is applicable to a transmission mechanism 210 which is different from the transmission mechanism 10 shown in FIG. 1. Referring to the schematic view of FIG. 1, there is shown a transmission mechanism 210 constituting a part of a drive system for a hybrid vehicle, which drive system is controlled by the control apparatus according to the present second embodiment. In FIG. 15, the transmission mechanism 210 includes: an input rotary member in the form of an input shaft 14; a differential portion 211 connected to the input shaft 14 either directly, or indirectly via a pulsation absorbing damper (vibration damping device) not shown; a step-variable or multiple-step transmission portion in the form of an automatic transmission portion 20 disposed between the differential portion 211 and drive wheels 38 (shown in FIG. 18) of the vehicle, and connected in series via a power transmitting member 18 (power transmitting shaft) to the differential portion 211 and the drive wheels 38; and an output rotary member in the form of an output shaft 22 connected to the automatic transmission portion 20. The input shaft 12, differential portion 211, automatic transmission portion 20 and output shaft 22 are coaxially disposed on a common axis in a casing 12 (hereinafter referred to as casing 12) functioning as a stationary member attached to a body of the vehicle, and are connected in series with each other. This transmission mechanism 210 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device (final speed reduction gear) 36 and a pair of drive axles, as shown in FIG. 18. The engine 8 may be a gasoline engine or diesel engine and functions as a vehicle drive power source directly connected to the input shaft 14 or indirectly via a pulsation absorbing damper.

In the present transmission mechanism 210, the engine 8 and the differential portion 211 are directly connected to each other. This direct connection means that the engine 8 and the transmission portion 211 are connected to each other, without a fluid-operated power transmitting device such as a torque converter or a fluid coupling being disposed therebetween, but may be connected to each other through the pulsation absorbing damper as described above. It is noted that a lower half of the transmission mechanism 210, which is constructed symmetrically with respect to its axis, is omitted in FIG. 1. This is also true to the other embodiments of the invention described below.

The differential portion 211 can be referred to as an electrically controlled differential portion, in a sense that the differential state of the differential portion 211 is changed by utilizing a first electric motor M1 (which will be described). This differential portion 211 provided with the first electric motor M1 is further provided with; a power distributing mechanism 216 functioning as a differential mechanism operable to mechanically distribute an output of the engine 8 received by the input shaft 14, to the first electric motor M1 and the power transmitting member 18; and a second electric motor M2 which is rotated with the output shaft 22. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 216 includes, as a major component, a planetary gear set 24 of a single pinion type having a gear ratio ρ0 of about 0.418, for example. The planetary gear set 24 of the power distributing mechanism 216 has rotary elements consisting of: a sun gear S0, a planetary gear P0; a first carrier CA0 supporting the planetary gear P0 such that the planetary gear P0 is rotatable about its axis and about the axis of the sun gear S0; and a ring gear R0 meshing with the sun gear S0 through the planetary gear P0. Where the numbers of teeth of the sun gear S0 and the ring gear R0 are represented by ZS0 and ZR0, respectively, the above-indicated gear ratio ρ0 is represented by ZS0/ZR0.

In the power distributing mechanism 216, the carrier CA0 is connected to the input shaft 14, that is, to the engine 8, and the sun gear S0 is connected to the first electric motor M1, while the ring gear R0 is connected to the power transmitting member 18. The power distributing mechanism 216 is placed in a differential state in which three elements of the first planetary gear set 24 consisting of the sun gear S0, carrier CA0 and ring gear R0 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the power distributing mechanism 216 (differential portion 211) is placed in the continuously-variable shifting state (electrically established CVT state), in which the rotating speed of the power transmitting member 18 is continuously variable, irrespective of the rotating speed of the engine 8. Namely, the power distributing mechanism 216 functions as an electrically controlled continuously variable transmission the speed ratio γ0 of which (rotating speed of the input shaft 14/rotating speed of the power transmitting member 18) of the power distributing mechanism 216 is continuously changed from a minimum value γ0min to a maximum value γ0max. Thus a differential state between the rotating speeds of the input shaft 14 and power transmitting member 18 is controlled by controlling the operating states of the first electric motor M1, second electric motor M2 and engine 8, which are operatively connected to the power distributing mechanism 216 (differential portion 211).

The automatic transmission portion 20 of the transmission mechanism 210 constitutes a part of a power transmitting path between the differential portion 211 and the drive wheels 38. This automatic transmission portion 20 is a planetary gear type multiple-step transmission functioning as a step-variable automatic transmission, which includes a single-pinion type first planetary gear set 26, a single-pinion type second planetary gear set 28 and a single-pinion type third planetary gear set 30. The second planetary gear set 26 has: a first sun gear S1; a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. For example, the first planetary gear set 26 has a gear ratio ρ1 of about 0.562. The second planetary gear set 28 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 28 has a gear ratio ρ2 of about 0.425. The third planetary gear set 30 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 30 has a gear ratio ρ3 of about 0.421. Where the numbers of teeth of the first sun gear S1, firs ring gear R1, second sun gear S2, second ring gear R2, third sun gear S3 and third ring gear R3 are represented by ZS1, ZR1, ZS1, ZR2, ZS3 and ZR3, respectively, the above-indicated gear ratios ρ1, ρ2 and ρ3 are represented by ZS1/ZR1. ZS2/ZR2, and ZS3/ZR3, respectively.

In the automatic transmission portion 20, the first sun gear S1 and the second sun gear S2 are integrally fixed to each other as a unit, selectively connected to the power transmitting member 18 through a second clutch C2, and selectively fixed to the casing 12 through a first brake B1. The first carrier CA1 is selectively fixed to the casing 12 through a second brake B2, and the third ring gear R3 is selectively fixed to the casing 12 through a third brake B3. The first ring gear R1, second carrier CA2 and third carrier CA3 are integrally fixed to each other and fixed to the output shaft 22. The second ring gear R2 and the third sun gear S3 are integrally fixed to each other and selectively connected to the power transmitting member 18 through a first clutch C1.

Thus, the automatic transmission portion 20 and the differential portion 211 (power transmitting member 18) are selectively connected to each other through the first clutch C1 or the second clutch C2, which is provided to shift the automatic transmission portion 20. In other words, the first clutch C1 and the second clutch C2 function as a coupling device operable to place a power transmitting path between the power transmitting member 18 and the automatic transmission portion 20, that is, a power transmitting path between the differential portion 11 (power transmitting member 18) and the drive wheels 38, selectively in one of a power transmitting state in which a vehicle drive force can be transmitted through the power transmitting path, and a power cut-off state in which the vehicle drive force cannot be transmitted through the power transmitting path. Described more specifically, the above-indicated power transmitting path is placed in the power transmitting state when at least one of the first clutch C1 and the second clutch C2 is placed in the engaged state, and is placed in the power cut-off state when the first clutch C1 and the second clutch C2 are placed in the released state.

The automatic transmission portion 20 is placed in a selected one of a first gear position (first speed position) through a fourth gear position (fourth speed position), a reverse gear position (rear drive position) and a neural position, by concurrent engaging and releasing actions of corresponding combination of the two frictional coupling devices selected from the above-described clutches C1, C2 and brakes B1-B3, as indicated in the table of FIG. 16. The above-indicated positions have respective speed ratios γT (rotating speed $N_{18}$ of the power transmitting member 18/rotating speed $N_{OUT}$ of the output shaft 22) which change as geometric series. For example, the first gear position having the highest speed ratio γ1 of about 3.357, for example, is established by engaging actions of the first clutch C1 and third brake B3, and the second gear position having the speed ratio γ2 of about 2.180, for example, which is lower than the speed ratio γ1, is established by engaging actions of the first clutch C1 and second brake B2, as indicated in the table of FIG. 16. Further, the third gear position having the speed ratio γ3 of about 1.424, for example, which is lower than the speed ratio γ2, is established by engaging actions of the first clutch C1 and first brake B1, and the fourth gear position having the speed ratio γ4 of about 1.000, for example, which is lower than the speed ratio γ3, is established by engaging actions of the first clutch C1 and second clutch C2. Further, the reverse gear position having the speed ratio γR of about 3.209, for example, which is intermediate between the speed ratios γ1 and γ2, is established by engaging actions of the second clutch C2 and the third brake B3. The neutral position N is establishing by releasing the first and second clutches C1, C2 and first, second and third brakes B1, B2, B2.

The above-described first clutch C1, second clutch C2, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 210 constructed as described above, the differential portion 211 functioning as the continuously variable transmission and the automatic transmission portion 20 cooperate with each other to constitute a continuously-variable transmission. Further, the differential portion 211 the speed ratio of which is controlled to be held constant, and the automatic transmission portion 20 cooperate with each other to function substantially as a step-variable transmission.

Described in detail, when the differential portion 211 functions as the continuously-variable transmission while the automatic transmission portion 20 connected in series with the differential portion 211 functions as the step-variable transmission, the input shaft speed of the automatic transmission portion 20, that is, the rotating speed of the power transmitting member 18 (hereinafter referred to as "transmitting-member speed $N_{18}$") is continuously variable for a selected one of the first through fourth gear positions and the reverse gear position. Accordingly, the overall speed ratio γT (rotating speed $N_{IN}$ of the input shaft 14/rotating speed $N_{OUT}$ of the output shaft 22) of the transmission mechanism 210 is continuously variable, with the transmission mechanism 210 functioning as the continuously-variable transmission as a whole. The overall speed ratio γT of the transmission mechanism 210 is defined by the speed ratio γT0 of the differential portion 211 and the speed ratio γ of the automatic transmission portion 20.

Thus, the transmitting-member speed $N_{18}$ is continuously variable for the presently selected one of the first, second, third and fourth gear positions and reverse gear position indicated in the table of FIG. 16, so that the overall speed ratio γT of the transmission mechanism 210 is continuously variable between the speed ratios of the first gear position and the fourth gear position.

When the speed ratio of the differential portion 211 is controlled to be held constant, the overall speed ratio γT of the transmission mechanism 210 changes in steps as geometric series, by selectively establishing the first through fourth gear positions and reverse gear position by the engaging actions of the respective combinations of the two frictional coupling devices selected from the clutches C and brakes B.

When the speed ratio γ0 of the differential portion 211 is controlled to be held constant at "1", for example, the speed ratios (overall speed ratios γT) indicated in the table of FIG. 16 are obtained by shifting the automatic transmission portion 20 to the respective gear positions. When the speed ratio γ0 of the differential portion 211 is controlled to be held constant at a value lower than that of the fourth gear position, for example, at about 0.7, the overall speed ratios γT are made lower than the speed ratio of the fourth gear position, for example, about 0.7. It is noted that since the automatic transmission portion 20 is shifted by concurrent engaging and releasing actions of two selected ones of the clutches C and brakes B, the power transmitting path through the automatic transmission portion 20 is disconnected or substantially disconnected during a shifting action of the automatic transmission portion 20, so that the output shaft 22 and the differential portion 211 are disconnected or substantially disconnected from each other.

Figure 17:
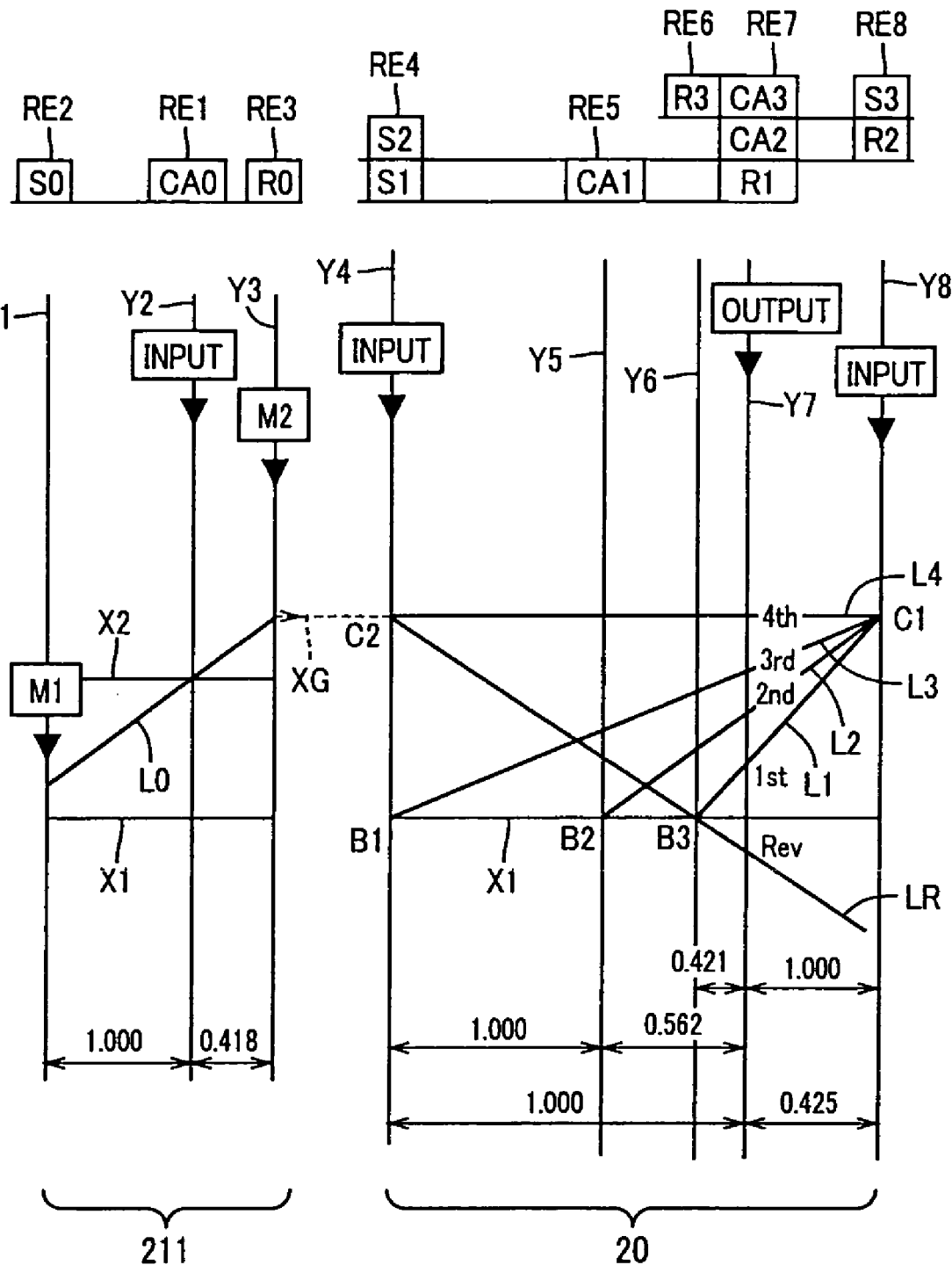
FIG. 17 is a collinear chart corresponding to that of FIG. 3, indicating relative rotating speeds of the hybrid vehicle drive system of FIG. 15 operated in the step-variable shifting state, in different gear positions of the drive system.

The collinear chart of FIG. 17 indicates, by straight lines, a relationship among the rotating speeds of the rotary elements in each of the gear positions of the transmission mechanism 210, which is constituted by the differential portion 211 and the automatic transmission portion 20. The collinear chart of FIG. 17 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 216 of the differential portion 211 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the automatic transmission portion 20 respectively represent the relative rotating speeds, of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 17, the power distributing mechanism 216 (differential portion 211) of the transmission mechanism 210 is arranged such that the first rotary element RE1 (first carrier CA0) of the first planetary gear set 24 is integrally fixed to the input shaft 14 (engine 8), and the second rotary element RE2 is fixed to the first electric motor M1, while the third rotary element RE3 (first ring gear R0) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

When the rotating speed of the ring gear R0 represented by a point of intersection between the straight lines L0 and Y3 is determined by the vehicle running speed V and is held substantially constant, for example, in the differential state of the differential portion 211 in which the first, second and third rotary elements RE1-RE3 are rotatable relative to each other, the rotating speed of the first sun gear S0 represented by the straight line L0 and vertical line Y1, namely, the speed of the first electric motor M1 is raised or lowered by controlling the engine speed $N_E$ to raise or lower the rotating speed of the first carrier CA0 represented by the straight line L0 and vertical line Y2.

When the operating speed of the first electric motor M1 is controlled to hold the speed ratio γ0 of the differential portion 211 at "1" so that the rotating speed of the first sun gear S0 is made equal to the engine speed $N_E$, the straight line L0 and the horizontal line X2 are aligned with each other, the first ring gear R0 and the power transmitting member 18 are rotated at a speed corresponding to the engine speed $N_E$. When the operating speed of the first electric motor M1 is controlled to hold the speed ratio γ0 of the differential portion 211 at a value lower than "1", for example, at 0.7, so that the rotating speed of the first sun gear S0 is zeroed, on the other hand, the transmitting-member speed $N_{18}$ is made higher than the engine speed $N_E$.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22 and the second electric motor M2, while the eighth rotary element RE8 is selectively connected to the power transmitting member 18 through the first clutch C1.

When the first clutch C1 is engaged to transmit a rotary motion of the output rotary member in the form of the power transmitting member 18 (third rotary element RE3) of the differential portion 211 to the eighth rotary element RE8, the automatic transmission portion 20 is placed in the first gear position by the engaging the third brake B3 as well as the first clutch C1. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 17. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22.

FIG. 18 is a functional block diagram for explaining major control functions of an electronic control device 280 which functions as the engine starting control apparatus and which includes a step-variable shifting control portion 282, a hybrid control portion 284, a vehicle-condition determining portion 290, an engine-speed-rise control portion 292, an engine-starting-command determining portion 294, an engine-starting feasibility determining portion 296, an overlap determining portion 298, and an overlap control portion 300. The step-variable shifting control portion 292 is arranged to determine whether a shifting action of the automatic transmission portion 20 should take place, that is, to determine the gear position to which the automatic transmission portion 20 should be shifted. This determination is made on the basis of a condition of the hybrid vehicle as represented by the vehicle speed V and an output torque $T_{OUT}$ of the automatic transmission portion 20, and according to a shifting boundary line map (shifting control map or relation) stored in a memory and which represents shift-up boundary lines indicated by solid lines in FIG. 19 and shift-down boundary lines indicated by one-dot chain lines in FIG. 19. The step-variable shifting control portion 282 implements an automatic shifting control of the automatic transmission portion 20, to establish the determined gear position.

Described in detail, the step-variable shifting control portion 292 generates commands (shifting commands or hydraulic control command) to be applied to a hydraulic control unit 270, to selectively engage and release the respective two hydraulically operated frictional coupling devices, for establishing the determined gear position of the automatic transmission portion 20 according to the table of FIG. 16. That is, the step-variable shifting control portion 282 commands the hydraulic control unit 270 to activate the appropriate hydraulic actuators to concurrently engage one of the two frictional coupling device and release the other frictional coupling device, to effect the clutch-to-clutch shifting actions of the automatic transmission portion 20.

The hybrid control portion 284 is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 211 operating as the electrically controlled continuously variable transmission. For instance, the hybrid control portion 284 calculates a target (required) vehicle output at the present running speed V of the vehicle, on the basis of the operating amount $A_{CC}$ of an accelerator pedal used as an operator's required vehicle output and the vehicle running speed V, and calculate a target total vehicle output on the basis of the calculated target vehicle output and a required amount of generation of an electric energy by the first electric motor M1. The hybrid control portion 284 calculates a target output of the engine 8 to obtain the calculated target total vehicle output, while taking account of a power transmission loss, a load acting on various devices of the vehicle, an assisting torque generated by the second electric motor M2, etc. The hybrid control portion 284 controls the speed $N_E$ and torque $T_E$ of the engine 8, so as to obtain the calculated target engine output, and the amount of generation of the electric energy by the first electric motor M1.

The hybrid control portion 284 is arranged to implement the hybrid control while taking account of the presently selected gear position of the automatic transmission portion 20, so as to improve the drivability of the vehicle and the fuel economy of the engine 8. In the hybrid control, the differential portion 211 is controlled to function as the electrically controlled continuously-variable transmission, for optimum coordination of the engine speed $N_E$ and for efficient operation of the engine 8, and the rotating speed of the power transmitting member 18 determined by the vehicle speed V and the selected gear position of the transmission portion 20. That is, the hybrid control portion 284 determines a target value of the overall speed ratio γT of the transmission mechanism 210, so that the engine 8 is operated according to a stored highest-fuel-economy curve (fuel-economy map or relation)

stored in memory means. Broken line in FIG. 20 indicates an example of the highest-fuel-economy curve. The target value of the overall speed ratio γT of the transmission mechanism 210 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control portion 284 controls the speed ratio γ0 of the differential portion 211, so as to obtain the target value of the overall speed ratio γT, so that the overall speed ratio γT can be controlled within a predetermined range.

In the hybrid control, the hybrid control portion 284 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the output shaft 22. Thus, the drive system is provided with an electric path through which an electric energy generated by conversion of a portion of a drive force of the engine 8 is converted into a mechanical energy.

The hybrid control portion 284 is further arranged to hold the engine speed $N_E$ at a substantially constant value or control the engine speed $N_E$ to a desired value owing to the electric CVT function of the differential portion 311, by controlling the first electric motor speed $N_{M1}$ and/or second electric motor speed $N_{M2}$, irrespective of whether the vehicle is stationary or running. In other words, the hybrid control portion 284 is capable of controlling the first electric motor speed $N_{M1}$ and/or second electric motor speed $N_{M2}$, while holding the engine speed $N_E$ at a substantially constant value or controlling the engine speed $N_E$ to a desired value.

For example, the hybrid control portion 284 is arranged to raise the engine speed $N_E$ during running of the vehicle, by raising the first electric motor speed $N_{M1}$ while the second electric motor speed $N_{M2}$ determined by the vehicle speed V (rotating speed of the drive wheels 38) is held substantially constant, as is apparent from the collinear chart of FIG. 17. The hybrid control portion 284 holds the engine speed $N_E$ substantially constant during a shifting action of the automatic transmission portion 20, by changing the first electric motor speed $N_{M1}$ in a direction opposite to the direction of change of the second electric motor speed $N_{M2}$ as a result of the shifting action of the automatic transmission portion 20, while the engine speed $N_E$ is held substantially constant, The hybrid control portion 284 includes engine output control means functioning to control the engine 8, so as to provide a required output, by controlling the throttle actuator 97 to open and close the electronic throttle valve 96, and controlling an amount and time of fuel injection by the fuel injecting device 98 into the engine 8, and/or the timing of ignition of the igniter by the ignition device 99, alone or in combination.

For instance, the hybrid control portion 284 is basically arranged to control the throttle actuator 97 on the basis of the operation amount $A_{CC}$ of the accelerator pedal and according to a predetermined stored relationship (not shown) between the operation amount $A_{CC}$ of the accelerator pedal and the opening angle $θ_{TH}$ of the electronic throttle valve 96 such that the opening angle $θ_{TH}$ increases with an increase of the operation amount $A_{CC}$. According to control commands received from the hybrid control portion 284, the engine output control device 258 controls the throttle actuator 97 to open and close the electronic throttle valve 96, controls the fuel injecting device 98 to control the fuel injection into the engine 8, and controls the ignition device (igniter) 99 to control the ignition timing of the engine 8, for thereby controlling the torque of the engine 8.

The hybrid control portion 284 is capable of establishing a motor drive mode to drive the vehicle by the electric motor, by utilizing the electric CVT function (differential function) of the differential portion 211, irrespective of whether the engine 8 is in the non-operated state or in the idling state. Generally, the hybrid control portion 284 establishes the motor drive mode when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low. For reducing a dragging of the engine 8 in its non-operated state and improving the fuel economy in the motor-drive mode, the hybrid control portion 284 is configured to hold the engine speed $N_E$ at zero or substantially zero as needed, owing to the electric CVT function (differential function) of the differential portion 11, that is, by controlling the differential portion 11 to perform its electric CVT function (differential function), so that the first electric motor speed $N_{M1}$ is controlled to be in a non-load state, so as to be freely rotated to have a negative speed $N_{M1}$.

The hybrid control portion 284 is further capable of performing a so-called "drive-force assisting" operation (torque assisting operation) to assist the engine 8, even in the engine-drive region of the vehicle condition, by supplying an electric energy from the first electric motor M1 or the electric-energy storage device 60 to the second electric motor M2 through the above-described electric path, so that the second electric motor M2 is operated to transmit a drive torque to the drive wheels 38.

The hybrid control portion 284 is further configured to place the first electric motor M1 in a non-load state in which the first electric motor M1 is freely rotated, so that the differential portion 211 is placed in a state similar to the power cut-off state in which power cannot be transmitted through the power transmitting path within the differential portion 211, and no output can be generated from the differential portion 211. Namely, the hybrid control portion 284 is arranged to place the first electric motor M1 in the non-load state, for thereby placing the differential portion 211 in a neutral state in which the power transmitting path is electrically cut off.

The hybrid control portion 284 is further configured to control the second electric motor M2 such that the second electric motor M2 is operated as the electric generator by a kinetic energy of the running hybrid vehicle during coasting of the hybrid vehicle with the accelerator pedal held in its non-operated position, or during brake application to the hybrid vehicle. In this case, the kinetic energy by which the second electric motor M2 is driven is transmitted in the direction from the drive wheels 34 toward the engine 8. Thus, the hybrid control portion 284 functions as regeneration control means for charging the electric-energy storage device 60 with the electric energy which is generated by the second electric motor M2 and which is supplied through the inverter 58.

According to a regeneration control by the regeneration control means, the amount of electric energy generated by the second electric motor M2 operating as the electric generator is controlled on the basis of the amount of electric energy SOS stored in the electric-energy storage device 56, and a braking force generated by a hydraulic braking system of the vehicle according to an amount of operation of a brake pedal.

To reduce the shock as felt by the vehicle occupants due to overlapping of the starting operation of the engine 8 and a shifting action of the automatic transmission portion 20, the engine starting control apparatus includes the above-indicated vehicle-condition determining portion 290, engine-speed-rise control portion 292, engine-starting-command determining portion 294, engine-starting feasibility determining portion 296, overlap determining portion 298 and overlap control portion 300, which will be described in detail.

Referring back to FIG. 18, the vehicle-condition determining portion 290 is configured to determine whether the motor drive mode is presently selected by the hybrid control portion 284. In this respect, it is noted that an engine-speed rise control implemented by the engine starting control apparatus is required when the engine 8 is started during running of the vehicle in the motor drive mode.

The engine-speed-rise control portion 292 is operated when an affirmative determination is obtained by the vehicle-condition determining portion 290, and when a shifting command to shift the automatic transmission portion 20 is generated by the step-variable shifting control portion 284. The engine-speed-rise control portion 292 is configured to implement the engine-speed rise control for raising the engine speed $N_E$ to a value (e.g., 400 rpm) not lower than a predetermined target speed in the form of the engine starting speed $N_{EST}$ (e.g., idling speed $N_{EIDL}$) at which the engine 8 can be started. Described in detail, the engine-speed-rise control portion 292 energizes the first electric motor M1 to operate in the same direction as the second electric motor M2, to raise the first electric motor speed $N_{M1}$ corresponding to the vertical line Y1 in FIG. 17, for raising the engine speed $N_E$ corresponding to the vertical line Y2 in FIG. 17, from zero or substantially zero to the value not lower than the predetermined engine starting speed $N_{EST}$. When the engine speed $N_E$ is raised to the value not lower than the predetermined engine starting speed $N_{EST}$, by raising the first electric motor speed $N_{M1}$, a resistance to a rotary motion of the engine 8 acts in the direction to lower the second electric motor speed $N_{M2}$. In view of this face, the second electric motor M2 is operated to generate a reaction torque against the above-indicated resistance, in addition to a torque for maintaining the input shaft speed of the automatic transmission portion 20, so that the input shaft speed is maintained at a value required for the shifting action of the automatic transmission portion 20. It is also noted that the power transmitting path for transmitting the vehicle drive force to the drive wheels 38 through the automatic transmission portion 20 is disconnected or substantially disconnected during the shifting action of the automatic transmission portion 20. Accordingly, the above-indicated reaction torque generated by the second electric motor M2 is larger during the shifting action than when the automatic transmission 20 is not in a shifting action. It is further noted that the engine starting speed $N_{EST}$ is not lower than a threshold value NE1 used by the engine-starting feasibility determining portion 298 described below. If an engine starting command to start the engine 8 is not generated during a period from the moment of generation of the shifting command and the moment of completion of the shifting action of the automatic transmission portion 20, the engine-speed-rise control portion 292 cancels the engine-speed rise control and rapidly lowers the engine speed $N_E$ for reducing the electric energy consumption of the first electric motor M1 and reducing the deterioration of the fuel economy.

The engine-starting command determining portion 294 is configured to determine whether the engine starting command for starting the engine 8 has been generated from the hybrid control portion 284. For instance, the engine starting command is generated by the hybrid control portion 284 when the accelerator pedal is depressed by a large amount during running of the vehicle in the motor drive mode, to increase the vehicle drive torque by operating the engine 8.

The engine-starting feasibility determining portion 296 is configured to determine whether the engine 8 can be started (ignited). This determination is made on the basis of the engine speed $N_E$ detected by the engine speed sensor 46. Described more specifically, an affirmative determination is obtained by the engine-starting feasibility determining portion 296 if the engine speed NE is higher than the above-0indicated threshold value NE1 above which the engine 8 can be started. This threshold value NE1 may be a lower limit of the engine speed $N_E$ which is obtained by experimentation and above which the engine 8 can be started. Alternatively, the threshold value NE1 is higher than that lower limit by a suitable amount.

The overlap determining portion 298 stores therein required shifting times of the different shifting actions of the automatic transmission portion 20, and estimates the moment of completion of a shifting action which will take place according to the shifting command, on the basis of the stored required shifting time of the shifting action in question or the present degree of progress of the shifting action. The shifting action in question is determined by the two gear positions before and after the shifting action, which gear positions are represented by information received from the step-variable shifting control portion 282. On the basis of engine speed $N_E$ detected by the engine speed sensor 46, the overlap determining portion 84 further determines whether the operation to start the engine 8 can be initiated immediately. On the basis of the estimated moment of completion of the shifting action, the overlap determining portion 298 determines whether the shifting action (a terminal portion of the shifting action) and the starting (ignition) of the engine 8 overlap each other or not. This determination is made by determining whether an estimated time difference between the moment of completion of the shifting action and the moment of initiation of the engine starting operation is shorter than a predetermined lower limit, which is obtained by experimentation and above which a shock as felt by the vehicle occupants upon concurrent shifting of the automatic transmission portion 20 and starting of the engine 8 can be relatively small. The overlap determining portion 292 determines that the terminal portion of the shifting action and the engine starting overlap each other when the above-indicated time difference is shorter than the lower limit stored in the overlap determining portion 292.

The overlap control portion 300 commands the hybrid control portion 294 to immediately start (ignite) the engine 8 by initiating the ignition of the engine 8 and injection of a fuel into the engine 8, if a negative determination is obtained by the overlap determining portion 298, that is, if the overlap determining portion 298 does not determine that the terminal portion of the shifting action of the automatic transmission portion 20 and the starting of the engine 8 do not overlap each other, while an affirmative determination that the engine speed $N_E$ is higher than the threshold value NE1 is obtained by the engine-starting feasibility determining portion 296, after an affirmative determination that the engine starting command is generated is obtained by the engine-startingcommand determining portion 294 while an affirmative determination that the vehicle is running in the motor drive mode is obtained by the vehicle-condition determining portion 290.

The overlap control portion 300 commands the hybrid control portion 284 not to immediately start the engine 8, but to retard or delay the moment of starting (ignition) of the engine 8, by initiating the fuel supply to the engine 8 to start or ignite the engine 8 after the moment of completion of the shifting action, namely, after the above-indicated time difference has passed, but at a moment as early as possible, if an affirmative determination that the terminal portion of the shifting action of the automatic transmission portion 20 and the starting of the engine 8 overlap each other is obtained by the overlap determining portion 298, while the affirmative determination that the engine speed $N_E$ is higher than the threshold value NE1 is obtained by the engine-starting feasibility determining portion 296, after the affirmative determination that the engine starting command is generated is obtained by the engine-starting-command determining portion 294 while the affirmative determination that the vehicle is running in the motor drive mode is obtained by the vehicle-condition determining portion 290, or if a negative determination is obtained by the engine-starting feasibility determining portion 296, that is, if the engine-starting feasibility determining portion 296 determines that the engine speed $N_E$ is higher than the threshold value NE1. In the latter case wherein the engine $N_E$ is not higher than the threshold value NE1, the engine 8 is started after the engine speed $N_E$ has exceeded the threshold value NE1. Where the starting of the engine 8 is retarded to a moment after the moment of completion of the shifting action of the automatic transmission portion 20 as described above, the hybrid control portion 284 may implement a temporary torque assisting control to assist the engine 8 by operating the second electric motor M2, for compensating for a delayed rise of the engine torque TE due to the retardation of the engine starting. It will be understood that the overlap control portion 300 functions as an engine-start control portion configured to change a moment of starting of the engine 8, on the basis of the engine speed $N_E$ upon generation of the engine starting command during the shifting action of the automatic transmission portion 20. The engine-start control portion is further configured to start the engine during the shifting action of the automatic transmission portion 20, when it is determined that the terminal portion of the shifting action of the automatic transmission portion 20 and the starting operation of the engine 8 do not overlap each other. The engine-start control portion is further configured to determine the moment of starting of the engine 8 on the basis of the degree of progress of the shifting action of the automatic transmission portion 20.

Figure 21:
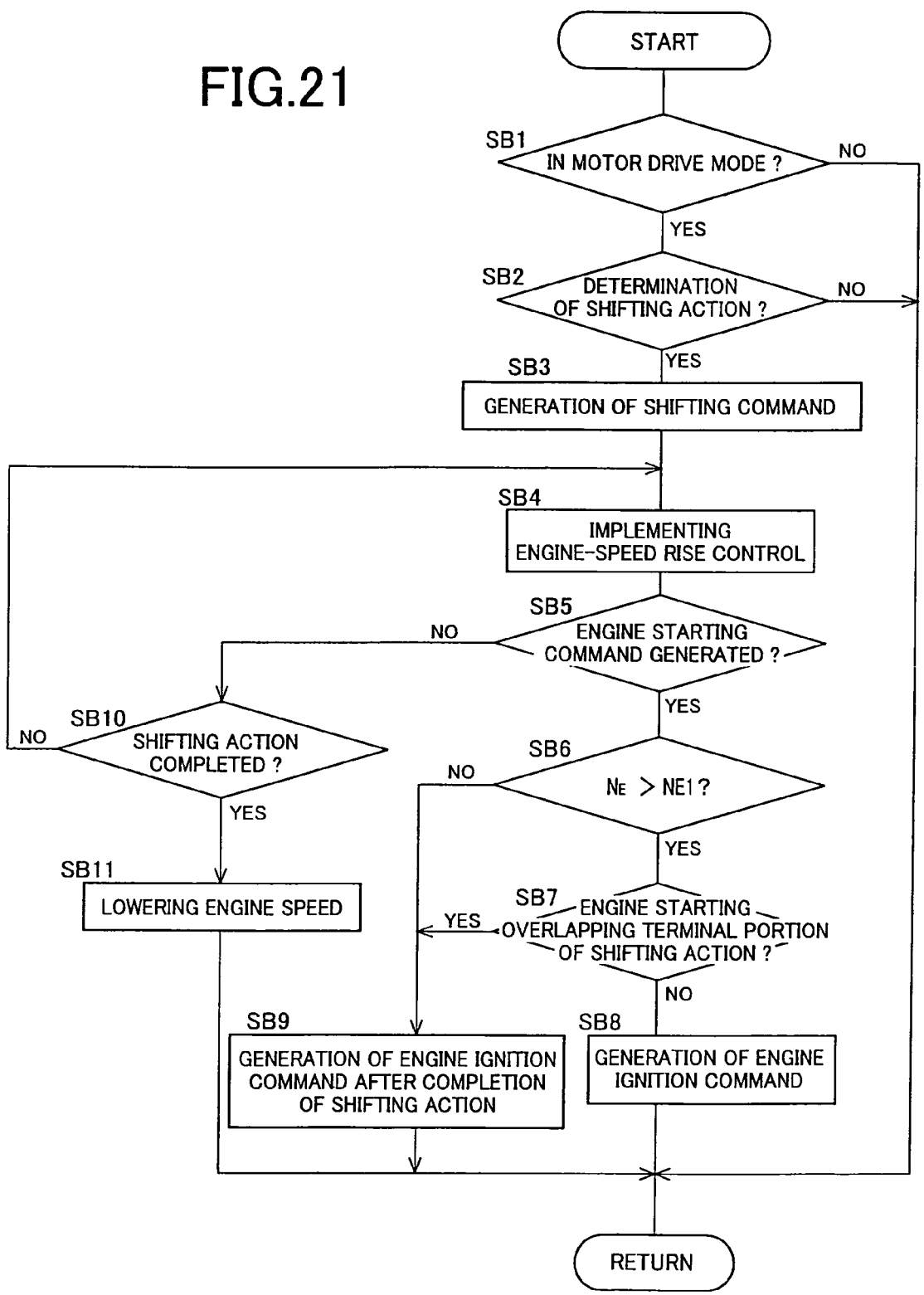
FIG. 21 is a flow chart corresponding to that of FIG. 11, illustrating a control routine executed by the electronic control device of FIG. 18, that is, a control operation performed when a terminal portion of a shifting action of the automatic transmission portion and a starting operation of the engine overlap each other.

FIG. 21 is a flow chart illustrating a major portion of a control operation of the electronic control device 280, that is, a control routine executed when the commands to shift the automatic transmission portion 20 and to start the engine 8 are generated. This control routine is repeatedly executed with an extremely short cycle time of about several milliseconds to about several tens of milliseconds, for example.

The control routine of FIG. 21 is initiated with step SB1 corresponding to the vehicle-condition determining portion 290, to determine whether the transmission mechanism 210 is presently placed in the motor drive mode. If a negative determination is obtained in step SB1, one cycle of execution of the present control routine is terminated. If an affirmative determination is obtained in step SB1, the control flow goes to step SB2.

Step SB2 is provided to determine whether a shifting action of the automatic transmission portion 20 should take place. This determination is made on the basis of the vehicle speed V and the output torque $T_{OUT}$ and according to the shifting boundary line map indicated in FIG. 19 by way of example. If a negative determination is obtained in step SB2, one cycle of execution of the present control routine is terminated. If an affirmative determination is obtained in step SB2, the control flow goes to step SB3.

In SB3, the shifting command to shift the automatic transmission portion 20 is generated. Step SB3 is followed by step SB4.

In step SB4, the engine speed $N_E$ is raised to the value not lower than the engine starting speed $N_{EST}$. Described in detail, the first electric motor M1 is energized to operate in the same direction as the second electric motor M2, so that the first electric motor speed $N_{M1}$ corresponding to the vertical line Y1 in FIG. 17 is raised, whereby the engine speed $N_E$ corresponding to the vertical line Y2 in FIG. 17 is raised from 0 rpm or substantially 0 rpm to the value now not lower than the engine starting speed $N_{EST}$. Then, the control flow goes to step SB5.

Step SB5 corresponding to the engine-starting-command determining portion 294 is provided to determine whether the command to start the engine 8 has been generated. If an affirmative determination is obtained in step SB5, the control flow goes to step SB6. If a negative determination is obtained in step SB5, the control flow goes to step SB10.

Step SB6 corresponding to the engine-starting feasibility determining portion 296 is provided to determine whether the engine 8 can be immediately started. This determination is made on the basis of the engine speed $N_E$ detected by the engine speed sensor 46. Namely, affirmative determination is obtained in step SB6 when the engine speed $N_E$ is higher than the threshold value NE1, and a negative determination is obtained in step SB6 when the engine speed $N_E$ is not higher than the threshold value NE1. The control flow goes to step SB7 if the affirmative determination is obtained in step SB6, and to step SB9 if the negative determination is obtained in step SB6.

In step SB7 corresponding to the overlap determining portion 298, the commanded shifting action is specified on the basis of the gear positions of the automatic transmission portion 20 before and after the shifting action, and the moment of completion of the shifting action in question is estimated on the basis of the stored required shifting times, or the present degree of progress of the shifting action. On the basis of the estimated moment of completion of the shifting action, the determination is made as to whether the shifting action and the starting (ignition) of the engine 8 overlap each other or not. If a negative determination is obtained in step SB7, the control flow goes to step SB8. If an affirmative determination is obtained in step SB7, the control flow goes to step SB9. It is determined that the shifting action and the engine starting overlap each other, if the estimated time difference between the moment of completion of the shifting action and the moment of initiation of the engine ignition is shorter than the predetermined lower limit.

In step SB8, the engine 8 is immediately started by commanding the ignition device 99 and the fuel injecting device 98.

In step SB9, the engine 8 is started (ignited) after the engine speed $N_E$ has exceeded the threshold value NE1 and after the moment of completion of the shifting action, namely, after the above-indicated time difference has passed, but at a moment as early as possible.

Step SB10 is provided to determine whether the shifting action of the automatic transmission portion 20 is completed. If an affirmative determination is obtained in step SB10, the control flow goes to step SB11. If a negative determination is obtained in step SB10, the control flow goes back to step SB4. Accordingly, the engine-speed-rise control is continued after the moment of generation of the shifting command, until the shifting action is completed. It is noted that the determination as to whether the shifting action is completed is made, for example, by determining whether the clutch C or brake B to be engaged for the shifting action is slipping or not, on the basis of a speed difference between the input shaft (power transmitting member 18) of the automatic transmission portion 20 and the output shaft 22, and the speed ratio of the automatic transmission portion 20.

In step SB11, the engine-speed-rise control is canceled, and the engine speed $N_E$ is rapidly lowered for saving the electric power consumption of the first electric motor M1 and for preventing deterioration of the fuel economy of the vehicle. It will be understood that the steps SB4, SB10 and SB11 correspond to the engine-speed-rise control portion 292.

Figure 22:
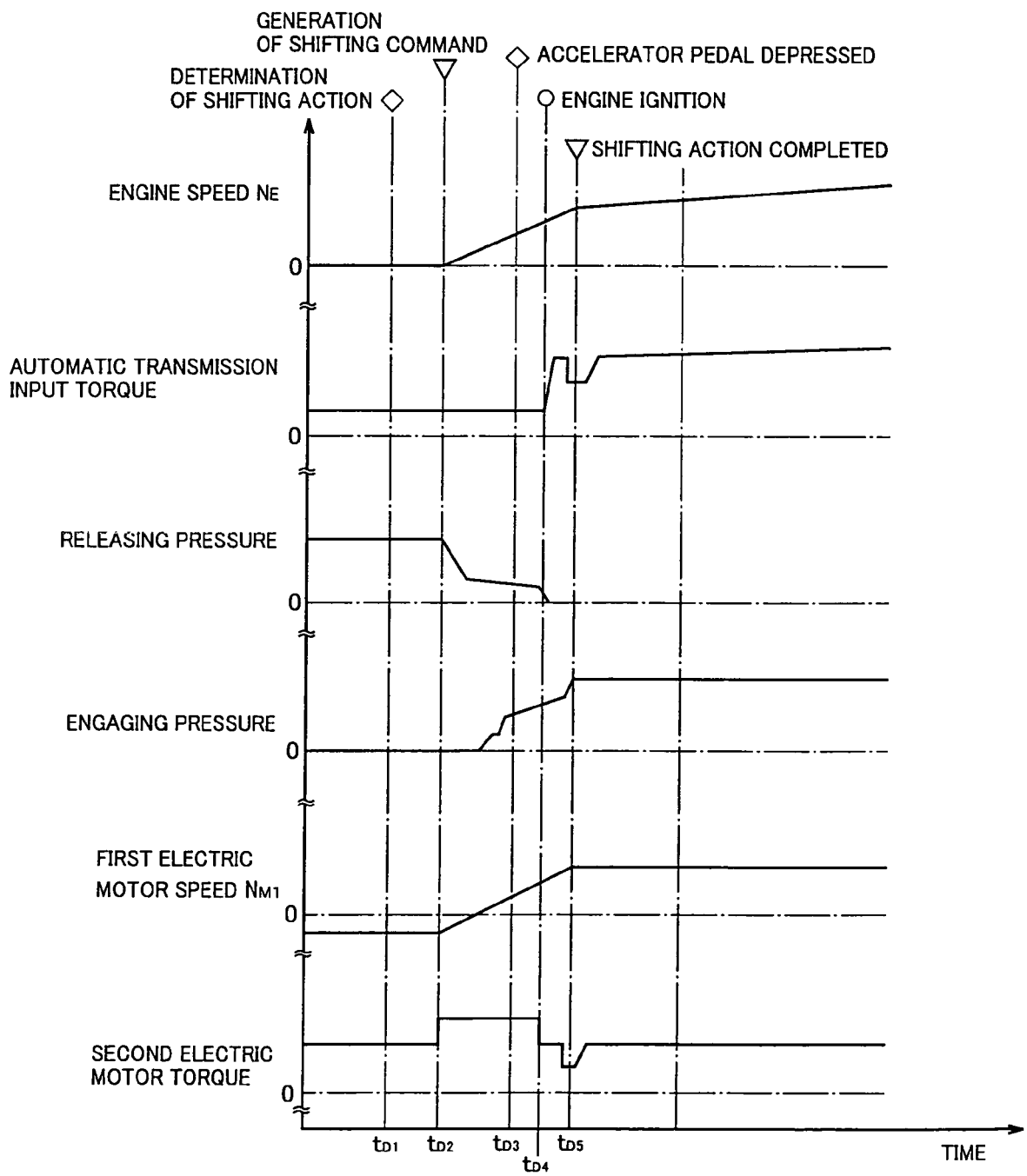
FIG. 22 is a time chart for explaining the control operation illustrated in the flow chart of FIG. 21, when a negative determination as to whether the terminal portion of the shifting action of the automatic transmission portion and the engine starting operation (initiation of the engine ignition) overlap each other is obtained in step SB7 of FIG. 21 in the motor drive mode.

The time chart of FIG. 22 explains the control operation illustrated in the flow chart of FIG. 21, when the negative determination as to whether the terminal portion of the shifting action of the automatic transmission portion 20 and the engine starting operation (initiation of the engine ignition) overlap each other is obtained in step SB7 of FIG. 21 in the motor drive mode of the vehicle. The time chart indicates, from the top to the bottom, the engine speed $N_E$, the input torque of the automatic transmission portion 20, a releasing pressure of the clutch C or brake B to be released for the shifting action, an engaging pressure of the clutch C or brake B to be engaged for the shifting action, the first electric motor speed $N_{M1}$, and the output torque of the second electric motor M2, In the example of FIG. 22, the determination in step SB2 as to whether a shifting action of the automatic transmission portion 20 should take place is made at a point of time $t_{D1}$. Since the affirmative determination is obtained in step SB2, the shifting command to perform the shifting action is generated at a point of time $t_{D2}$. According to the shifting command, the shifting action of the automatic transmission portion 20 is performed in an ordinary manner for a period from the point of time $t_{D2}$ to a point of time $t_D5$ at which the shifting action is completed. Namely, a drop of the releasing pressure of the clutch C or brake B to be released for the shifting action is initiated at the point of time tD2, and a rise of the engaging pressure of the clutch C or brake B to be engaged for the shifting action is initiated a short time after the point of time $t_{D2}$, that is, after a moment of entry into a torque phase of the shifting action. Further, the affirmative determination in step SB2 causes the engine-speed-rise control portion 292 to initiate the engine-speed rise control, by energizing the first electric motor M1 at the point of time $t_{D2}$, to raise the first electric motor speed $N_{M1}$, for thereby raising the engine speed $N_E$. Further, the second electric motor M2 is operated to generate a reaction torque against a resistance to a rotary motion of the engine 8, in addition to a torque for maintaining the input shaft speed of the automatic transmission portion 20. As a result, an increase of the torque $T_{M2}$ of the second electric motor M2 is initiated at the point of time $t_{D2}$.

At a point of time $t_{D3}$, the engine starting command is generated as a result of an increase of the required output torque $T_{OUT}$ by depression of the accelerator pedal. According to the engine starting command, the affirmative determination that the engine starting command has been generated is obtained in step SB5 of FIG. 21.

The engine speed $N_E$ the rise of which is initiated at the point of time $t_{D2}$ exceeds at a point of time prior to the point of time $t_{D4}$, so that the affirmative determination is obtained in step SB6 of FIG. 21. In the present example, the negative determination that the terminal portion of the shifting action of the automatic transmission portion 20 and the engine starting operation (initiation of the engine ignition) do not overlap each other is obtained in step SB7 of FIG. 21, so that the engine 8 is ignited at the point of time $t_{D4}$, and is started, and the torque $T_{M2}$ of the second electric motor M2 is reduced since the reaction torque is no longer necessary. The engine torque $T_E$ increases after the starting of the engine 8, so that an increase of the input torque of the automatic transmission portion 20 is initiated at the point of time $t_{D4}$.

The shifting action of the automatic transmission portion 20 is completed at the point of time $t_{D5}$, and the input torque of the automatic transmission portion 20 is temporarily reduced upon completion of the shifting action, for reducing a shifting shock which would otherwise take place upon completion of the shifting action. The temporary reduction of the input torque may be made by reducing the torque $T_E$ of the engine 8 or the torque $T_{M2}$ of the second electric motor M2. In the present specific example of FIG. 22, the input torque is temporarily reduced by reducing the torque $T_{M2}$ of the second electric motor M2. Further, the rates of rise of the engine speed $N_E$ and the first electric motor speed $N_{M1}$ are lowered or zeroed after the point of time $t_{D5}$; since it is no longer necessary to raise the input shaft speed of the automatic transmission portion 20 after the moment of completion of the shifting action. In the present example, the time difference between the moment of initiation of the engine starting operation and the estimated moment of completion of the shifting action is not shorter than the predetermined lower limit, namely, a time period from the point of time $t_{D4}$ to the point of time $t_{D5}$ is not shorter than the lower limit.

The present second embodiment described above is arranged to change the moment of starting of the engine 8 depending upon whether the engine speed $N_E$ upon generation of the engine starting command according to the determination by the engine-starting-command determining portion 294 is higher than the predetermined threshold value NE1. Thus, the engine 8 can be started at a suitable point of time according to the engine speed $N_E$. If the engine speed $N_E$ upon generation of the engine starting command is not higher than the predetermined threshold value NE1, the engine 8 is started after the moment of completion of the shifting action of the automatic transmission portion 20, to prevent overlapping between the terminal portion of the shifting action and the starting operation (initiation of ignition) of the engine 8, and to thereby prevent the shifting shock of the automatic transmission portion 20. The present also has the advantages A1-A4, A8-A16 and A19 described above with respect to the first embodiment.

While the preferred embodiments of this invention have been described in detail by reference to the accompanying drawings, for illustrative purpose only, it is to be understood that the present invention may be embodied with various changes and modifications which may occur to those skilled in the art.

In the illustrated first and second embodiments, the engine-speed-rise control portion 82, 292 is configured to increase the engine speed $N_E$ by raising the torque $T_{M2}$ of the second electric motor M2, the torque $T_{M2}$ may be increased by an additional amount corresponding to a rise of the input shaft speed of the automatic transmission portion 20 which is required when the shifting action is a shift-down action.

In the illustrated first and second embodiments, the overlap control portion 86, 300 may obtain information regarding the completion of the shifting action of the automatic transmission portion 20 from the step-variable shifting control portion 54, 282, to recognize the moment of completion of the shifting action, or may recognize the moment of completion of the shifting action on the basis of signals received from suitable hydraulic sensors incorporated in the automatic transmission portion 20.

In the illustrated embodiments, the engine-speed-rise control portion 82, 292 is configured to receive a shifting command generated from the step-variable shifting control portion 54, 282 to perform a shifting action of the automatic transmission portion 20, to recognize the generation of the shifting command. However, the engine-speed-rise control portion 82 may be configured to recognize the generation of the shifting command on the basis of a signal received from the above-indicated hydraulic sensor incorporated in the automatic transmission portion 20.

The overlap determining portion 84, 298 may be configured to make the determination as to whether the terminal portion of the shifting action of the automatic transmission portion 20 overlaps the starting of the engine, 8, by taking account of a moment of the engine starting which varies depending upon a specific kind of a fuel used for the engine 8.

In the illustrated first and second embodiments, the engine speed $N_E$ is raised for starting the engine 8 upon switching of the vehicle drive mode from the motor drive mode to the engine drive mode. However, this rise of the engine speed $N_E$ need not be implemented for the sole purpose of starting the engine 8, but may be implemented by utilizing any other control which involves a rise of the engine speed $N_E$.

In the first and second embodiments, the engine-speed-rise control portion 82, 292 is configured to raise the engine speed $N_E$ to the value not lower than the predetermined engine starting speed $N_{EST}$. However, the engine speed $N_E$ may be raised to a value lower than a lower limit below above which the engine 8 can be started. In this case, too, a rise of the engine speed $N_E$ during a shifting action of the automatic transmission portion 20 may contribute to shortening of the required engine starting time, as compared with no rise at all of the engine speed $N_E$ during the shifting action.

In the illustrated transmission mechanism 10, 210, the differential portion 11, 211 (power distributing mechanism 16, 216) functions as the electrically controlled continuously-variable transmission the speed ratio γ0 of which is continuously variable from the minimum value of γ0*min* to the maximum value of γ0*max*. However, the speed ratio γ0 of the differential portion 11, 211 may be variable in steps, by utilizing its differential function.

While the engine 8 and the differential portion 11, 211 are connected directly to each other in the illustrated transmission mechanism 10, 210, the engine 8 and the differential portion 11, 211 may be connected to each other through a clutch or any other coupling device.

In the illustrated transmission mechanism 10, 210, the first electric motor M1 and the second rotary element RE2 are connected directly to each other while the second electric motor M2 and the third rotary element RE3 are connected directly to each other. However, the first electric motor M1 and the second rotary element RE2 may be connected to each other through a clutch or any other coupling device, and the second electric motor M2 and the third rotary element RE3 may be connected to each other through a clutch or any other coupling device.

In the illustrated transmission mechanism 10, 210, the automatic transmission portion 20 is disposed between the differential portion 11, 211 and the drive wheels 38, the automatic transmission portion 20 may be disposed between the engine 8 and the differential portion 11, 211. The automatic transmission portion 20 is required to constitute a part of the power transmitting path between the engine and the drive wheels 38.

In the illustrated transmission mechanism 10, 210 shown in FIGS. 1 and 15, the differential portion 11, 211 and the automatic transmission portion 20 are connected in series with each other. However, the present invention is applicable to a vehicular drive system in which the differential portion 11, 211 and the automatic transmission portion 20 are not mechanically independent of each other, provided the transmission mechanism 10, 210 as a whole has an electrically controlled differential function, and a function of changing its overall speed ratio in a manner other than the electrically controlled differential function.

While the power distributing mechanism 16, 216 in the illustrated transmission mechanism 10, 210 is constituted by the single-pinion type planetary gear set 24, the power distributing mechanism 16 may be constituted by a double-pinion type planetary gear set.

In the illustrated transmission mechanism 10, 210, the engine 8 is operatively connected to the first rotary element RE1 of the planetary gear set 24 of the differential portion 11, 211 and the first electric motor M1 is operatively connected to the second rotary element RE2, while the drive wheels 38 are operatively connected to the third rotary element RE3. However, the engine 8, first electric motor M1 and drive wheels 38 may be operatively connected to selected ones of rotary elements of two planetary gear sets that are connected to each other, so that the differential portion 11, 211 is switched between its step-variable and continuously-variable shifting states by selectively engaging switching clutch and brake connected to selected one of the rotary elements.

The automatic transmission portion 20 functioning as an automatic transmission may be replaced by a transmission portion functioning as a manual transmission.

In the first and second illustrated embodiments, the second electric motor M2 is directly connected to the power transmitting member 18. However, the second electric motor M2 may be connected, either directly or indirectly via a transmission, to any portion of the power transmitting path between the differential portion 11, 211 and the drive wheels 38.

In the power distributing mechanism 16, 216 in the illustrated first and second embodiments, the first carrier CA0 is fixed to the engine 8, and the first sun gear S0 is fixed to the first electric motor M1 while the first ring gear R0 is fixed to the power distributing member 18. However, this arrangement is not essential. The engine 8, first electric motor M1 and power transmitting member 18 may be fixed to any other elements selected from the three elements CA0, S0 and R0 of the first planetary gear set 24.

While the engine 8 is directly fixed to the input shaft 14 in the illustrated firs and second embodiments, the engine 8 may be operatively connected to the input shaft 14 through any suitable member such as gears and a belt, and need not be disposed coaxially with the input shaft 14.

In the illustrated first and second embodiments, the first and second electric motors M1, M2 are disposed coaxially with the input shaft 14 such that the first electric motor M1 is connected to the first sun gear S0 while the second electric motor M2 is connected to the power transmitting member 18. However, this arrangement is not essential. For instance, the first electric motor M1 may be operatively connected to the first sun gear S0 through gears, a belt or a speed reduction device, while the second electric motor M2 may be connected to the power transmitting member 18.

In the illustrated first and second embodiments, the automatic transmission portion 20 is connected in series to the differential portion 11, 211 through the power transmitting member 18. However, the automatic transmission portion 20 may be disposed coaxially with a counter shaft disposed parallel to the input shaft 14. In this case, the differential portion 11, 211 and the automatic transmission portion 20 are connected to each other through a suitable power transmitting member or members in the form of a pair of counter gears, or sprockets and a chain, such that a rotary motion can be transmitted between the differential portion 11, 211 and the automatic transmission portion 20.

While the power distributing mechanism 16 in the illustrated embodiment is constituted by one planetary gear set 24, it may be constituted by two or more planetary gear sets so that the power distributing mechanism 16 is operable as a transmission having three or more gear positions in the non-differential state (fixed-speed-ratio shifting state). The planetary gear sets are not limited to the single-pinion type, and may be of a double-pinion type. Where the two or more planetary gear sets are used, the rotary elements of each planetary gear set are connected to respective ones of the engine 8, first and second electric motors M1, M2 and power transmitting member 18, and clutches and brakes may be disposed for connecting the selected rotary elements to each other or selectively fixing the selected rotary element to the stationary member, so that the power distributing mechanism 16 is switchable between the step-variable shifting state and the continuously-variable shifting state.

In the illustrated transmission mechanism 10, 210, the second electric motor M2 is connected to the power transmitting member 18 which constitutes a part of the power transmitting path between the engine 8 and the drive wheels 38. The transmission mechanism 10 may be modified such that the second electric motor M2 connected to the power transmitting path is connectable to the power distributing mechanism 16 through a clutch or any other coupling device, so that the differential state of the power distributing mechanism 16, 216 is controllable by controlling the second electric motor M2 rather than the first electric motor M1.

What is claimed is:

1. An engine starting control apparatus for a hybrid vehicle including (a) an engine, (b) an electrically controlled differential portion which has a first electric motor, and a differential mechanism operatively connected to the first electric motor and a differential state of which is controlled by controlling an operating state of the first electric motor, (c) a transmission portion constituting a part of a power transmitting path between the engine and a drive wheel of the hybrid vehicle, and (d) a second electric motor connected to the power transmitting path, said engine starting control apparatus comprising:

an engine-speed-rise control portion operable during a shifting action of the transmission portion in a motor drive mode of the hybrid vehicle in which the hybrid vehicle is driven by the second electric motor as a vehicle drive power source, without using the engine as a vehicle drive power source, said engine-speed-rise control portion being configured to raise an operating speed of the engine during the shifting action in the motor drive mode.

2. The engine starting control apparatus according to claim 1, wherein the engine-speed-rise control portion raises the operating speed of the engine by operating the first electric motor.

3. The engine starting control apparatus according to claim 2, wherein the second electric motor is operatively connected to one of rotary elements of the differential mechanism, which is other than the rotary element to which the first electric motor is operatively connected, and said engine-speed-rise control portion is configured to command the second electric motor to generate a reaction torque against a resistance to a rotary motion of the engine, for raising the operating speed of the engine in the motor drive mode.

4. The control apparatus according to claim 3, wherein the reaction torque generated by the second electric motor during the shifting action of the transmission portion is larger than that to be generated while the transmission portion is not in a shifting action.

5. The engine starting control apparatus according to claim 1, wherein the electrically controlled differential portion is provided with a differential limiting device configured to limit a differential function of the differential mechanism, and said engine-speed-rise control portion is configured to raise the operating speed of the engine by commanding the differentia limiting device to limit the differential function of the differential mechanism.

6. The control apparatus according to claim 5, wherein said engine-speed-rise control portion is configured to command the second electric motor to generate a reaction torque against a resistance to a rotary motion of the engine, for raising the operating speed of the engine in the motor drive mode.

7. The engine starting control apparatus according to claim 6, wherein the reaction torque generated by the second electric motor during the shifting action of the transmission portion is larger than that to be generated while the transmission portion is not in a shifting action.

8. The engine starting control apparatus according to claim 1, wherein the differential mechanism includes a planetary gear set.

9. The engine starting control apparatus according to claim 1, wherein the hybrid vehicle further includes a mechanism operable to disconnect or substantially disconnect a power transmitting path between the electrically controlled differential portion and the drive wheel, during the shifting action of the transmission portion.

10. The engine starting control apparatus according to claim 1, further comprising an overlap control portion operable when a terminal portion of the shifting action of the transmission portion and a starting operation of the engine overlap each other, said overlap control portion being configured to start the engine after completion of the shifting action.

11. The engine starting control apparatus according to claim 1, further comprising an engine-start control portion configured to change a moment of starting of the engine, on the basis of the operating speed of the engine upon generation of a command to start the engine during the shifting action of the transmission portion.

12. The engine starting control apparatus according to claim 1, further comprising an overlap control portion configured to change a moment of starting of the engine, so as to prevent overlapping between a terminal portion of the shifting action of the transmission portion and a starting operation of the engine.

13. The engine starting control apparatus according to claim 1, wherein said electrically controlled differential portion is operable as a continuously-variable transmission by controlling an operating state of the first electric motor.

14. The engine starting control apparatus according to claim 1, wherein the transmission portion is a step-variable transmission portion a speed ratio of which is variable in steps.

15. The engine starting control apparatus according to claim 1, wherein said engine-speed-rise control portion is configured not to raise the operating speed of the engine prior to a moment of generation of a command to start the engine, while the transmission portion is not in said shifting action in the motor drive mode.

16. The engine starting control apparatus according to claim 1, further comprising an engine-start control portion operable when a terminal portion of the shifting action of the transmission portion and a starting operation of the engine do not overlap each other, said engine-start control portion being configured to start the engine during the shifting action of the transmission portion.

17. The engine starting control apparatus according to claim 1, further comprising an engine-start control portion configured to determine a moment of starting of the engine on the basis of a degree of process of the shifting action of the transmission portion.

18. The engine starting control apparatus according to claim 1, wherein the engine-speed-rise control portion determines, on the basis of the operating speed of the second electric motor, the operating speed of the first electric motor or de-energization of the first electric motor.

19. The engine starting control apparatus according to claim 1, wherein the differential mechanism includes a coupling device operable to transmit to a drive force from the second electric motor to the engine.

20. The engine starting control apparatus according to claim 10, wherein the starting operation of the engine is an operation to ignite the engine.

21. The engine starting control apparatus according to claim 12, wherein the starting operation of the engine is an operation to ignite the engine.

22. The engine starting control apparatus according to claim 16, wherein the starting operation of the engine is an operation to ignite the engine.

* * * * *